US012410265B2

(12) United States Patent
Ho et al.

(10) Patent No.: US 12,410,265 B2
(45) Date of Patent: Sep. 9, 2025

(54) METHOD FOR POLYMER PRECIPITATION

(71) Applicant: GRST SINGAPORE PTE. LTD., Singapore (SG)

(72) Inventors: Kam Piu Ho, Hong Kong (CN); Yingkai Jiang, Shenzhen (CN); Yangjian Dong, Mianyang (CN)

(73) Assignee: GRST SINGAPORE PTE. LTD., Singapore (SG)

( * ) Notice: Subject to any disclaimer, the term of this patent is extended or adjusted under 35 U.S.C. 154(b) by 487 days.

(21) Appl. No.: 17/914,367

(22) PCT Filed: Feb. 10, 2021

(86) PCT No.: PCT/CN2021/076466
§ 371 (c)(1),
(2) Date: Sep. 26, 2022

(87) PCT Pub. No.: WO2021/253849
PCT Pub. Date: Dec. 23, 2021

(65) Prior Publication Data
US 2023/0105056 A1    Apr. 6, 2023

(30) Foreign Application Priority Data

Jun. 17, 2020  (WO) ................ PCT/CN2020/096672
Aug. 19, 2020  (WO) ................ PCT/CN2020/110065
Sep. 25, 2020  (WO) ................ PCT/CN2020/117789
Dec. 25, 2020  (WO) ................ PCT/CN2020/139555

(51) Int. Cl.
*C08F 6/12*  (2006.01)
*B29B 17/02*  (2006.01)
(Continued)

(52) U.S. Cl.
CPC ................ *C08F 6/12* (2013.01); *B29B 17/02* (2013.01); *B32B 43/006* (2013.01); *C08F 220/06* (2013.01); *C08F 220/44* (2013.01); *C08F 220/56* (2013.01); *C08J 3/14* (2013.01); *C08J 3/16* (2013.01); *C08J 11/06* (2013.01); *C08J 11/26* (2013.01); *C08K 3/30* (2013.01); *C09D 5/00* (2013.01); *C09D 133/064* (2013.01); *C09D 133/22* (2013.01); *C09J 5/02* (2013.01); *C09J 133/02* (2013.01); *C22B 7/005* (2013.01); *C22B 7/006* (2013.01); *H01M 4/622* (2013.01); *H01M 10/54* (2013.01); *C08J 2333/02* (2013.01); *C08J 2333/06* (2013.01); *C08J 2333/22* (2013.01); *C08K 2003/309* (2013.01); *C09J 2203/33* (2013.01); *C09J 2301/314* (2020.08); *C09J 2301/414* (2020.08); *C09J 2301/502* (2020.08); *C09J 2433/00* (2013.01); *H01M 4/0404* (2013.01); *H01M 4/667* (2013.01); *Y02E 60/10* (2013.01); *Y02W 30/62* (2015.05); *Y02W 30/84* (2015.05)

(58) Field of Classification Search
CPC ........ C08F 6/12; C08F 220/06; C08F 220/44; C08F 220/56; B29B 17/02; B32B 43/006; C08J 11/06; C08J 11/26; C08J 2333/02; C08J 3/14; C08J 2333/06; C08J 2333/22; C08J 3/16; C08K 3/30; C08K 2003/309; C09J 5/02; C09J 133/02; C09J 2203/33; C09J 2301/314; C09J 2301/414; C09J 2301/502; C09J 2433/00; H01M 10/54; H01M 4/622; H01M 4/0404; H01M 4/667; C09D 5/00; C09D 133/064; C09D 133/22; C22B 7/006; Y02E 60/10; Y02W 30/62; Y02W 30/84
See application file for complete search history.

(56) References Cited

U.S. PATENT DOCUMENTS

| 5,317,043 A | 5/1994 | Gass |
| 5,336,755 A | 8/1994 | Pape |
| 2011/0064798 A1 | 3/2011 | Suvee et al. |

FOREIGN PATENT DOCUMENTS

| CN | 1672220 A | 9/2005 |
| CN | 110885650 A | 3/2020 |

(Continued)

OTHER PUBLICATIONS

European Search Report of European Patent Application No. 21825136.1 issued on Jul. 4, 2024.

(Continued)

*Primary Examiner* — Rabon A Sergent

(57) ABSTRACT

Disclosed is a method for precipitating a polymer by adding a precipitation agent into a first suspension to form a second suspension; wherein the first suspension comprises a polymer and an aqueous solvent; and wherein the polymer comprises a copolymer comprising a structural unit derived from an acid group-containing monomer and a structural unit derived from a hydrophobic group-containing monomer. The method for precipitation of a polymer disclosed herein is developed to initiate the bond disruption and/or breakage between the polymer and the aqueous solvent within the second suspension. This is accompanied with the structural transformation of the polymer driven by the intermolecular and intramolecular interactions of the polymer chains which brings about the precipitation of the polymer. The method circumvents both complex separation process and contamination of the polymer, enables excellent materials recovery and allows the precipitation of the polymer to be achieved within a short time frame. An application of the method for precipitating a polymeric binder in a battery electrode is disclosed herein.

20 Claims, 8 Drawing Sheets

(51) Int. Cl.
*B32B 43/00* (2006.01)
*C08F 220/06* (2006.01)
*C08F 220/44* (2006.01)
*C08F 220/56* (2006.01)
*C08J 3/14* (2006.01)
*C08J 3/16* (2006.01)
*C08J 11/06* (2006.01)
*C08J 11/26* (2006.01)
*C08K 3/30* (2006.01)
*C09D 5/00* (2006.01)
*C09D 133/06* (2006.01)
*C09D 133/22* (2006.01)
*C09J 5/02* (2006.01)
*C09J 133/02* (2006.01)
*C22B 7/00* (2006.01)
*H01M 4/04* (2006.01)
*H01M 4/62* (2006.01)
*H01M 10/54* (2006.01)
*H01M 4/66* (2006.01)

(56) References Cited

FOREIGN PATENT DOCUMENTS

| GB | 841279 A | 7/1960 |
| JP | 2011127082 A | 6/2011 |
| JP | 2016046226 A | 4/2016 |
| KR | 20030068867 A | 8/2003 |
| KR | 20190045209 A | 5/2019 |

OTHER PUBLICATIONS

Aleksander Sinek et al, Temperature and pH-Dependent Response of Poly(Acrylic Acid) and Poly(Acrylic Acid-co-Methyl Acrylate) in Highly Concentrated Potassium Chloride Aqueous Solutions, Polymers, Feb. 21, 2020, p. 486, vol. 12, No. 2.

Qian He et al., Polymethylene-b-poly (acrylic acid) diblock copolymers: Aggregation and crystallization in the presence of CaCl2, European Polymer Journal, Aug. 4, 2017, pp. 174-185, vol. 95.

Xiang-Zhong Ren et al., Effects of pH on the Morphology of the Waterborne Polyurethane Dispersion and Its Copolymer, Polymer Materials Science and Engineering, Feb. 15, 2009, pp. 11-14, vol. 25, No. 2.

International Search Report of PCT Patent Application No. PCT/CN2021/076466 issued on May 10, 2021.

(A)

(B)

(A)  (B)

METHOD FOR POLYMER PRECIPITATION

CROSS-REFERENCE TO RELATED APPLICATIONS

This is a U.S. national stage application of the International Patent Application No. PCT/CN2021/076466, filed Feb. 10, 2021, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020, International Patent Application No. PCT/CN2020/117789, filed Sep. 25, 2020 and International Patent Application No. PCT/CN2020/139555, filed Dec. 25, 2020, the content of all of which are incorporated herein by reference in their entireties.

FIELD OF THE INVENTION

The present invention relates to the field of methods of materials recycling. In particular, this invention relates to a method of precipitation of a polymer.

BACKGROUND OF THE INVENTION

The increasing urbanization, rapid development of technology innovations and consequent frequent replacement of products or disposal of waste consumables have resulted in shorter lifespans for products and/or over-production of waste. With the emergence of the growing problems associated with waste over-generation such as detrimental effects on human health, adverse environmental impacts and resource depletion, there has been an urge in taking prompt actions to resolve these complications worldwide using various means of waste processing.

Recycling, being a key component in waste reduction hierarchy, aims to recover invaluable materials from waste for reuse. Recycling of materials brings about conservation of natural resources, reduction in energy consumption (and hence, production costs) associated with extraction of raw materials and alleviates environmental impacts by reducing greenhouse gases and $SO_x$ emissions. Owing to the substantial benefits that materials recycling has to offer, developing highly efficacious and efficient methods to recycle materials is of utmost importance in achieving a circular economy.

Polymerization offers a powerful and modular strategy in generating macromolecules with highly complex structures and versatile functionalities. Accordingly, polymers are useful for a diverse range of applications. They have been utilized as catalysts, paints and varnishes, protective coatings, dispersants, emulsifiers, surfactants, lubricants, flocculants, thickeners, delivery agents, adhesives, insulators, packaging materials, biomaterials, construction materials, photosensitive materials, etc. On account of the substantial use of polymers in various fields, separation of polymers contained within the products is a technique that is heavily involved in materials recycling.

However, as the products have reached their end-of-life or with the generation of product rejects during the manufacturing process which are ready for immediate recycling, undergoing the step of separation of the polymers contained within the products during recycling is presented with several difficulties.

Various means have been proposed in achieving extraction of the polymer. For example, agent(s) could be incorporated into the polymer-containing mixture to enable polymer recovery. However, the agent(s) responsible for reacting with or inducing changes to the polymer that gives rise to the separation of the polymer from the mixture, might also undergo(es) undesirable chemical reaction(s) with other constituents within the mixture which could either cause irreversible chemical changes to other constituents or allow the other constituents to similarly be extracted out from the mixture. The former would make the retrieval of the other constituents in the mixture impossible and the latter would cause an ineffective separation of the polymer which not only brings about undesirable retrieval loss of other constituents in the mixture, but also a reclaimed polymer with high levels of impurities that requires subsequent purification processes. In addition, separation of the polymer from the remaining mixture might be highly inefficient, taking up to several hours.

In further aspect, the method of the present invention is intended for attaining the separation of an aqueous polymer from an aqueous solvent. Aqueous polymers, that are known to be water-soluble and thus could be processed in aqueous media, exhibit superior dispersion and stability in water. The ability for the polymer to be uniformly distributed in water greatly enhances the specific functional performance of the polymer. However, the well-dispersed polymer within the aqueous media poses an additional challenge in the separation of the water-soluble polymers from their respective aqueous solvents in the subsequent recycling stage.

Commonly used organic polymers, such as polyvinylidene fluoride (PVDF), have their own downsides, being their insolubility in water and can only dissolve in some specific organic solvents such as N-methyl-2-pyrrolidone (NMP) which is flammable and toxic and hence requires specific handling. An NMP recovery system must be in place during the drying process to recover NMP vapors. This will generate significant costs in the manufacturing process since it requires a large capital investment. Therefore, for applications where exposure to moisture in the manufacturing process is not a significant concern, the use of aqueous polymers that utilizes less expensive and more environmentally-friendly solvents, such as aqueous solvents, most commonly water, is preferred since the use of aqueous polymer can reduce the large capital cost of the recovery system. In light of this, the present invention details a method of precipitation of a water-soluble polymer.

Separation of a polymer from the mixture is initiated by the bond disruption and/or breakage between the polymer and the solvent comprised within the mixture. However, with the many polymers of different compositions being developed that display varying specific properties, it would be highly implausible for a single separation method to be applicable in the separation of polymers from the mixtures regardless of the compositions of the polymers contained within. For this reason, the method or agent of choice added into the mixture should be highly specific in achieving separation of the targeted polymer without imparting unwanted chemical and physical changes on other constituents within the mixture.

In view of the above, attempts have been made in developing a method in attaining complete separation of polymer from the mixture.

KR Patent Application Publication No. 20030068867 A discloses a method of introducing supercritical fluid such as carbon dioxide ($CO_2$) to a polymer solution to separate the polymer from the polymer solution under supercritical conditions; wherein the polymer solution comprises polymer derived from olefin monomer(s) and an alkyl or benzyl-based solvent. The polymer solution is first subjected to an elevation in pressure (above 500 bar, far beyond the critical pressure of $CO_2$) at constant temperature of 20 to 70° C. with the introduction of carbon dioxide to the polymer solution in forming a homogeneous solution. The liquid $CO_2$ within the polymer solution could then act as an anti-solvent to precipitate the polymer. Subsequently, the precipitated polymer is removed from the remaining polymer solution by lowering the pressure of the remaining solution to vaporize the $CO_2$, solvent and monomers. In order to create supercritical conditions and allow the $CO_2$ to exhibit superior anti-solvent effect, an extremely high pressure, well beyond the atmospheric pressure, is required for the involved process in order to initiate the precipitation of the polymer. This method would in turn generate substantial energy costs (which stems from the high energy consumption) in the separation process. Furthermore, high-pressure processing is likely to present safety concerns.

In view of the above-mentioned challenges, there is always a need to develop a unified and simple method to achieve highly efficient and complete separation of a polymer from a mixture, wherein the mixture comprises a polymer and an aqueous solvent. The present invention sets forth a method of precipitation of a polymer in accomplishing complete separation of the polymer from the mixture via the use of a precipitation agent. Furthermore, the method disclosed herein is specifically developed for the optimization of the polymer formulation. The method for precipitation of a polymer disclosed herein is developed to initiate the bond disruption and/or breakage between the polymer and the aqueous solvent within the mixture. This is accompanied with the structural transformation of the polymer driven by the intermolecular and intramolecular interactions of the polymer chains which brings about the precipitation of the polymer. Accordingly, the precipitation phenomenon relates to a phase-conversion reaction where the polymer in the liquid phase is rapidly converted into solid phase. The polymer comprises a copolymer comprising a structural unit derived from an acid group-containing monomer and a structural unit derived from a hydrophobic group-containing monomer. A precipitation method of the present invention that fulfills these qualities in promoting changes to the interactions between the polymer and the aqueous solvent is highly applicable to retrieve a polymer from a mixture. It would circumvent both complex separation process and contamination of the polymer, enables excellent materials recovery and allows the precipitation of the polymer to be achieved within a short time frame.

SUMMARY OF THE INVENTION

The aforementioned needs are met by various aspects and embodiments disclosed herein. In one aspect, provided herein is a method for precipitating a polymer by adding a precipitation agent into a first suspension to form a second suspension; wherein the first suspension comprises a polymer and an aqueous solvent; and wherein the polymer comprises a copolymer comprising a structural unit derived from an acid group-containing monomer and a structural unit derived from a hydrophobic group-containing monomer.

In some embodiments, the precipitation agent is an acid. In some embodiments, the acid is a strong acid, a weak acid or a combination thereof.

In some embodiments, the strong acid is selected from the group consisting of nitric acid, sulphuric acid, hydrochloric acid, perchloric acid, hydrobromic acid, hydroiodic acid, chloric acid, bromic acid, iodic acid, dithionic acid, dithionous acid, sulfamic acid, trithionic acid, tetrathionic acid, methane sulphonic acid, p-toluenesulfonic acid, benzene sulfonic acid, trichloroacetic acid, trifluoroacetic acid, oxalic acid, propiolic acid, mesoxalic acid, mellitic acid or combinations thereof. In some embodiments, the $pK_a$ of the strong acid is from about −10 to about 2. In some embodiments, the $pK_a$ of the strong acid is between −10 and 2.

In some embodiments, the weak acid is selected from the group consisting of formic acid, acetic acid, glycolic acid, glyoxylic acid, oxalic acid, propionic acid, acrylic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid, phosphoric acid, nitrous acid, orthosilicic acid or combinations thereof. In some embodiments, the $pK_a$ of the weak acid is from about 2 to about 7. In some embodiments, the $pK_a$ of the weak acid is between 2 and 7.

In some embodiments, the pH of the second suspension is from about 0.2 to about 4.5.

The precipitation of a polymer attained using the method provided herein is straightforward, occurs within a short period of time and does not incur a penalty in terms of suffering from recovery loss of the polymer and other constituents in the first suspension, damaging and introducing impurities to the retrieved polymer.

In another aspect, as one of the applications of the present invention, the aforementioned method is employed as part of the recycling process of battery electrode to attain separation of a polymeric binder from the remaining of the second suspension, wherein the polymeric binder is a polymer. Provided herein is a method for precipitating a polymeric binder by adding a precipitation agent into the first suspension to form a second suspension; wherein the first suspension comprises an electrode layer and an aqueous solvent; wherein the electrode layer comprises a polymeric binder; and wherein the polymeric binder comprises a copolymer comprising a structural unit derived from an acid group-containing monomer and a structural unit derived from a hydrophobic group-containing monomer.

The simple utilization of a precipitation agent in the present invention to precipitate a polymer from a second suspension can help achieve complete separation of the polymer from the remaining of the second suspension, reduce the time taken for precipitation of the polymer, maximize invaluable materials recovery, eliminate contamination of polymer and/or other constituents in the second suspension and prevent the need for subsequent downstream processing. Furthermore, the method disclosed herein is found to be applicable to precipitate a polymeric binder within a battery electrode without inducing undesirable chemical changes and phase transitions to other constituents such as the electrode active materials within the second suspension.

DETAILED DESCRIPTION OF THE INVENTION

Figure 1:
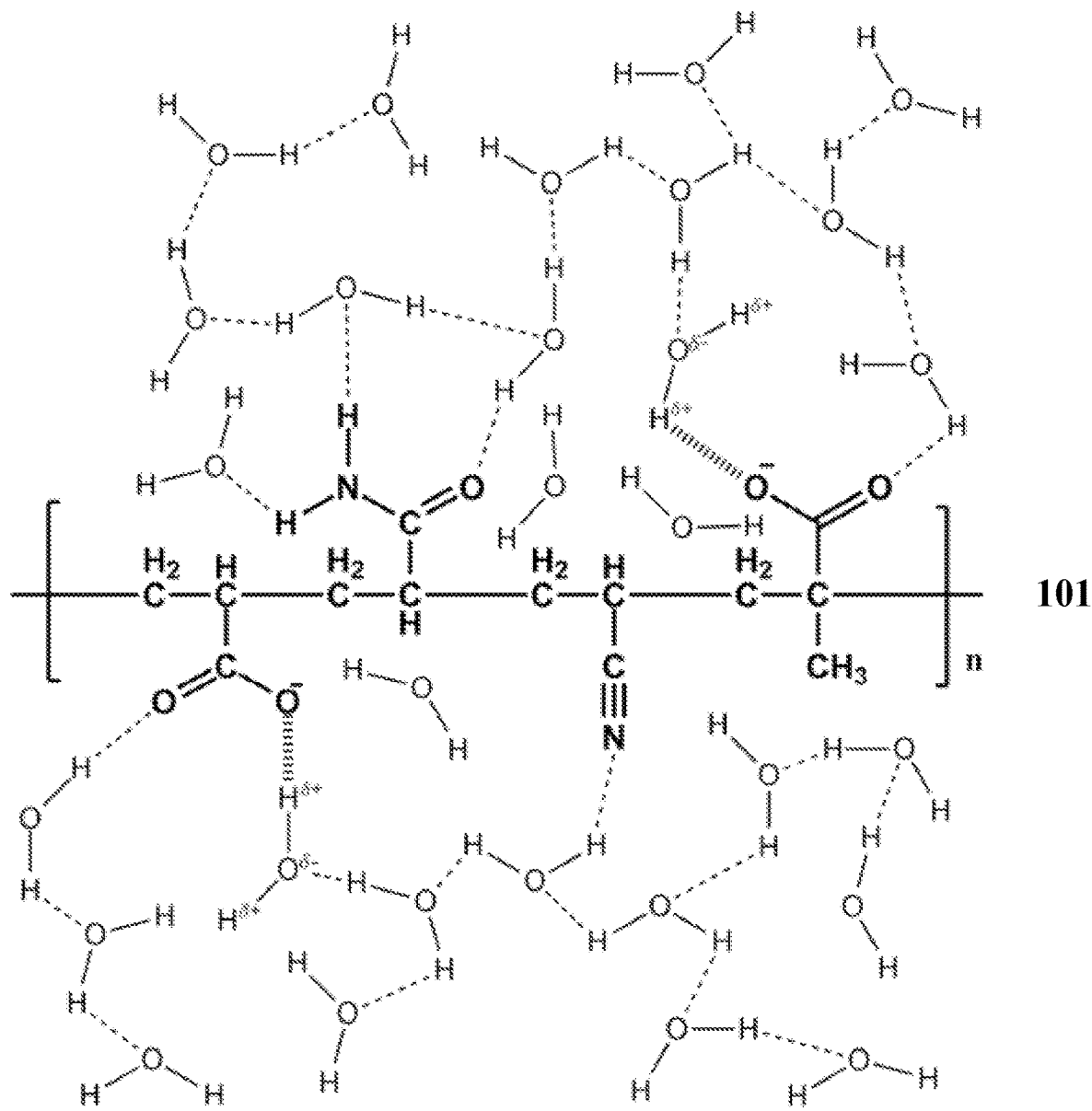
FIG. 1 illustrates a schematic of an embodiment of the proposed interactions between a polymer and an aqueous solvent in a first suspension.

In one aspect, provided herein is a method for precipitating a polymer by adding a precipitation agent into a first suspension to form a second suspension; wherein the first suspension comprises a polymer and an aqueous solvent; and wherein the polymer comprises a copolymer comprising a structural unit derived from an acid group-containing monomer and a structural unit derived from a hydrophobic group-containing monomer.

In another aspect, the method of the present invention is used as part of a battery electrode recycling regime. Provided herein is a method for precipitating a polymeric binder by adding a precipitation agent into a first suspension to form a second suspension; the first suspension comprises an electrode layer and an aqueous solvent; wherein the electrode layer comprises a polymeric binder; and wherein the polymeric binder comprises a copolymer comprising a structural unit derived from an acid group-containing monomer and a structural unit derived from a hydrophobic group-containing monomer.

The term "electrode" refers to a "cathode" or an "anode."

The term "positive electrode" is used interchangeably with cathode. Likewise, the term "negative electrode" is used interchangeably with anode.

The term "polymeric binder", "binder" or "binder material" refers to a chemical compound, mixture of compounds, or polymer that is used to hold material(s) in place. In some embodiments, the polymeric binder is used to adhere material(s) onto a substrate to form a composite. In some embodiments, the substrate is a conductive metal. In some embodiments, the substrate is a non-conductive metal. In some embodiments, the polymeric binder refers to a chemical compound, mixture of compounds, or polymer that is used to hold an electrode material and/or a conductive agent in place and adhere them onto a conductive metal part to form an electrode. In some embodiments, the electrode does not comprise any conductive agent. In some embodiments, the polymeric binder forms a colloid, solution or dispersion in an aqueous solvent such as water.

The term "conductive agent" refers to a material that has good electrical conductivity. Therefore, the conductive agent is often mixed with an electrode active material at the time of forming an electrode to improve electrical conductivity of the electrode. In some embodiments, the conductive agent is chemically active. In some, the conductive agent is chemically inactive.

The term "polymer" refers to a compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "coil" refers to a linear or an almost linear configuration of a polymer chain. In some embodiments, a coiled polymer chain comprises like charges along the chain which repel each other.

The term "copolymer" refers to a polymer prepared by the polymerization of two or more different types of monomers.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, $(C_3-C_7)$cycloalkyl groups, such as cyclopropyl, cyclobutyl, cyclopentyl, cyclohexyl, and cycloheptyl, and saturated cyclic and bicyclic terpenes and (C$_3$-C$_7$)cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, or 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —CO$_2$CH$_3$; —CONH$_2$; —OCH$_2$CONH$_2$; —NH$_2$; —SO$_2$NH$_2$; —OCHF$_2$; —CF$_3$; —OCF$_3$; —NH(alkyl); —N(alkyl)$_2$; —NH(aryl); — N(alkyl)(aryl); —N(aryl)$_2$; —CHO; —CO(alkyl); —CO(aryl); —CO$_2$(alkyl); and —CO$_2$(aryl); and such moieties can also be optionally substituted by a fused-ring structure or bridge, for example —OCH$_2$O—. These substituents can optionally be further substituted with a substituent selected from such groups. All chemical groups disclosed herein can be substituted, unless it is specified otherwise.

The term "olefin" refers to an unsaturated hydrocarbon-based compound with at least one carbon-carbon double bond.

The term "halogen" or "halo" refers to F, Cl, Br or I.

The term "monomeric unit" refers to the constitutional unit contributed by a single monomer to the structure of a polymer.

The term "structural unit" refers to the total monomeric units contributed by the same monomer type in a polymer.

The term "acid salt group" refers to the acid salt formed when an acid reacts with a base or when an acid dissociates in an aqueous solvent such as water. In some embodiments, the proton of the acid is replaced with a metal cation. In some embodiments, the proton of the acid is replaced with an ammonium ion.

The term "polyatomic" refers to an electrically neutral group of three of more atoms held together by covalent bonds.

The term "polyprotic acid" refers to an acid having two or more ionizable hydrogen ions (i.e. protons) per molecule.

The term "hydrophilic" refers to a tendency to dissolve in or interact with polar solvents, especially water, or polar functional groups. Hydrophilic groups are usually themselves polar, and in many cases, such hydrophilic groups are able to form hydrogen bonds with water molecules. Some non-limiting hydrophilic groups include acid, hydroxyl, and amide.

The term "hydrophobic group" refers to a functional group that tends not to dissolve or interact with polar solvents, especially water, or polar functional groups. Hydrophobic groups are usually non-polar.

The term "number average molecular weight ($M_n$)" of a polymer is defined mathematically as:

$$M_n = \frac{\Sigma N_i M_i}{\Sigma N_i}$$

where $N_i$ is the number of polymer molecules with a particular molecular weight $M_i$.

The term "weight average molecular weight ($M_w$)" of a polymer is defined mathematically as:

$$M_w = \frac{\Sigma N_i M_i^2}{\Sigma N_i M_i}$$

where $N_i$ is the number of polymer molecules with a particular molecular weight $M_i$.

The term "polydispersity index" or "PDI" refers to a ratio of the weight average molecular weight ($M_w$) relative to the number average molecular weight ($M_n$). It is a measure of the distribution of the molecular weight within a given polymer sample.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "ultrasonicator" refers to an equipment that can apply ultrasound energy to agitate particles in a sample. Any ultrasonicator that can disperse the mixture, suspension, solution or slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on one side or both sides of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "solid content" refers to the amount of nonvolatile material remaining after evaporation.

The term "peeling strength" refers to the amount of force required to separate a current collector and an electrode layer that are bonded to each other. It is a measure of the binding strength between such two materials and is usually expressed in N/cm.

The term "adhesive strength" refers to the amount of force required to separate a current collector and a polymeric binder coating that are bonded to each other. It is a measure of the binding strength between such two materials and is usually expressed in N/cm.

The term "water-soluble" refers to the capability of a substance in dissolving in water with trace amounts or none of the materials remained undissolved in water. The term "water-soluble" embraces the terms "entirely water-soluble", "mostly water-soluble" and "slightly water-insoluble".

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+K(*(R^U-R^L))$ wherein k is a variable ranging from 0 percent to 100 percent. Moreover, any numerical range defined by two R numbers as defined in the above is also specifically disclosed.

In the present description, all references to the singular include references to the plural and vice versa.

The method of the present invention has been developed that is uniquely tailored for the specific need of extracting a polymer from a first suspension, wherein the first suspension comprises a polymer and an aqueous solvent. The polymer is water-soluble and utilizes aqueous solvents, most commonly water, which forms the basis for the making of a water-based solution. The polymers are capable of achieving good dispersion and stability in water, which can appreciably boost the functional performance of the polymers. For example, in the case where the polymer is a polymeric binder, the adhesive strength of a well-dispersed polymeric binder in water considerably increases, and thus brings about an enhancement in the binding capability of the polymeric binder.

In developing a method of separation of a polymer from a first suspension, one must first understand how the polymer of the present invention is capable of dissolving and/or dispersing into an aqueous solvent in forming the first suspension in the first place.

The dissolution of a polymer in an aqueous solvent in forming a first suspension is driven by the (1) intermolecular interactions (e.g. hydrogen bonding and ion-dipole interactions) between the polymer and the aqueous solvent, or more specifically between the ionized and/or uncharged species in the monomer(s) that contribute(s) to the make-up of the polymer and the polar molecules comprised within the aqueous solvent; and (2) uncoupling of a proportion of interactions between the water molecules in the aqueous solvent, occurred especially in regions that are in close proximity to the polymer. These interactions become dominant over the intermolecular interactions between the copolymer chains in the polymer and the intramolecular interactions within the copolymer chain, giving rise to the dissolution of a polymer in an aqueous solvent in forming a first suspension. In the process of dissolution or solvation, the polymer and the aqueous solvent are restructured into a solvation complex where the polymer is surrounded by a concentric shell of polar molecules within the aqueous solvent, leading to the stabilization of the polymer in the first suspension.

Hydrogen bonding among the polymer and the aqueous solvent depends on the ability of each to form hydrogen bond (i.e. accept and/or donate hydrogen bond).

In some embodiments, the polymer comprises a copolymer. In some embodiments, the copolymer comprises a structural unit (a) derived from an acid group-containing monomer and a structural unit (b) derived from a nitrile group-containing monomer. In some embodiments, the copolymer comprises a structural unit (a) derived from an acid group-containing monomer, a structural unit (b) derived from a nitrile group-containing monomer, a structural unit (c) derived from an amide group-containing monomer or combinations thereof. In some embodiments, the copolymer further comprises a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

Each of the above-mentioned monomers that can potentially constitute the make-up of the copolymer independently consists of either a strongly electronegative atom, particularly nitrogen (N), oxygen (O) or fluorine (F) atom (known as a hydrogen bond donor, Dn) that is covalently bonded to a hydrogen (H) atom or another electronegative atom bearing a lone pair of electrons in the outermost electron shell of the atom (known as a hydrogen bond acceptor, Ac). This allows the potential hydrogen bond formation with another molecule (e.g. water molecule present in the aqueous solvent) of the same feature. Therefore, each of the above-mentioned monomers independently comprises at least one hydrogen bond-forming group. A hydrogen bond forming system is generally denoted as Formula (1) below:

Dn-H . . . Ac            Formula (1)

wherein Dn is a hydrogen bond donor; Ac is a hydrogen bond acceptor; the solid line denotes a polar covalent bond and the dotted line indicates a hydrogen bond.

In some embodiments, structural unit (a) derived from an acid group-containing monomer comprises an acid salt group. In some embodiments, an acid salt group is a salt of an acid group. The anion of the acid salt group is capable of forming ion-dipole interactions with a partially positively charged species (for example a partial positive charge near the hydrogen atom of a water molecule, which stems from the uneven distribution of electron density in the water molecule). In some embodiments, structural unit (a) comprises an alkali metal acid salt group. Examples of an alkali metal forming the alkali metal acid salt include lithium, sodium and potassium. In some embodiments, structural unit (a) comprises an ammonium acid salt group.

In some embodiments, the aqueous solvent is a solution containing water as the major component and a volatile solvent, such as alcohols, lower aliphatic ketones, lower alkyl acetates or the like, as the minor component in addition to water. In some embodiments, the aqueous solvent consists solely of water.

The hydroxyl groups of water consist of a H atom covalently bonded to a more electronegative O atom and an electronegative O atom bearing a lone pair of electrons in the outmost electron shell, either of which is capable of forming hydrogen bond with another species (e.g. a monomer that assists in the construction of the polymer) that can interact via hydrogen bonding (i.e. molecule containing (i) a H atom which is covalently bonded to a hydrogen bond donor and/or (ii) a hydrogen bond acceptor). The ability of water in both accepting and donating hydrogen bonds makes it an excellent candidate in solvating a polymer.

In the case where the aqueous solvent comprises a minor component in addition to water that possesses hydrogen bond-forming capability, hydrogen bond interactions could also be established between the minor component and another hydrogen bond-forming molecule (e.g. a hydrogen bond-forming group of a monomer that contributes the make-up of the polymer).

In regions where the hydrogen bond-forming component(s) within the aqueous solvent are in the vicinity of the polymer (e.g. at the inner solvation shells around the polymer), hydrogen bonds formed between the hydrogen bond-forming molecules within the aqueous solvent break apart due to the emergence of comparatively stronger interactions between the polymer and the aqueous solvent. Conversely, hydrogen bonding interactions between molecules within the aqueous solvent remain in regions where these molecules are further apart from the polymer (e.g. at the outer solvation shells around the polymer).

The polarity of the aqueous solvent constituents is yet another most important factor in governing how well the aqueous solvent solvates the polymer. A polar molecule contains at least one polar bond formed due to the difference in electronegativities between the bonded atoms. As the electron pair(s) shared between the bonded atoms tend to be drawn closer to the atom with a higher electronegativity, an uneven distribution of the bonding electron pair(s) occurs. The more electronegative atom obtains a partial negative charge whereas the less electronegative atom has a partial positive charge. A bond dipole moment arises with this separation of positive and negative charges. In the case of a polyatomic molecule, the dipole moment of the molecule is the vector sum of all bond dipole moments present in the molecule. A polar molecule with two or more polar bonds has a net dipole as a result of opposing charges from polar bonds arranged asymmetrically in at least one direction, so that the bond dipole moments do not cancel each other. A water molecule, for example, is a polar molecule since the bond dipole moments present in the molecule do not cancel out, resulting in a net dipole.

The polar molecules (e.g. water molecules) within the aqueous solvent solvate a charged species in the polymer (e.g. an anion of the acid salt group of a monomer that assists in the construction of the polymer) by orientating the appropriate partially charged portion of the molecules towards the charged species through electrostatic attraction. This creates solvation shells (hydration shells in the case of water) around each charged species via the ion-dipole interactions between the polymer and the aqueous solvent and allows for the dissolution of the polymer in the aqueous solvent in forming a first suspension.

Hydrogen bonding and/or ion-dipole attractions are the two types of interactions primarily formed between the polymer and the aqueous solvent that bring about the formation of solvation complexes. Both of which independently contribute to a different extent to the dissolution of polymer depending on the molecular structure, composition and properties of the polymer and the aqueous solvent. Solvation of the polymer in the aqueous solvent could proceed through other means of intermolecular interactions, for instance via ionic interactions, London dispersion forces, dipole-dipole interactions, dipole-induced dipole interactions and ion-induced dipole interactions. However, in consideration of the molecular structure of the polymer, the principal electrostatic interactions that give rise to solvation of the polymer by the aqueous solvent occur via hydrogen bonding and/or ion-dipole interactions. The other interactions mentioned above that could possibly arise to a less extent between the polymer and the aqueous solvent may also be disrupted based on the proposed mechanism via the introduction of the precipitation agent to allow for the precipitation of the polymer. These interactions are not displayed for ease of interpretation.

FIG. 1 illustrates a schematic of an embodiment of the proposed interactions between a polymer and an aqueous solvent in a first suspension. The polymer compound in bold represents an embodiment of the polymer comprises a copolymer comprising structural units derived from a carboxylic acid group-containing monomer, a nitrile group-containing monomer and an amide group-containing monomer. The structural unit(s) derived from a carboxylic acid group-containing monomer in this case comprises a carboxylic salt group, wherein a carboxylic salt group is a salt of a carboxylic acid group. The aqueous solvent in this case comprises water.

Oxygen (O), nitrogen (N) and hydrogen (H) atoms present in the copolymer of polymer are likely to interact with the O and/or H atoms of the water molecules in the aqueous solvent via hydrogen bond formations. In addition, an ion-dipole interaction is exerted between the anion of the carboxylic salt group, $COO^-$ in this case, contained within polymer and the partial positive charge near the hydrogen atom of a water molecule in the aqueous solvent. Hydrogen bonding and/or ion-dipole attractions are the two types of interactions primarily formed between the polymer and the aqueous solvent in a first suspension and thus independently contribute considerably to the solvation and dissolution of the polymer by the aqueous solvent in forming a first suspension. In addition, hydrogen bonds initially formed between the water molecules within the aqueous solvent that are in close proximity to the polymer (i.e. at the inner solvation shells around the polymer) would disintegrate with the development of relatively stronger interactions between the polymer and the aqueous solvent. Meanwhile, hydrogen bonding between water molecules that are further away from the polymer (i.e. at the outer solvation shells around the polymer) persists with considerably less disruption exerted from interactions between the polymer and the aqueous solvent on these molecules.

The ability for the polymer to dissolve in water and uniformly distributed among the water molecules is found to substantially improve the specific functional performance of the polymer. The polymer disclosed herein is devised to possess such capabilities in its dissolution and exceptional dispersion in an aqueous solvent through the hydrogen bonding and/or ion-dipole interactions between the polymer and the aqueous solvent. The formulation of the polymer disclosed herein could be utilized as a polymeric binder to provide an exceptionally strong binding capability for various applications. In some embodiments, the copolymer of the polymer comprises a structural unit derived from an acid group-containing monomer and a structural unit derived from a hydrophobic group-containing monomer. In some embodiments, the polymer could be used for other purposes other than as a polymeric binder.

However, the dissolved and well-dispersed polymer within the first suspension poses an additional challenge in the separation of the water-soluble polymers from their respective first suspensions in the subsequent recycling stage as the polymer-containing product reaches its end of its lifespan or as the product rejects are generated during production.

Copolymers in polymers of different compositions that display varying specific properties would require different approaches in extraction by first disrupting the initially-formed solvation complexes to allow for the detachment of the copolymer from the aqueous solvent. Accordingly, the method of the present invention is specifically developed to precipitate a polymer from a first suspension. More specifically, the method of the present invention is developed to precipitate a copolymer comprising a structural unit derived from an acid group-containing monomer and a structural unit derived from a hydrophobic group-containing monomer from a first suspension. Optionally, the copolymer further comprises a structural unit derived from a hydrogen bond-forming group-containing monomer. The hydrogen bond-forming group-containing monomer may be an amide group-containing monomer, a hydroxyl group-containing monomer, an ester group-containing monomer, an epoxy group-containing monomer, a fluorine-containing monomer or combinations thereof.

The precipitation of a polymer disclosed herein is driven by two main events: (1) the various types of interactions that bring about the separation of the polymer from the aqueous solvent and (2) the subsequent structural transformation of the polymer.

Upon addition of a precipitation agent, the polymer is separated from the aqueous solvent in a first suspension via (i) bond disruption and/or breakage between the copolymer of polymer and the aqueous solvent; (ii) weakening of intermolecular attractions between molecules in the aqueous solvent in forming solvation complex; (iii) protonation of conjugate base of the acid group-containing monomer(s) that contribute the make-up of the polymer; (iv) formation of intramolecular interactions between various functional groups within a copolymer chain and (v) development of intermolecular interactions between the copolymer chains. Following the initiation of bond disruption between the copolymer of polymer and the aqueous solvent, the other types of interactions mentioned above that give rise to the separation of the polymer from the aqueous solvent occur in no particular order. The polymer disclosed herein then undergoes a coil-to-globule structural transformation.

The present invention provides a method for precipitating a polymer by adding a precipitation agent into the first suspension to form a second suspension; wherein the first suspension comprises a polymer and an aqueous solvent; and wherein the polymer comprises a copolymer comprising a structural unit derived from an acid group-containing monomer and a structural unit derived from a hydrophobic group-containing monomer.

In some embodiments, the precipitation agent is an acid. In some embodiments, the precipitation agent is a strong acid.

Acid strength refers to the tendency of an acid to dissociate in a solvent (most commonly water) into a proton and a conjugate base of the acid. The extent of ionization of an acid is usually quantified by its acid dissociation constant ($K_a$). Stronger acids have a larger $K_a$ and thus correspond to a smaller negative logarithm of the acid dissociation constant ($pK_a$, which is equal to $-\log K_a$) than weaker acids. The stronger the acid is, the more easily it loses a proton (i.e. hydrogen ion $H^+$), and vice versa.

In some embodiments, the first suspension disclosed herein comprises an aqueous solvent comprising water. With the addition of a strong acid into the first suspension disclosed herein in forming a second suspension, the dissociation of a strong acid in water is effectively complete with which the acid loses a proton and the water molecule takes up the proton in producing a hydroxonium ion ($H_3O^+$). The said strong acid dissociation reaction is generally denoted as:

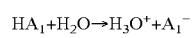

$$HA_1 + H_2O \rightarrow H_3O^+ + A_1^- \qquad \text{(Equation 1)}$$

wherein $HA_1$ is a strong acid utilized as a precipitation agent; $H_2O$ is a water molecule; $H_3O^+$ is a hydroxonium ion and $A_1^-$ is a conjugate base of the acid $HA_1$.

In some embodiments, the precipitation agent is a weak acid.

With the incorporation of a weak acid into the first suspension in forming a second suspension, the weak acid only partially dissociates with both the undissociated weak acid and its dissociation products present in the second suspension. The dissociation of the said weak acid is represented by the following equation:

$$HA_2 + H_2O \rightleftharpoons H_3O^+ + A_2^- \qquad \text{(Equation 2)}$$

wherein $HA_2$ is a weak acid utilized as a precipitation agent and $A_2^-$ is a conjugate base of the acid $HA_2$.

The dissociation of a weak acid in the second suspension involves reaction of water molecules with protons from the acid in generating hydroxonium ions.

The presence of the hydroxonium ions in the second suspension, regardless of being formed from the dissociation of a strong acid or a weak acid, removes the hydrogen bond-forming and ion-dipole interacting sites that are originally present in the water molecules which disrupts and breaks up the electrostatic attractions (i.e. hydrogen bonding and/or ion-dipole interactions) that were initially created between the polymer and the water molecules in the aqueous solvent. This results in the disintegration of the solvation shells that were formerly developed around the polymer, reducing the dissolution ability of the polymer in the aqueous solvent.

Furthermore, upon the formation of the hydroxonium ions accompanied with a noticeable reduction in water molecules in surrounding regions of the polymer in the second suspension, the hydrogen bonding between the water molecules at the solvation shells around the polymer are acutely diminished, further dismantling the solvation shells developed around the polymer.

On the other hand, the hydroxonium ions formed could protonate ionized species in the monomer(s) (e.g. the anion of an acid salt group-containing monomer) that contribute(s) to the make-up of the polymer. This might potentially promote the conversion of negatively charged species to their protonated uncharged form, as shown in the following equation:

$$A_3^- + H_3O^+ \rightleftharpoons HA_3 + H_2O \qquad \text{(Equation 3)}$$

wherein $HA_3$ is a monomer that assists in the construction of the polymer and $A_3^-$ is a conjugate base of the monomer $HA_3$.

In the case where the hydroxonium ions protonate anion(s) of an acid salt group-containing monomer that constitute the building block of the polymer, the acid salt group is transformed into an acid group.

To facilitate the preferential dissociation of the acid utilized as the precipitation agent and the uptake of the protons in the second suspension by the ionized species in the monomer(s) that contribute to the construction of the polymer, (1) the $pK_a$ value of the acid to be utilized as the precipitation agent should be lower than that of the acid group-containing monomer(s) that make up the polymer and (2) upon addition of the precipitation agent into the first suspension in forming a second suspension, the pH value of the second suspension should be sufficiently lower than the $pK_a$ value(s) of the acid group-containing monomer(s) that make up the polymer.

The $pK_a$ value quantifies the degree of dissociation of an acid in a solvent such as water. With a $pK_a$ value of the acid to be utilized as the precipitation agent lower than that of the acid group-containing monomer(s) that contribute the make-up of the polymer, the acid utilized as the precipitation agent has a stronger inclination to dissociate, shifting the equilibrium position of the reaction of Equation 2 to the right, with a higher likelihood of hydroxonium ions formed from the ionization of said acid upon contact of the acid with the first suspension. On the other hand, since the acid group-containing monomer(s) have a comparatively higher $pK_a$ value than that of acid utilized as precipitation agent, the conjugate base of the acid group-containing monomer(s) is more prone to protonation, with the equilibrium position of reaction of Equation 3 lying towards the right, taking up part of the hydroxonium ions formed from the dissociation of the acid utilized as precipitation agent.

Upon addition of acid that is utilized as precipitation agent into the first suspension, the acid undergoes dissociation in generating hydroxonium ions and leads to the formation of a second suspension. It would be highly desirable in attaining higher concentrations of hydroxonium ions in the second suspension in the present invention, which is driven by the utilization of stronger acids and/or the amount of acid as precipitation agent added to the first suspension. Presence of higher concentrations of hydroxonium ions in the second suspension not only aids the separation of the polymer from the aqueous solvent by assisting the bond disruption process, but also further shifts the equilibrium position of reaction of Equation 3 to the right and protonates the conjugate base of the acid group-containing monomer(s) that contribute to the construction of the polymer.

The pH value indicates the concentration of hydroxonium ions (equivalent to hydrogen ions) in a solution and can be calculated using the expression of $pH = \log[H_3O^+]$. It is used to specify the acidity or alkalinity of a solution. Solutions with higher concentrations of hydroxonium ions would have lower pH values, and vice versa. Thus, in order to achieve high concentrations of hydroxonium ions, the pH of the second suspension should be sufficiently low to enable the protonation of the majority of the conjugate base of the acid group-containing monomer(s). This could potentially eradicate the presence of charge-bearing conjugate base of the acid group-containing monomer(s) (e.g. acid salt group-containing monomer) and eliminate any further ion-dipole interactions between polymer and the aqueous solvent that are originally present in the first suspension.

With the disruption of the electrostatic attractions between the polymer and the aqueous solvent arising from the addition of the precipitation agent, the functional groups contained within the polymer have a higher affinity of interacting with each other. For example, the H atom of a carboxyl group in a polymer is likely to interact with the N atom of a nitrile group contained within the same polymer via hydrogen bonding interactions. Dipole-dipole interactions might also be found between the O atom of a carboxyl group in the polymer and the C atom of a nitrile group in the same polymer.

Furthermore, following the weakening of the intermolecular interactions between the polymer and the aqueous solvent, there is an inclination for the copolymer chains within the polymer to interact with one another. For instance, alignment of interacting pairs between the nitrile (C≡N) group of a copolymer chain and the carboxyl (COOH) group of another copolymer chain could proceed via formation of hydrogen bonds. Dipole-dipole interactions might also be found between the nitrile (C≡N) groups of different copolymer chains. Hydrogen bonding could also be formed between the hydroxyl (O—H) groups in the carboxyl (COOH) groups of different copolymer chains.

The separation of the polymer disclosed herein from the aqueous solvent is accomplished through the involvement of the various kinds of interactions mentioned above upon addition of a precipitation agent. The effect of which combined with the specific formulation of the polymer of the present invention allow for the coil-to-globule structural conformation of the polymer. The polymer can then be subsequently precipitated.

By governing a sufficiently low pH of the second suspension, the protonation of conjugate base of the acid group-containing monomer(s) that contribute the make-up of the polymer is highly favorable. This protonation reaction promotes a coil-to-globule structural transition of the polymer disclosed herein.

Prior to the addition of the precipitation agent, with the negatively charged species in the monomer(s) (e.g. anion(s) of an acid salt group-containing monomer) that contribute to the construction of the polymer carrying like charges, the negatively charged species effectively repel each other. The electrostatic repulsion of the ionized group(s) leads to the expansion of the charged polymer into a fully solvated open coil conformation.

With the addition of the precipitation agent that produces a second suspension of sufficiently low pH, the protonation of the majority of the conjugate base of the acid group-containing monomer(s) that contribute the make-up of the polymer converts the formerly charged polymer to its uncharged form where electrostatic repulsion is no longer exerted. This leads to severe weakening of the intermolecular interactions (particularly ion-dipole interactions) between the structural unit derived from an acid group-containing monomer and the aqueous solvent and initiates the aggregation of the polymer.

Moreover, the apparent intramolecular interactions between functional groups within a copolymer chain and the intermolecular interactions between the copolymer chains further promote the winding of the polymers and assist the transition of the polymers into a compact globular conformation.

In some embodiments, the polymer disclosed herein comprises a copolymer comprising a structural unit derived from an acid group-containing monomer and a structural unit derived from a hydrophobic group-containing monomer.

An acid group (e.g. a carboxylic acid group) is one of the crucial functional groups present in the polymer that is polar in nature because of the differences in electronegativities of carbon (C) atom and oxygen (O) atom in the carbonyl group and of oxygen (O) atom and hydrogen (H) atom in the hydroxyl group. The atoms possess unequal charge distributions and therefore have net dipole moment, making the acid group polar in nature. This allows the acid group to participate in hydrogen bond formation and/or dipole-dipole interactions. An acid group is highly hydrophilic, rendering the acid group to be extremely soluble in an aqueous solvent (e.g. water).

An example of a hydrophobic group-containing monomer is a nitrile group-containing monomer. The nitrile group is polar in nature due to the strong electronegativity of the nitrogen (N) atom contained within as compared to the carbon (C) atom. The electrons shared between the covalently bonded C and N are more strongly attracted towards the N atom than the C atom. The N atom therefore carries a partial negative charge and the C atom carries a partial positive charge, as shown in the form of $^{\delta+}C{\equiv}N^{\delta-}$, Many literatures classify polar groups and compounds as hydrophilic, while non-polar groups and compounds as hydrophobic. This clear-cut classification is effective for most polar compounds, such as alcohols and amides, but is not for some other polar compounds, with an exception being nitriles.

The nitrogen (N) atom of a nitrile group (—C≡N) has the potential to act as a proton (i.e. hydrogen ion) acceptor for hydrogen bond formation with water molecules in the aqueous solvent because of the presence of a lone-pair electron orbital. However, with the presence of only a hydrogen acceptor per nitrile group, the interactions created between the nitrile groups and the water molecules are remarkably weaker than that of between the other polar groups comprising at least one of each of hydrogen bond donor and hydrogen bond acceptor per group (e.g. acid group and amide group) and the water molecules. This provides an explanation to the exceptionally low water solubilities of nitriles such as polyacrylonitrile (PAN), where the behavior of the hydrophobic alkyl backbone dominates. This renders the nitrile group to be hydrophobic.

The presence of a hydrophobic functional group in a structural unit (e.g. a structural unit derived from a nitrile group-containing monomer) in the polymer disclosed herein exerts hydrophobic tendency towards the entire copolymer of the polymer. Depending on the proportion of hydrophobic group(s) contained within the polymer, the extent of hydrophobicity of the polymer could be determined. With a higher proportion of hydrophobic group(s) contained within the polymer, the more hydrophobic the polymer is, and thus the more insoluble the polymer is in water. With the polymer disclosed herein comprising a structural unit derived from a nitrile group-containing monomer exhibiting its hydrophobic property, the polymer further collapses into a dense globular structure, driven by contact surface area minimization between the polymer and water molecules in the aqueous solvent.

As a result, the combined effects of the (1) various types of interactions that bring about the separation of the polymer from the aqueous solvent, (2) presence of a hydrophobic structural unit in the polymer and (3) subsequent structural transformation of the polymer evoke the phase transition of the polymer into a compact solid globule and bring about the precipitation of the polymer. This pH-induced conformational transition of the polymer minimizes contacts between the polymer and water molecules in the aqueous solvent, which causes the polymer to be less permeable to the flow of the water molecules.

Figure 2:
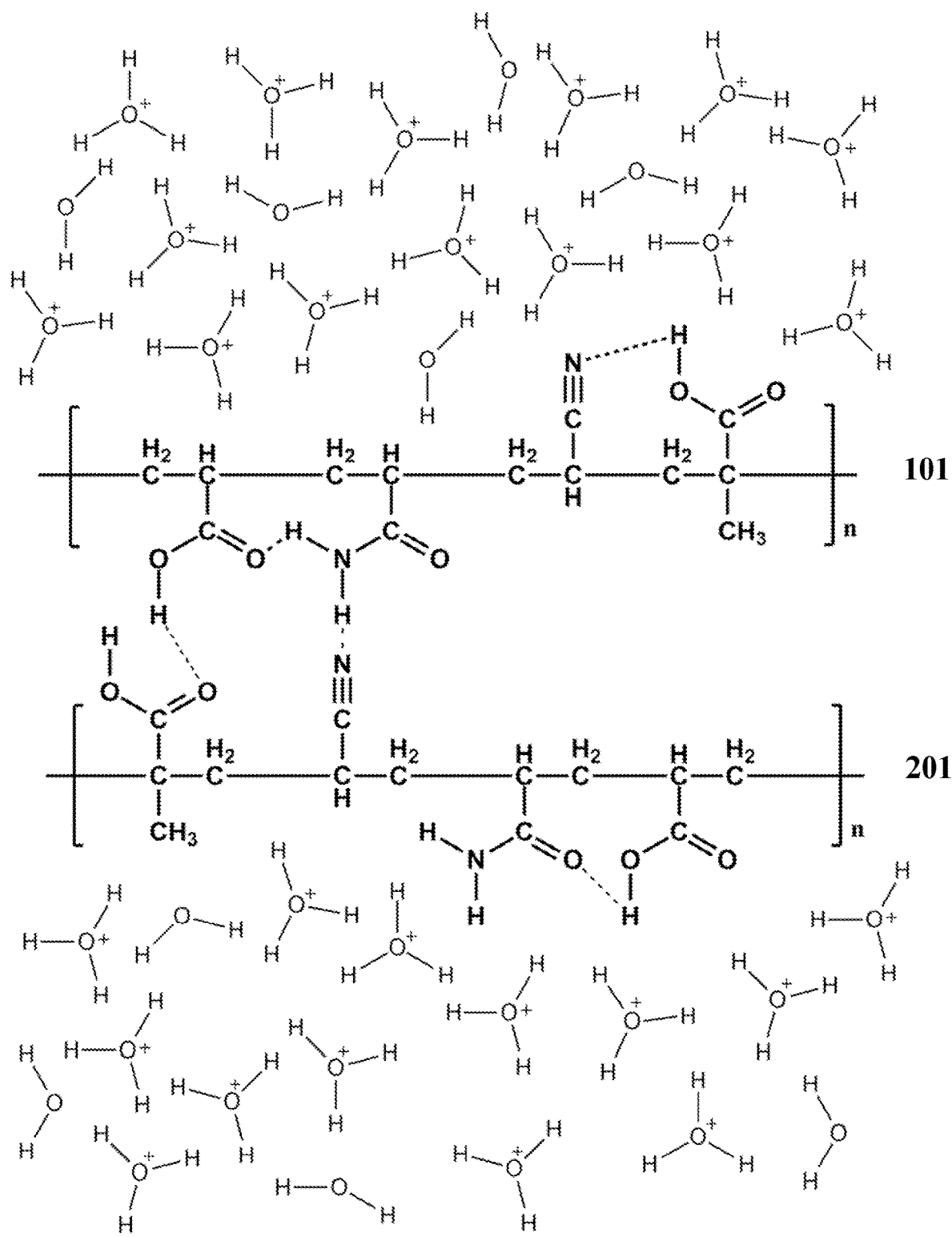
FIG. 2 illustrates a schematic of an embodiment of the proposed alterations in interactions between a polymer and an aqueous solvent as sufficient concentration of precipitation agent is added into the first suspension.

FIG. 2 illustrates a schematic of an embodiment of the proposed alterations in interactions between the polymer and the aqueous solvent outlined in FIG. 1 as sufficient concentration of precipitation agent is added into the first suspension. The polymer compound in bold represents an embodiment of the polymer comprises a copolymer comprising structural units derived from a carboxylic acid group-containing monomer, a nitrile group-containing monomer and an amide group-containing monomer. The precipitation agent in this case comprises hydrochloric acid, which is a type of strong acid; while the aqueous solvent in this scenario comprises water.

As hydrochloric acid is added into the first suspension, the complete dissociation of the hydrochloric acid in water occurs. The acid loses a proton and the water molecule takes up the proton and forms a hydroxonium ion, as shown below:

$$HCl + H_2O \rightarrow H_3O^+ + Cl^-  \quad \text{(Equation 4)}$$

The hydroxonium ions, generated from the ionization of the hydrochloric acid, eliminates most of the hydrogen bond-forming and ion-dipole interacting sites embedded in water molecules. This severely disrupts the intermolecular interactions that were originally established between the polymer and the water molecules as illustrated in FIG. 1. This diminishes the extent of solvation of the polymer by the water molecules in the second suspension.

With substantial reduction of water molecules in surrounding regions of the polymer in the second suspension arising from the formation of hydroxonium ions, the strength of hydrogen bonding between the water molecules at the solvation shells around the polymer is significantly weakened. The resulting demolition of the solvation shells developed around the polymer enables greater accessibility or exposure of the polymer to another polymer chain in developing electrostatic attractions.

The hydroxonium ions formed from the dissociation of the hydrochloric acid tend to protonate anions of the carboxylic salt group-containing monomers (salts of acrylic acid and methacrylic acid in this case as illustrated in FIG. 2) that contribute to the make-up of the polymer as described in FIG. 1. The protonation reaction of the carboxylic salt group-containing monomer is shown in Equation 5 below:

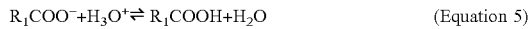
(Equation 5)

wherein $R_1COOH$ is a carboxylic acid group-containing monomer that assists in the construction of the polymer and $R_1COO^-$ is a conjugate base of the monomer $R_1COOH$ (i.e. a carboxylic salt group-containing monomer).

Figure 3:
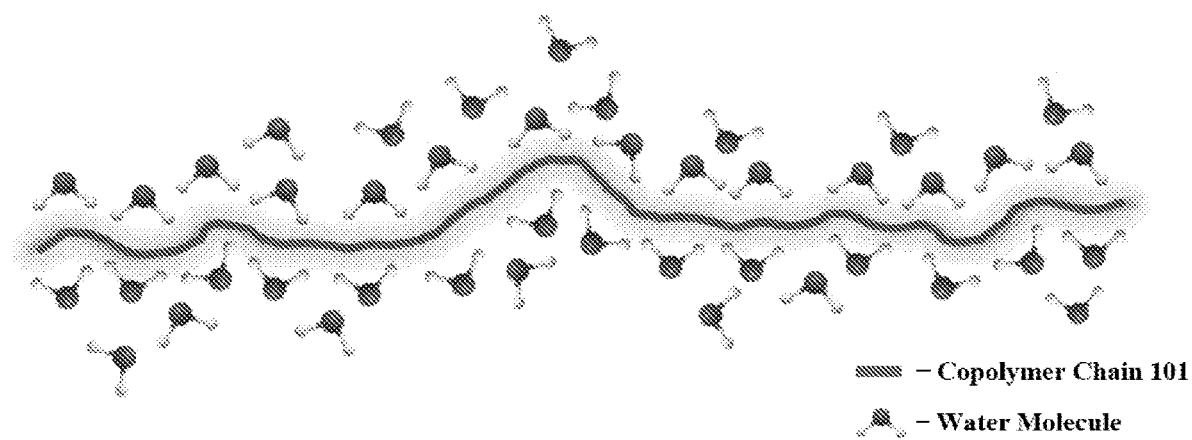
FIGS. 3A and 3B depict an embodiment of the structural conformations of a polymer before and after the addition of a precipitation agent into a first suspension respectively.
Figure 3:
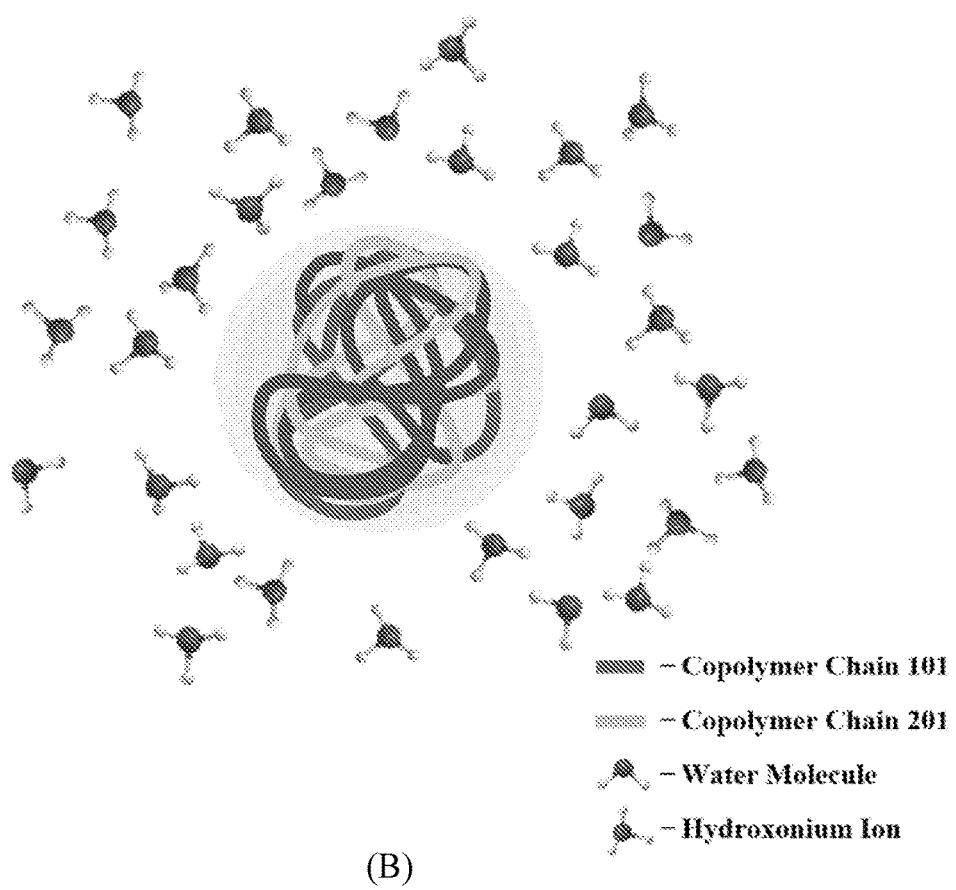

Prior to the incorporation of the hydrochloric acid into the first suspension, the anions of the carboxylic salt group-containing monomer that contribute to the construction of the polymer exert an electrostatic repulsion against each other which gives a charged polymer with a fully solvated coil structure. This coil-like structure of the charged polymer could be visualized in FIG. 3A. However, with the carboxylic salt group-containing monomer being subjected to protonation, the negatively charged acid salt group is transformed into an uncharged acid group in the monomer which constitutes the building block of the polymer. The absence of repulsion forces within the polymer initiates the winding motion of the polymer.

The acid group-containing monomer that assists in the make-up of the polymer as illustrated in FIG. 2 comprises an acrylic acid and a methacrylic acid. Acrylic acid has a $pK_a$ value of 4.3, while the $pK_a$ value of methacrylic acid is 4.7. The $pK_a$ of hydrochloric acid is −6.3. With the $pK_a$ value of hydrochloric acid (HCl) being substantially smaller than that of both acrylic acid and methacrylic acid (i.e. −6.3 ($pK_a$ of HCl)<<4.3 ($pK_a$ of acrylic acid) and 4.7 ($pK_a$ of methacrylic acid)), hydrochloric acid has a much stronger inclination to dissociate in forming hydroxonium ions. The strength of hydrochloric acid is extremely high that complete dissociation is observed, as demonstrated in Equation 4. Conversely, the salts of acrylic acid and methacrylic acid are more susceptible to protonation, shifting the reaction equilibrium of Equation 5 towards the right. The protonation of the salts of acrylic acid and methacrylic acid takes up a portion of the protons generated from the dissociation of hydrochloric acid in forming acrylic acid and methacrylic acid.

In FIG. 2, upon addition of hydrochloric acid into the first suspension, the acid undergoes ionization and generates hydroxonium ions and leads to the formation of a second suspension. The pH of the second suspension in this case is 2, which implies the presence of a high concentration of hydroxonium ions in the second suspension. This further shifts the equilibrium position of reaction of Equation 5 to the right, converts the majority of the salts of acrylic acid and methacrylic acid into their uncharged acid forms and eradicates any further ion-dipole interactions between the carboxylic salt group-containing monomers and the water molecules that were originally present in the first suspension.

Following the disruption of the electrostatic interactions between the polymer and the water molecules in the aqueous solvent arising from the addition of the hydrochloric acid, the N atom of the nitrile group in copolymer chain 101 is found to interact with the H atom of the carboxyl group in the same copolymer chain via hydrogen bonding interactions. Furthermore, hydrogen bond is formed between the H atom of the amide group and the O atom of the carbonyl group of the carboxyl group within copolymer chain 101. Meanwhile, hydrogen bonding is also developed between the H atom of the carboxyl group and the O atom of the amide group within copolymer chain 201.

Interactions do not only occur between the various functional groups within the same copolymer chain but also between different copolymer chains. Hydrogen bond is formed between the hydroxyl (O—H) group in the carboxyl group of copolymer chain 101 and the carbonyl (C═O) group in the carboxyl group of copolymer chain 201. In addition, the N—H group of the amide group of copolymer chain 101 interacts with the nitrile (C≡N) group of copolymer chain 201 via hydrogen bonding interactions.

The independent intramolecular interactions between functional groups within copolymer chain 101 and copolymer chain 201 and the intermolecular interactions between the copolymer chains further promotes the coiling of the polymer into a dense globular conformation and induces the precipitation of the polymer. This globular structure of the uncharged polymer could be visualized in FIG. 3B, which displays an embodiment of the structural conformation of the polymer after the addition of a precipitation agent into a first suspension.

Figure 4:
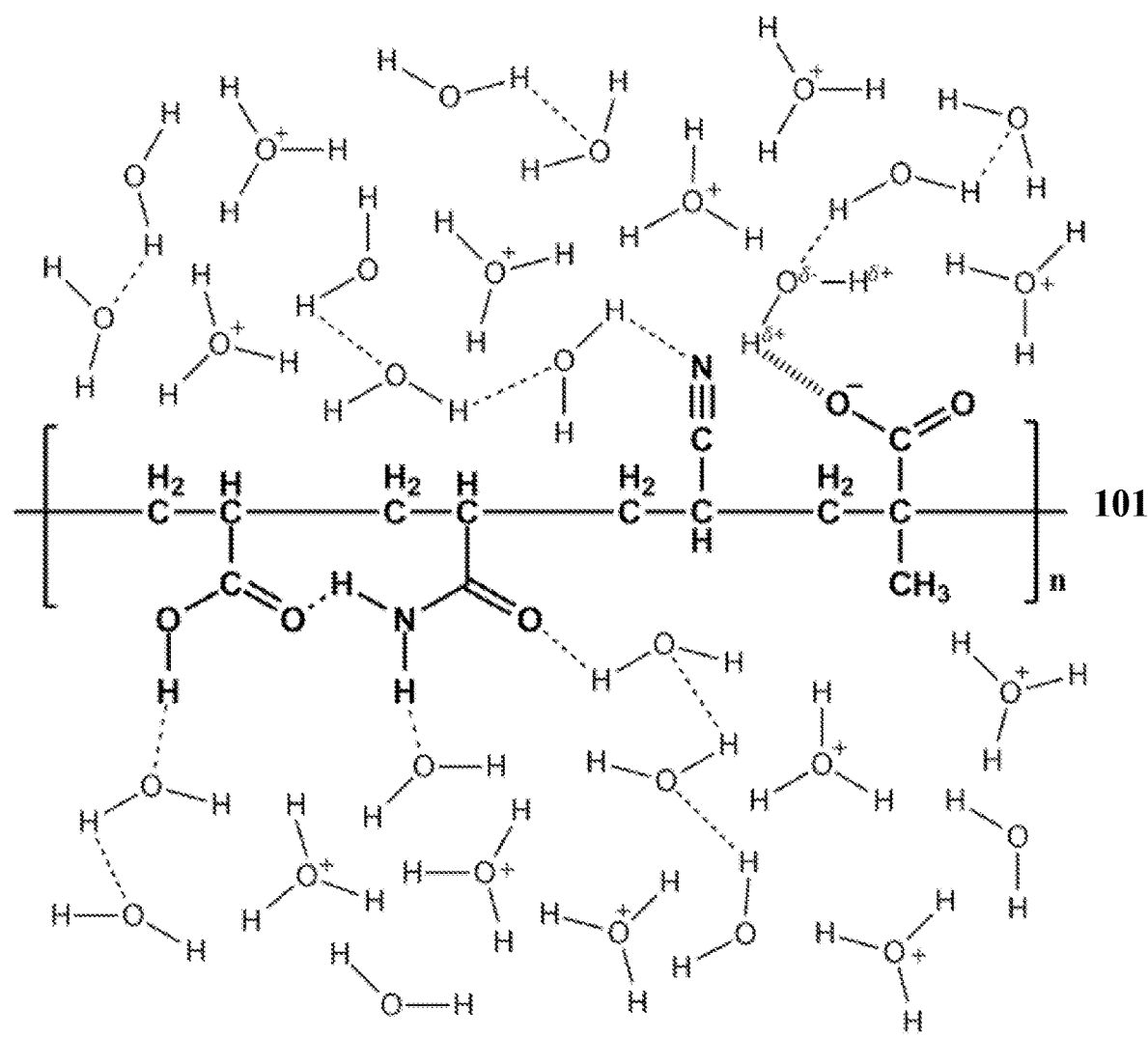
FIG. 4 illustrates a schematic of an embodiment of the proposed alterations in interactions between a polymer and an aqueous solvent as insufficient concentration of precipitation agent is added into the first suspension.

FIG. 4 illustrates a schematic of an embodiment of the proposed alterations in interactions between the polymer and the aqueous solvent outlined in FIG. 1 with the addition of an insufficient amount or concentration of precipitation agent into the first suspension, forming a second suspension of a higher pH. The polymer compound in bold represents an embodiment of the polymer comprises a copolymer comprising structural units derived from a carboxylic acid group-containing monomer, a nitrile group-containing monomer and an amide group-containing monomer. The precipitation agent in this case comprises hydrochloric acid, which is a type of strong acid; while the aqueous solvent in this scenario comprises water.

The hydrochloric acid dissociates and generates hydroxonium ions upon addition of the acid into the first suspension in forming a second suspension. Despite the utilization of a strong acid as the precipitation agent, the acid used is rather diluted, and thus the pH of the second suspension in this case is 5, which implies the presence of a significantly lower concentration of hydroxonium ions in the second suspension than that of in FIG. 2.

The low concentration of hydroxonium ions in the second suspension is insufficient in breaking up the intermolecular attractions that were formerly developed between the polymer and the water molecules as shown in FIG. 1. There are segments of the polymer that are still solvated by the water molecules. Moreover, part of the hydrogen bonds formed between the water molecules at the solvation shells around the copolymer chain remain, which impedes the access of the copolymer chain to other copolymer chains in developing interactions. The acid group-containing monomer that assists in the make-up of the polymer as illustrated in FIG. 4 comprises an acrylic acid and a methacrylic acid. The small amount of hydroxonium ions in the second suspension is only capable of transforming a portion of the salts of acrylic acid and methacrylic acid into their uncharged acid forms. This allows some of the ion-dipole interactions between the acid salt group-containing monomers and the water molecules to persist in the first suspension. Furthermore, intramolecular attractions between functional groups within the same copolymer chain occur in a lesser extent which arises from the inadequate bond disruption between the polymer and the water molecules. All of these circumstances make the coil-to-globule structural conformation of the polymer particularly challenging, and thus the precipitation of the polymer could not be achieved.

Figure 5:
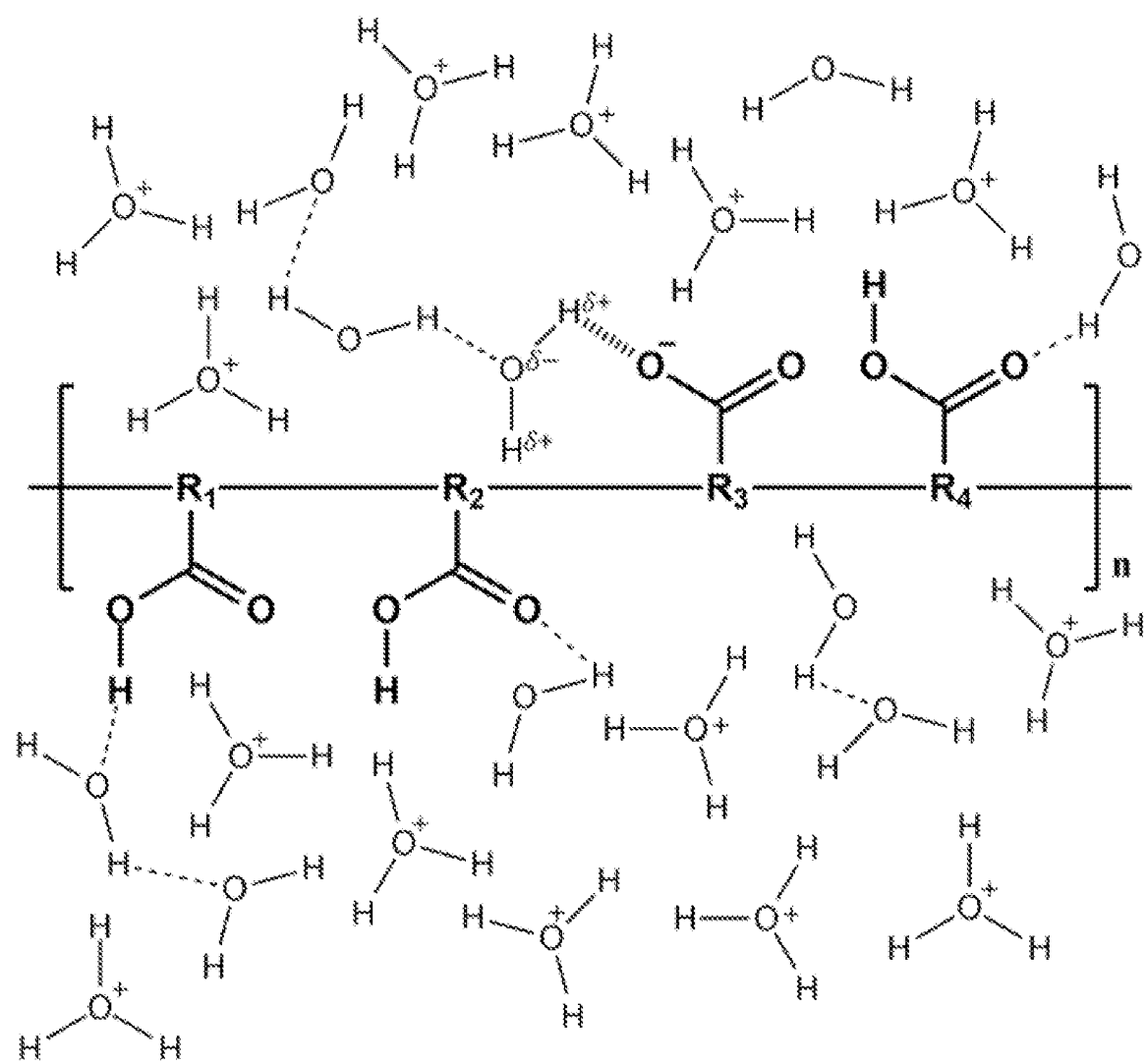
FIG. 5 illustrates a schematic of an embodiment of the proposed alterations in interactions between a polymer which comprises a copolymer comprising structural unit(s) derived from one or more carboxylic acid group-containing monomer(s) and an aqueous solvent as sufficient concentration of precipitation agent is added into the first suspension.

FIG. 5 illustrates a schematic of an embodiment of the proposed alterations in interactions between a polymer which comprises a copolymer comprising structural unit(s) derived from one or more carboxylic acid group-containing monomer(s) and the aqueous solvent as sufficient concentration of precipitation agent is added into the first suspension. The polymer compound in bold represents the polymer. The precipitation agent in this case comprises hydrochloric acid, which is a type of strong acid; while the aqueous solvent in this scenario comprises water. The denotation $R_1$, $R_2$, $R_3$ and $R_4$ in FIG. 5 independently has the general formula $C_nH_{2n}$, where n is an integer that is greater than 0. The H atoms in the above general formula can be unsubstituted or substituted with one or more suitable substituents and does not affect the functionality of the entire polymer. Each of $R_1$, $R_2$, $R_3$ and $R_4$ can be independently the same or different from one another.

Upon the addition of hydrochloric acid into the first suspension, the acid dissociates and produces hydroxonium ions, leading to the formation of a second suspension. However, with the entire copolymer chain comprising structural unit(s) derived from only acid group-containing monomer(s), a large amount of the protons is taken up to protonate the acid salt groups of the polymer into acid groups. Therefore, a considerable amount of hydroxonium ions is reverted into water molecules in regions near the polymer which allows the formation of hydrogen bonds between the acid group-containing monomer(s) that assists in the construction of the polymer and the water molecules. In addition, there might also be segments of acid salt groups of the polymer not being subjected to protonation due to the nature of equilibrium, orientations of the involved parties and also the comparatively higher demands in protonation since the entire copolymer chain comprising a structural unit derived from only acid group-containing monomer(s). This enables the acid salt group-containing monomer(s) to still be capable of interacting with the water molecules via ion-dipole interactions. The failure in completely disrupting the electrostatic attractions between the polymer and the water molecules makes the precipitation of the polymer unattainable. This provides a justification for the incapability of polyacrylic acid (PAA) to precipitate in a first suspension.

The method of the present invention is specifically developed to precipitate a polymer, wherein the polymer comprises a copolymer comprising a structural unit (a) derived from an acid group-containing monomer and a structural unit derived from a hydrophobic group-containing monomer. Based on our studies, the absence of either one of a structural unit derived from an acid group-containing monomer or a hydrophobic group-containing monomer in the polymer, the precipitation of the polymer would not occur. An example of a hydrophobic group-containing monomer is a nitrile group-containing monomer. In the case where a structural unit derived from an acid group-containing monomer is absent in the polymer, the polymer comprising only a structural unit derived from a nitrile group-containing monomer would be inherently hydrophobic throughout the entire polymer chain, and thus would not be miscible with water to begin with. This polymer type is known as non-aqueous polymer. The method of the present invention is not applicable to the precipitation of a non-aqueous polymer. In another case where a structural unit derived from a hydrophobic group-containing monomer such as a nitrile group-containing monomer is withdrawn from the polymer, with the addition of a precipitation agent into the first suspension, the polymer comprising only a structural unit derived from an acid group-containing monomer could not be separated from the aqueous solvent and undergo a coil-to-globule structural transformation, and hence there is no observable precipitation of the polymer. As mentioned above, separation between the acid group-containing monomer(s) and the aqueous solvent could be not achieved since the intermolecular attractions between the polymer and the water molecules persist despite the addition of a precipitation agent into the first suspension. Failure to undergo structural conformation is attributed to the absence of a hydrophobic functional group in a structural unit in the polymer which is required to trigger the polymer structural transformation, initiating the phase transitional process and thus leading to precipitation of the polymer. For that reason, in order to produce a successful precipitation of a polymer, the presence of both of a structural unit (a) derived from an acid group-containing monomer and a structural unit derived from a hydrophobic group-containing monomer in the copolymer of the polymer is recommended.

In some embodiments, the first suspension comprises a polymer and an aqueous solvent. In some embodiments, the polymer comprises a copolymer. The polymer is soluble in water and some other aqueous solvents.

In some embodiments, the copolymer comprises at least one structural unit derived from a polar group-containing monomer. Structural units derived from monomers containing at least one polar group govern the types and strength of the intermolecular interactions (e.g. dipole-dipole interactions and hydrogen bonding) developed between the polymer and the aqueous solvent and could possibly enhance the dissolution of the polymer in an aqueous solvent in forming a first suspension.

Structural units derived from an acid group-containing monomer, a nitrile group-containing monomer, an amide group-containing monomer, a hydroxyl group-containing monomer, an ester group-containing monomer, an epoxy group-containing monomer, a fluorine-containing monomer or combinations thereof comprised within the copolymer in the polymer constitute some non-limiting examples of functional groups that can form intermolecular interactions (e.g. hydrogen bonding) with the constituents of the aqueous solvent.

In some embodiments, the polar group-containing monomer is selected from the group consisting of an acid group-containing monomer and a nitrile group-containing monomer. In some embodiments, the polar group-containing monomer is selected from the group consisting of an acid group-containing monomer, a nitrile group-containing monomer, an amide group-containing monomer or combinations thereof. In some embodiments, the polar group-containing monomer is selected from the group consisting of an acid group-containing monomer, a nitrile group-containing monomer, an amide group-containing monomer, a hydroxyl group-containing monomer, an ester group-containing monomer, an epoxy group-containing monomer, a fluorine-containing monomer or combinations thereof. In some embodiments, the polar group-containing monomer is selected from the group consisting of an amide group-containing monomer, a hydroxyl group-containing monomer, an ester group-containing monomer, an epoxy group-containing monomer, a fluorine-containing monomer or combinations thereof. In some embodiments, the copolymer does not comprise a structural unit derived from an amide group-containing monomer, a hydroxyl group-containing monomer, an ester group-containing monomer, an epoxy group-containing monomer, a fluorine-containing monomer or combinations thereof.

In some embodiments, the proportion of structural unit derived from a polar group-containing monomer is from about 40% to about 100%, from about 45% to about 100%, from about 50% to about 100%, from about 55% to about 100%, from about 60% to about 100%, from about 65% to about 100%, from about 70% to about 100%, from about 40% to about 95%, from about 45% to about 95%, from about 50% to about 95%, from about 55% to about 95%, from about 60% to about 95%, from about 65% to about 95%, from about 40% to about 90%, from about 45% to about 90%, from about 50% to about 90%, from about 55% to about 90%, from about 60% to about 90%, from about 40% to about 85%, from about 45% to about 85%, from about 50% to about 85%, from about 55% to about 85%, from about 40% to about 80%, from about 45% to about 80%, from about 50% to about 80%, from about 40% to about 75%, from about 40% to about 70% or from about 45% to about 75% by mole, based on the total number of moles of monomeric units in the copolymer in the polymer.

In some embodiments, the proportion of structural unit derived from a polar group-containing monomer is less than 100%, less than 95%, less than 90%, less than 85%, less than 80%, less than 75%, less than 70%, less than 65%, less than 60%, less than 55%, less than 50% or less than 45% by mole, based on the total number of moles of monomeric units in the copolymer in the polymer. In some embodiments, the proportion of structural unit derived from a polar group-containing monomer is more than 40%, more than 45%, more than 50%, more than 55%, more than 60%, more than 65%, more than 70%, more than 75%, more than 80%, more than 85%, more than 90% or more than 95% by mole, based on the total number of moles of monomeric units in the copolymer in the polymer.

In some embodiments, the polymer comprises a copolymer comprising at least one structural unit derived from a hydrophilic group-containing monomer and at least one structural unit derived from a hydrophobic group-containing monomer.

In some embodiments, the hydrophilic group-containing monomer is selected from the group consisting of an acid group-containing monomer. In some embodiments, the hydrophilic group-containing monomer is selected from the group consisting of an acid group-containing monomer, an amide group-containing monomer, a hydroxyl group-containing monomer or combinations thereof. In some embodiments, the hydrophilic group-containing monomer is selected from the group consisting of an amide group-containing monomer, a hydroxyl group-containing monomer or combinations thereof. In some embodiments, the hydrophobic group-containing monomer is selected from the group consisting of a nitrile group-containing monomer, an ester group-containing monomer, an epoxy group-containing monomer, a fluorine-containing monomer or combinations thereof.

Hydrophilic functional group(s) are extremely soluble in water. The presence of a hydrophilic functional group in a structural unit in the polymer provides extents of hydrophilic features towards the overall properties of the entire copolymer chain of the polymer, potentially improving the solubility of the polymer in water. Hence, the proportion of structural unit derived from a hydrophilic group-containing monomer in the copolymer is critical in regulating the dissolution of the polymer in the aqueous solvent. When there is an inadequate proportion of hydrophilic group-containing monomer that contributes the make-up of the polymer, solvation of the polymer cannot take place and the polymer will remain undissolved in the aqueous solvent. This polymer type is designated as a non-aqueous polymer. The application of the method of the present invention to precipitate a non-aqueous polymer is thus not necessary. However, in the case where there is an excessively high proportion of structural unit derived from a hydrophilic group-containing monomer in the copolymer, the polymer would remain dissolved in the aqueous solvent with the addition of a precipitation agent into the first suspension due to the unfeasible separation of the excessive amount of hydrophilic group-containing monomer(s) and the aqueous solvent.

Meanwhile, hydrophobic functional group(s) in the polymer exert extents of hydrophobic effect to the polymer which allows the aggregation of segment(s) of the polymer to avoid contact with water molecules or an aqueous solvent. A structural unit derived from a hydrophobic group-containing monomer provokes the winding of the polymer into a globular structural conformation. With a deficiency in structural unit derived from a hydrophobic group-containing monomer in the copolymer, the polymer would not be capable of undergoing a coil-to-globule structural transformation due to the lack of a hydrophobic functional group that is required to trigger the change in polymer conformation and initiate phase transition of the polymer. On the other hand, with an excessively high proportion of structural unit derived from a hydrophobic group-containing monomer in the copolymer, the polymer would be extremely insoluble in water and deemed as a non-aqueous polymer. Such polymer would not be covered by the scope of the present invention.

In some embodiments, the proportion of each of structural unit derived from a hydrophilic group-containing monomer and structural unit derived from a hydrophobic group-containing monomer is independently from about 0% to about 85%, from about 0% to about 80%, from about 0% to about 75%, from about 0% to about 70%, from about 0% to about 65%, from about 0% to about 60%, from about 0% to about 55%, from about 0% to about 50%, from about 0% to about 45%, from about 0% to about 40%, from about 0% to about 35%, from about 5% to about 85%, from about 5% to about 80%, from about 5% to about 75%, from about 5% to about 70%, from about 5% to about 65%, from about 5% to about 60%, from about 5% to about 55%, from about 5% to about 50%, from about 5% to about 45%, from about 5% to about 40%, from about 5% to about 35%, from about 10% to about 85%, from about 10% to about 80%, from about 10% to about 75%, from about 10% to about 70%, from about 10% to about 65%, from about 10% to about 60%, from about 10% to about 55%, from about 10% to about 50%, from about 10% to about 45%, from about 10% to about 40%, from about 10% to about 35%, from about 15% to about 85%, from about 15% to about 80%, from about 15% to about 75%, from about 15% to about 70%, from about 15% to about 65%, from about 15% to about 60%, from about 15% to about 55%, from about 15% to about 50%, from about 15% to about 45%, from about 15% to about 40%, from about 15% to about 35%, from about 20% to about 85%, from about 20% to about 80%, from about 20% to about 75%, from about 20% to about 70%, from about 20% to about 65%, from about 20% to about 60%, from about 20% to about 55%, from about 20% to about 50%, from about 25% to about 85%, from about 25% to about 80%, from about 25% to about 75%, from about 25% to about 70%, from about 25% to about 65%, from about 25% to about 60%, from about 25% to about 55%, from about 25% to about 50%, from about 30% to about 85%, from about 30% to about 80%, from about 30% to about 75%, from about 30% to about 70%, from about 30% to about 65%, from about 30% to about 60%, from about 30% to about 55%, from about 30% to about 50%, from about 35% to about 85%, from about 35% to about 80%, from about 35% to about 75%, from about 35% to about 70%, from about 35% to about 65%, from about 35% to about 60%, from about 35% to about 55%, from about 40% to about 85%, from about 40% to about 80%, from about 40% to about 75%, from about 40% to about 70%, from about 40% to about 65%, from about 40% to about 60%, from about 45% to about 85%, from about 45% to about 80%, from about 45% to about 75%, from about 45% to about 70%, from about 45% to about 65%, from about 50% to about 85%, from about 50% to about 80%, from about 50% to about 75%, from about 50% to about 70%, from about 55% to about 85%, from about 55% to about 80%, from about 55% to about 75%, from about 60% to about 85%, from about 60% to about 80%, from about 65% to about 85% or from about 70% to about 85% by mole, based on the total number of moles of monomeric units in the copolymer in the polymer.

In some embodiments, the proportion of each of structural unit derived from a hydrophilic group-containing monomer and structural unit derived from a hydrophobic group-containing monomer is independently less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10% or less than 5% by mole, based on the total number of moles of monomeric units in the copolymer in the polymer. In some embodiments, the proportion of each of structural unit derived from a hydrophilic group-containing monomer and structural unit derived from a hydrophobic group-containing monomer is independently more than 0%, more than 5%, more than 10%, more than 15%, more than 20%, more than 25%, more than 30%, more than 35%, more than 40%, more than 45%, more than 50%, more than 55%, more than 60%, more than 65%, more than 70%, more than 75% or more than 80% by mole, based on the total number of moles of monomeric units in the copolymer in the polymer.

In some embodiments, the hydrophilic group-containing monomer is selected from the group consisting of an acid group-containing monomer, an amide group-containing monomer, a hydroxyl group-containing monomer or combinations thereof. The ratio in the proportion of the structural unit derived from a hydrophilic group-containing monomer to the proportion of the structural unit derived from a hydrophobic group-containing monomer in the copolymer is delicate and is integral to the likelihood of the polymer in undergoing conformational change with the addition of a precipitation agent into the first suspension. In some embodiments, the molar ratio of the structural unit derived from a hydrophilic group-containing monomer to the structural unit derived from a hydrophobic group-containing monomer in the copolymer is from about 0.1 to about 6.5, from about 0.1 to about 6.4, from about 0.1 to about 6.2, from about 0.1 to about 6, from about 0.1 to about 5.8, from about 0.1 to about 5.6, from about 0.1 to about 5.4, from about 0.1 to about 5.2, from about 0.1 to about 5, from about 0.1 to about 4.8, from about 0.1 to about 4.6, from about 0.1 to about 4.4, from about 0.1 to about 4.2, from about 0.1 to about 4, from about 0.1 to about 3.8, from about 0.1 to about 3.6, from about 0.1 to about 3.4, from about 0.1 to about 3.2, from about 0.1 to about 3, from about 0.1 to about 2.8, from about 0.1 to about 2.6, from about 0.1 to about 2.4, from about 0.1 to about 2.2, from about 0.1 to about 2, from about 0.2 to about 6.5, from about 0.2 to about 6.4, from about 0.2 to about 6.2, from about 0.2 to about 6, from about 0.2 to about 5.8, from about 0.2 to about 5.6, from about 0.2 to about 5.4, from about 0.2 to about 5.2, from about 0.2 to about 5, from about 0.2 to about 4.8, from about 0.2 to about 4.6, from about 0.2 to about 4.4, from about 0.2 to about 4.2, from about 0.2 to about 4, from about 0.2 to about 3.8, from about 0.2 to about 3.6, from about 0.2 to about 3.4, from about 0.2 to about 3.2, from about 0.2 to about 3, from about 0.2 to about 2.8, from about 0.2 to about 2.6, from about 0.2 to about 2.4, from about 0.2 to about 2.2, from about 0.2 to about 2, from about 0.3 to about 6.5, from about 0.3 to about 6.4, from about 0.3 to about 6.2, from about 0.3 to about 6, from about 0.3 to about 5.8, from about 0.3 to about 5.6, from about 0.3 to about 5.4, from about 0.3 to about 5.2, from about 0.3 to about 5, from about 0.3 to about 4.8, from about 0.3 to about 4.6, from about 0.3 to about 4.4, from about 0.3 to about 4.2, from about 0.3 to about 4, from about 0.3 to about 3.8, from about 0.3 to about 3.6, from about 0.3 to about 3.4, from about 0.3 to about 3.2, from about 0.3 to about 3, from about 0.3 to about 2.8, from about 0.3 to about 2.6, from about 0.3 to about 2.4, from about 0.3 to about 2.2, from about 0.3 to about 2, from about 0.4 to about 6.5, from about 0.4 to about 6.4, from about 0.4 to about 6.2, from about 0.4 to about 6, from about 0.4 to about 5.8, from about 0.4 to about 5.6, from about 0.4 to about 5.4, from about 0.4 to about 5.2, from about 0.4 to about 5, from about 0.4 to about 4.8, from about 0.4 to about 4.6, from about 0.4 to about 4.4, from about 0.4 to about 4.2, from about 0.4 to about 4, from about 0.4 to about 3.8, from about 0.4 to about 3.6, from about 0.4 to about 3.4, from about 0.4 to about 3.2, from about 0.4 to about 3, from about 0.4 to about 2.8, from about 0.4 to about 2.6, from about 0.4 to about 2.4, from about 0.4 to about 2.2, from about 0.4 to about 2, from about 0.5 to about 6.5, from about 0.5 to about 6.4, from about 0.5 to about 6.2, from about 0.5 to about 6, from about 0.5 to about 4.8, from about 0.5 to about 4.6, from about 0.5 to about 4.4, from about 0.5 to about 4.2, from about 0.5 to about 4, from about 0.5 to about 3.8, from about 0.5 to about 3.6, from about 0.5 to about 3.4, from about 0.5 to about 3.2, from about 0.5 to about 3, from about 0.5 to about 2.8, from about 0.5 to about 2.6, from about 0.5 to about 2.4, from about 0.5 to about 2.2, from about 0.5 to about 2, from about 0.7 to about 6, from about 0.7 to about 5.5, from about 0.7 to about 5, from about 0.7 to about 4.5, from about 0.7 to about 4, from about 0.7 to about 3.5, from about 1 to about 6, from about 1 to about 5.5, from about 1 to about 5, from about 1 to about 4.5, from about 1 to about 4 or from about 1 to about 3.5.

In some embodiments, the molar ratio of the structural unit derived from a hydrophilic group-containing monomer to the structural unit derived from a hydrophobic group-containing monomer in the copolymer is less than 6.5, less than 6.4, less than 6.3, less than 6.2, less than 6.1, less than 6, less than 5.9, less than 5.8, less than 5.7, less than 5.6, less than 5.5, less than 5.4, less than 5.3, less than 5.2, less than 5.1, less than 5, less than 4.9, less than 4.8, less than 4.7, less than 4.6, less than 4.5, less than 4.4, less than 4.3, less than 4.2, less than 4.1, less than 4, less than 3.9, less than 3.8, less than 3.7, less than 3.6, less than 3.5, less than 3.4, less than 3.3, less than 3.2, less than 3.1, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4, less than 0.3 or less than 0.2. In some embodiments, the molar ratio of the structural unit derived from a hydrophilic group-containing monomer to the structural unit derived from a hydrophobic group-containing monomer in the copolymer is more than 0.1, more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8, more than 1.9, more than 2, more than 2.1, more than 2.2, more than 2.3, more than 2.4, more than 2.5, more than 2.6, more than 2.7, more than 2.8, more than 2.9, more than 3, more than 3.1, more than 3.2, more than 3.3, more than 3.4, more than 3.5, more than 3.6, more than 3.7, more than 3.8, more than 3.9, more than 4, more than 4.1, more than 4.2, more than 4.3, more than 4.4, more than 4.5, more than 4.6, more than 4.7, more than 4.8, more than 4.9, more than 5, more than 5.1, more than 5.2, more than 5.3, more than 5.4, more than 5.5, more than 5.6, more than 5.7, more than 5.8, more than 5.9, more than 6, more than 6.1, more than 6.2, more than 6.3 or more than 6.4.

In some embodiments, the molar ratio of the structural unit derived from an acid group-containing monomer to the structural unit derived from a hydrophobic group-containing monomer in the copolymer is from about 0.1 to about 3, from about 0.1 to about 2.9, from about 0.1 to about 2.8, from about 0.1 to about 2.7, from about 0.1 to about 2.6, from about 0.1 to about 2.5, from about 0.1 to about 2.4, from about 0.1 to about 2.3, from about 0.1 to about 2.2, from about 0.15 to about 3, from about 0.15 to about 2.9, from about 0.15 to about 2.8, from about 0.15 to about 2.7, from about 0.15 to about 2.6, from about 0.15 to about 2.5, from about 0.15 to about 2.4, from about 0.15 to about 2.3, from about 0.15 to about 2.2, from about 0.2 to about 3, from about 0.2 to about 2.9, from about 0.2 to about 2.8, from about 0.2 to about 2.7, from about 0.2 to about 2.6, from about 0.2 to about 2.5, from about 0.2 to about 2.4, from about 0.2 to about 2.3, from about 0.2 to about 2.2, from about 0.25 to about 3, from about 0.25 to about 2.9, from about 0.25 to about 2.8, from about 0.25 to about 2.7, from about 0.25 to about 2.6, from about 0.25 to about 2.5, from about 0.25 to about 2.4, from about 0.25 to about 2.3 or from about 0.25 to about 2.2.

In some embodiments, the molar ratio of the structural unit derived from an acid group-containing monomer to the structural unit derived from a hydrophobic group-containing monomer in the copolymer is less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4, less than 0.3 or less than 0.2.

In some embodiments, the molar ratio of the structural unit derived from an acid group-containing monomer to the structural unit derived from a hydrophobic group-containing monomer in the copolymer is more than 0.1, more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8 or more than 1.9.

In some embodiments, the copolymer comprises a structural unit (a) derived from an acid group-containing monomer and a structural unit (b) derived from a nitrile group-containing monomer. In some embodiments, the copolymer comprises a structural unit (a) derived from an acid group-containing monomer, a structural unit (b) derived from a nitrile group-containing monomer, a structural unit (c) derived from an amide group-containing monomer or combinations thereof. In some embodiments, the copolymer further comprises a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

Structural unit (a) is derived from an acid group-containing monomer. Any monomer that has at least one acid group may be used as acid group-containing monomer without any specific limitations.

In some embodiments, the acid group-containing monomer is a carboxylic acid group-containing monomer. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, structural unit (a) derived from a carboxylic acid group-containing monomer comprises a carboxylic salt group. In some embodiments, a carboxylic salt group is a salt of a carboxylic acid group. In some embodiments, structural unit (a) derived from a carboxylic acid group-containing monomer comprises an alkali metal carboxylic salt group. Examples of an alkali metal forming the alkali metal carboxylic salt include lithium, sodium and potassium. In some embodiments, structural unit (a) derived from a carboxylic acid group-containing monomer comprises an ammonium carboxylic salt group. In some embodiments, structural unit (a) derived from a carboxylic acid group-containing monomer comprises a combination of a carboxylic salt group and a carboxylic acid group.

Any monomer that has at least one carboxylic salt group may be used as carboxylic salt group-containing monomer without any specific limitations. In some embodiments, the carboxylic salt group-containing monomer is acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt or a combination thereof. In certain embodiments, the carboxylic salt group-containing monomer is 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, β-trans-aryloxyacrylic acid salt, α-chloro-β-E-methoxyacrylic acid salt or a combination thereof. In some embodiments, the carboxylic salt group-containing monomer is methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt or a combination thereof.

In some embodiments, the acid group-containing monomer is a sulfonic acid group-containing monomer. In some embodiments, the sulfonic acid group-containing monomer is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy propane sulfonic acid or a combination thereof.

In some embodiments, structural unit (a) derived from a sulfonic acid group-containing monomer comprises a sulfonic salt group. In some embodiments, a sulfonic salt group is a salt of a sulfonic acid group. In some embodiments, structural unit (a) derived from a sulfonic acid group-containing monomer comprises an alkali metal sulfonic salt group. Examples of an alkali metal forming the alkali metal sulfonic salt include lithium, sodium and potassium. In some embodiments, structural unit (a) derived from a sulfonic acid group-containing monomer comprises an ammonium sulfonic salt group. In some embodiments, structural unit (a) derived from a sulfonic acid group-containing monomer comprises a combination of a sulfonic salt group and a sulfonic acid group.

Any monomer that has at least one sulfonic salt group may be used as sulfonic salt group-containing monomer without any specific limitations. In some embodiments, the sulfonic salt group-containing monomer is vinylsulfonic acid salt, methylvinylsulfonic acid salt, allylvinylsulfonic acid salt, allylsulfonic acid salt, methallylsulfonic acid salt, styrenesulfonic acid salt, 2-sulfoethyl methacrylic acid salt, 2-methylprop-2-ene-1-sulfonic acid salt, 2-acrylamido-2-methyl-1-propane sulfonic acid salt, 3-allyloxy-2-hydroxy-1-propane sulfonic acid salt or a combination thereof.

In some embodiments, the acid group-containing monomer is a phosphonic acid group-containing monomer. In some embodiments, the phosphonic acid group-containing monomer is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid or a combination thereof.

In some embodiments, structural unit (a) derived from a phosphonic acid group-containing monomer comprises a phosphonic salt group. In some embodiments, a phosphonic salt group is a salt of a phosphonic acid group. In some embodiments, structural unit (a) derived from a phosphonic acid group-containing monomer comprises an alkali metal phosphonic salt group. Examples of an alkali metal forming the alkali metal phosphonic salt include lithium, sodium and potassium. In some embodiments, structural unit (a) derived from a phosphonic acid group-containing monomer comprises an ammonium phosphonic salt group. In some embodiments, structural unit (a) derived from a phosphonic acid group-containing monomer comprises a combination of a phosphonic salt group and a phosphonic acid group.

Any monomer that has at least one phosphonic salt group may be used as phosphonic salt group-containing monomer without any specific limitations. In some embodiments, the phosphonic salt group-containing monomer is salt of vinyl phosphonic acid, salt of allyl phosphonic acid, salt of vinyl benzyl phosphonic acid, salt of acrylamide alkyl salt of phosphonic acid, salt of methacrylamide alkyl phosphonic acid, salt of acrylamide alkyl diphosphonic acid, salt of acryloylphosphonic acid, salt of 2-methacryloyloxyethyl phosphonic acid, salt of bis(2-methacryloyloxyethyl) phosphonic acid, salt of ethylene 2-methacryloyloxyethyl phosphonic acid, salt of ethyl-methacryloyloxyethyl phosphonic acid or a combination thereof.

In some embodiments, the structural unit (a) is derived from a carboxylic acid group-containing monomer, a sulfonic acid group-containing monomer, a phosphonic acid group-containing monomer or a combination thereof.

In some embodiments, structural unit (a) derived from an acid group-containing monomer comprises an acid salt group. In some embodiments, an acid salt group is a salt of an acid group. Any monomer that has at least one acid salt group may be used as acid salt group-containing monomer without any specific limitations. In some embodiments, the acid salt group-containing monomer is selected from the group consisting of a carboxylic salt group-containing monomer, a sulfonic salt group-containing monomer, a phosphonic salt group-containing monomer or a combination thereof. In some embodiments, structural unit (a) derived from an acid group-containing monomer comprises an alkali metal acid salt group. Examples of an alkali metal forming the alkali metal acid salt include lithium, sodium and potassium. In some embodiments, structural unit (a) derived from an acid group-containing monomer comprises an ammonium acid salt group. In some embodiments, structural unit (a) derived from an acid group-containing monomer comprises a combination of an acid salt group and an acid group.

In some embodiments, structural unit (a) derived from an acid group-containing monomer comprises atom(s) that is/are capable of forming hydrogen bond(s). In some embodiments, structural unit (a) derived from an acid group-containing monomer further comprises charged species that is/are capable of inducing ion-dipole interactions and/or forming ionic bond(s). For example, an acid group undergoes partial dissociation when comes into contact with water and produces an acid salt group that contains charged species, giving rise to the formation of ion-dipole interactions and/or ionic bond(s).

In some embodiments, the proportion of structural unit (a) derived from an acid group-containing monomer is from about 15% to about 85%, from about 15% to about 84%, from about 15% to about 83%, from about 15% to about 82%, from about 15% to about 81%, from about 15% to about 80%, from about 15% to about 79%, from about 15% to about 78%, from about 15% to about 77%, from about 15% to about 76%, from about 15% to about 75%, from about 15% to about 74%, from about 15% to about 73%, from about 15% to about 72%, from about 15% to about 71%, from about 15% to about 70%, from about 15% to about 65%, from about 15% to about 60%, from about 15% to about 55%, from about 15% to about 50%, from about 16% to about 85%, from about 17% to about 85%, from about 18% to about 85%, from about 19% to about 85%, from about 20% to about 85%, from about 21% to about 85%, from about 22% to about 85%, from about 25% to about 85%, from about 30% to about 85%, from about 35% to about 85%, from about 40% to about 85%, from about 45% to about 85%, from about 50% to about 85%, from about 55% to about 85%, from about 16% to about 80%, from about 16% to about 75%, from about 16% to about 70%, from about 16% to about 65%, from about 16% to about 60%, from about 18% to about 80%, from about 18% to about 75%, from about 18% to about 70%, from about 18% to about 65%, from about 18% to about 60%, from about 20% to about 80%, from about 20% to about 75%, from about 20% to about 70%, from about 20% to about 65%, from about 20% to about 60%, from about 22% to about 80%, from about 22% to about 75%, from about 22% to about 70%, from about 22% to about 65% or from about 22% to about 60% by mole, based on the total number of moles of monomeric units in the copolymer in the polymer.

In some embodiments, the proportion of structural unit (a) derived from an acid group-containing monomer is less than 85%, less than 84%, less than 82%, less than 80%, less than 78%, less than 76%, less than 74%, less than 72%, less than 70%, less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38%, less than 36%, less than 34%, less than 32%, less than 30%, less than 28%, less than 26%, less than 24%, less than 22%, less than 20% or less than 18% by mole, based on the total number of moles of monomeric units in the copolymer in the polymer. In some embodiments, the proportion of structural unit (a) derived from an acid group-containing monomer is more than 15%, more than 16%, more than 18%, more than 20%, more than 22%, more than 24%, more than 26%, more than 28%, more than 30%, more than 32%, more than 34%, more than 36%, more than 38%, more than 40%, more than 42%, more than 44%, more than 46%, more than 48%, more than 50%, more than 52%, more than 54%, more than 56%, more than 58%, more than 60%, more than 62%, more than 64%, more than 66%, more than 68%, more than 70%, more than 72%, more than 74%, more than 76%, more than 78%, more than 80% or more than 82% by mole, based on the total number of moles of monomeric units in the copolymer in the polymer.

The $pK_a$ specifies the strength of an acid. A lower $pK_a$ value indicates a stronger acid, that is, an acid which dissociates more fully in an aqueous solvent such as water. It is desirable for the strength of the acid group-containing monomer(s) that contribute to the make-up of the polymer to be lower than that of the acid that is utilized as a precipitation agent to facilitate the deprotonation of the precipitation agent and the protonation of the conjugate base of the acid group-containing monomer(s). For this reason, the $pK_a$ value of the acid group-containing monomer should be higher than that of the acid to be utilized as a precipitation agent. In some embodiments, the $pK_a$ of the acid group-containing monomer is from about 2.5 to about 7, from about 2.5 to about 6.8, from about 2.5 to about 6.6, from about 2.5 to about 6.4, from about 2.5 to about 6.2, from about 2.5 to about 6, from about 2.5 to about 5.8, from about 2.5 to about 5.6, from about 2.5 to about 5.4, from about 2.5 to about 5.2, from about 2.5 to about 5, from about 2.5 to about 4.8, from about 2.5 to about 4.6, from about 2.5 to about 4.4, from about 2.5 to about 4.2, from about 2.5 to about 4, from about 2.6 to about 7, from about 2.6 to about 6.8, from about 2.6 to about 6.6, from about 2.6 to about 6.4, from about 2.6 to about 6.2, from about 2.6 to about 6, from about 2.6 to about 5.8, from about 2.6 to about 5.6, from about 2.6 to about 5.4, from about 2.6 to about 5.2, from about 2.6 to about 5, from about 2.6 to about 4.8, from about 2.6 to about 4.6, from about 2.6 to about 4.4, from about 2.6 to about 4.2, from about 2.6 to about 4, from about 2.8 to about 7, from about 2.8 to about 6.8, from about 2.8 to about 6.6, from about 2.8 to about 6.4, from about 2.8 to about 6.2, from about 2.8 to about 6, from about 2.8 to about 5.8, from about 2.8 to about 5.6, from about 2.8 to about 5.4, from about 2.8 to about 5.2, from about 2.8 to about 5, from about 2.8 to about 4.8, from about 2.8 to about 4.6, from about 2.8 to about 4.4, from about 2.8 to about 4.2, from about 2.8 to about 4, from about 3 to about 7, from about 3 to about 6.8, from about 3 to about 6.6, from about 3 to about 6.4, from about 3 to about 6.2, from about 3 to about 6, from about 3 to about 5.8, from about 3 to about 5.6, from about 3 to about 5.4, from about 3 to about 5.2, from about 3 to about 5, from about 3 to about 4.8, from about 3 to about 4.6, from about 3 to about 4.4, from about 3 to about 4.2, from about 3 to about 4, from about 3.2 to about 7, from about 3.2 to about 6.8, from about 3.2 to about 6.6, from about 3.2 to about 6.4, from about 3.2 to about 6.2, from about 3.2 to about 6, from about 3.2 to about 5.8, from about 3.2 to about 5.6, from about 3.2 to about 5.4, from about 3.2 to about 5.2, from about 3.2 to about 5, from about 3.4 to about 7, from about 3.4 to about 6.8, from about 3.4 to about 6.6, from about 3.4 to about 6.4, from about 3.4 to about 6.2, from about 3.4 to about 6, from about 3.4 to about 5.8, from about 3.4 to about 5.6, from about 3.4 to about 5.4, from about 3.4 to about 5.2, from about 3.4 to about 5, from about 3.6 to about 7, from about 3.6 to about 6.8, from about 3.6 to about 6.6, from about 3.6 to about 6.4, from about 3.6 to about 6.2, from about 3.6 to about 6, from about 3.6 to about 5.8, from about 3.6 to about 5.6, from about 3.6 to about 5.4, from about 3.6 to about 5.2, from about 3.6 to about 5, from about 3.8 to about 7, from about 3.8 to about 6.8, from about 3.8 to about 6.6, from about 3.8 to about 6.4, from about 3.8 to about 6.2, from about 3.8 to about 6, from about 3.8 to about 5.8, from about 3.8 to about 5.6, from about 3.8 to about 5.4, from about 3.8 to about 5.2, from about 3.8 to about 5, from about 4 to about 7, from about 4 to about 6.8, from about 4 to about 6.6, from about 4 to about 6.4, from about 4 to about 6.2, from about 4 to about 6, from about 4 to about 5.8, from about 4 to about 5.6, from about 4 to about 5.4, from about 4 to about 5.2 or from about 4 to about 5.

In some embodiments, the $pK_a$ of the acid group-containing monomer is less than 7, less than 6.8, less than 6.6, less than 6.4, less than 6.2, less than 6, less than 5.8, less than 5.6, less than 5.4, less than 5.2, less than 5, less than 4.8, less than 4.6, less than 4.4, less than 4.2, less than 4, less than 3.8, less than 3.6, less than 3.4, less than 3.2, less than 3, less than 2.8 or less than 2.6. In some embodiments, the $pK_a$ of the acid group-containing monomer is more than 2.5, more than 2.6, more than 2.8, more than 3, more than 3.2, more than 3.4, more than 3.6, more than 3.8, more than 4, more than 4.2, more than 4.4, more than 4.6, more than 4.8, more than 5, more than 5.2, more than 5.4, more than 5.6, more than 5.8, more than 6, more than 6.2, more than 6.4, more than 6.6 or more than 6.8.

Structural unit (b) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In some embodiments, the proportion of structural unit (b) derived from a nitrile group-containing monomer is from about 15% to about 85%, from about 15% to about 84%, from about 15% to about 83%, from about 15% to about 82%, from about 15% to about 81%, from about 15% to about 80%, from about 15% to about 79%, from about 15% to about 78%, from about 15% to about 77%, from about 15% to about 76%, from about 15% to about 75%, from about 15% to about 74%, from about 15% to about 73%, from about 15% to about 72%, from about 15% to about 71%, from about 15% to about 70%, from about 15% to about 65%, from about 15% to about 60%, from about 15% to about 55%, from about 15% to about 50%, from about 16% to about 85%, from about 17% to about 85%, from about 18% to about 85%, from about 19% to about 85%, from about 20% to about 85%, from about 21% to about 85%, from about 22% to about 85%, from about 25% to about 85%, from about 30% to about 85%, from about 35% to about 85%, from about 40% to about 85%, from about 45% to about 85%, from about 50% to about 85%, from about 55% to about 85%, from about 16% to about 80%, from about 16% to about 75%, from about 16% to about 70%, from about 16% to about 65%, from about 16% to about 60%, from about 18% to about 80%, from about 18% to about 75%, from about 18% to about 70%, from about 18% to about 65%, from about 18% to about 60%, from about 20% to about 80%, from about 20% to about 75%, from about 20% to about 70%, from about 20% to about 65%, from about 20% to about 60%, from about 22% to about 80%, from about 22% to about 75%, from about 22% to about 70%, from about 22% to about 65% or from about 22% to about 60% by mole, based on the total number of moles of monomeric units in the copolymer in the polymer.

In some embodiments, the proportion of structural unit (b) derived from a nitrile group-containing monomer is less than 85%, less than 84%, less than 82%, less than 80%, less than 78%, less than 76%, less than 74%, less than 72%, less than 70%, less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38%, less than 36%, less than 34%, less than 32%, less than 30%, less than 28%, less than 26%, less than 24%, less than 22%, less than 20%, less than 18% or less than 16% by mole, based on the total number of moles of monomeric units in the copolymer in the polymer. In some embodiments, the proportion of structural unit (b) derived from a nitrile group-containing monomer is more than 15%, more than 16%, more than 18%, more than 20%, more than 22%, more than 24%, more than 26%, more than 28%, more than 30%, more than 32%, more than 34%, more than 36%, more than 38%, more than 40%, more than 42%, more than 44%, more than 46%, more than 48%, more than 50%, more than 52%, more than 54%, more than 56%, more than 58%, more than 60%, more than 62%, more than 64%, more than 66%, more than 68%, more than 70%, more than 72%, more than 74%, more than 76%, more than 78%, more than 80% or more than 82% by mole, based on the total number of moles of monomeric units in the copolymer in the polymer.

Structural unit (c) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl)methacrylamide, N-(propoxymethyl)methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of structural unit (c) derived from an amide group-containing monomer is from about 0% to about 35%, from about 1% to about 35%, from about 2% to about 35%, from about 3% to about 35%, from about 4% to about 35%, from about 5% to about 35%, from about 6% to about 35%, from about 7% to about 35%, from about 8% to about 35%, from about 9% to about 35%, from about 10% to about 35%, from about 11% to about 35%, from about 12% to about 35%, from about 13% to about 35%, from about 14% to about 35%, from about 15% to about 35%, from about 16% to about 35%, from about 17% to about 35%, from about 18% to about 35%, from about 19% to about 35%, from about 20% to about 35%, from about 20% to about 34%, from about 20% to about 33%, from about 20% to about 32%, from about 20% to about 31%, from about 20% to about 30%, from about 0% to about 34%, from about 0% to about 33%, from about 0% to about 32%, from about 0% to about 31%, from about 0% to about 30%, from about 1% to about 29%, from about 1% to about 28%, from about 1% to about 27%, from about 1% to about 26%, from about 1% to about 25%, from about 1% to about 24%, from about 1% to about 23%, from about 1% to about 22%, from about 1% to about 21% or from about 1% to about 20% by mole, based on the total number of moles of monomeric units in the copolymer in the polymer.

In some embodiments, the proportion of structural unit (c) derived from an amide group-containing monomer is less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11% or less than 10% by mole, based on the total number of moles of monomeric units in the copolymer in the polymer. In some embodiments, the proportion of structural unit (c) derived from an amide group-containing monomer is more than 0%, more than 1%, more than 2%, more than 3%, more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24% or more than 25% by mole, based on the total number of moles of monomeric units in the copolymer in the polymer.

Structural unit (d) is derived from a hydroxyl group-containing monomer. Any monomer that has at least one hydroxyl group may be used as hydroxyl group-containing monomer without any specific limitations. In some embodiments, the hydroxyl group-containing monomer is a $C_1$ to $C_{20}$ alkyl group or a $C_5$ to $C_{20}$ cycloalkyl group-containing methacrylate having a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol or a combination thereof.

Structural unit (e) is derived from an ester group-containing monomer. Any monomer that has at least one ester group may be used as ester group-containing monomer without any specific limitations. In some embodiments, the ester group-containing monomer is $C_1$ to $C_{20}$ alkyl acrylate, $C_1$ to $C_{20}$ alkyl (meth)acrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, oxtadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

Structural unit (f) is derived from an epoxy group-containing monomer. Any monomer that has at least one epoxy group may be used as epoxy group-containing monomer without any specific limitations. In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene or a combination thereof.

In some embodiments, the epoxy group-containing monomer is 3,4-epoxy-1-butene, 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate or a combination thereof.

Structural unit (g) is derived from a fluorine-containing monomer. Any monomer that has at least one fluorine atom may be used as fluorine-containing monomer without any specific limitations. In some embodiments, the fluorine-containing monomer is a $C_1$ to $C_{20}$ alkyl group-containing acrylate, methacrylate or a combination thereof having at least one fluorine atom. In some embodiments, the fluorine-containing monomer is perfluoro alkyl acrylate such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate and combinations thereof. In some embodiments, the fluorine-containing monomer is a carboxylate containing at least one $C_1$ to $C_{20}$ alkyl group and at least one fluorine atom; wherein the carboxylate is selected from the group consisting of crotonate, malate, fumarate, itaconate or a combination thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate and combinations thereof.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently from about 0% to about 50%, from about 1% to about 50%, from about 2% to about 50%, from about 3% to about 50%, from about 4% to about 50%, from about 5% to about 50%, from about 6% to about 50%, from about 7% to about 50%, from about 8% to about 50%, from about 9% to about 50%, from about 10% to about 50%, from about 11% to about 50%, from about 12% to about 50%, from about 13% to about 50%, from about 14% to about 50%, from about 15% to about 50%, from about 16% to about 50%, from about 17% to about 50%, from about 18% to about 50%, from about 19% to about 50%, from about 20% to about 50%, from about 20% to about 49%, from about 20% to about 48%, from about 20% to about 47%, from about 20% to about 46%, from about 20% to about 45%, from about 20% to about 44%, from about 20% to about 43%, from about 20% to about 42%, from about 20% to about 41%, from about 20% to about 40%, from about 0% to about 45%, from about 0% to about 44%, from about 0% to about 43%, from about 0% to about 42%, from about 0% to about 41%, from about 0% to about 40%, from about 0% to about 39%, from about 0% to about 38%, from about 0% to about 37%, from about 0% to about 36%, from about 0% to about 35%, from about 0% to about 34%, from about 0% to about 33%, from about 0% to about 32%, from about 0% to about 31%, from about 0% to about 30%, from about 2% to about 50%, from about 2% to about 45%, from about 2% to about 40%, from about 2% to about 35%, from about 2% to about 30%, from about 2% to about 25%, from about 5% to about 50%, from about 5% to about 45%, from about 5% to about 40%, from about 5% to about 35%, from about 5% to about 30%, from about 5% to about 25%, from about 10% to about 50%, from about 10% to about 45%, from about 10% to about 40%, from about 10% to about 35% or from about 10% to about 30% by mole, based on the total number of moles of monomeric units in the copolymer in the polymer.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 8%, less than 6%, less than 4% or less than 2% by mole, based on the total number of moles of monomeric units in the copolymer in the polymer.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently more than 0%, more than 1%, more than 2%, more than 3%, more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27%, more than 28%, more than 29%, more than 30%, more than 31%, more than 32%, more than 33%, more than 34%, more than 35%, more than 36%, more than 37%, more than 38%, more than 39%, more than 40%, more than 41%, more than 42%, more than 43%, more than 44%, more than 45%, more than 46%, more than 47% or more than 48% by mole, based on the total number of moles of monomeric units in the copolymer in the polymer.

In other embodiments, the copolymer may additionally comprise a structural unit derived from an olefin. Any hydrocarbon that has at least one carbon-carbon double bond may be used as an olefin without any specific limitations. In some embodiments, the olefin includes a $C_2$ to $C_{20}$ aliphatic compound, a $C_8$ to $C_{20}$ aromatic compound or a cyclic compound containing vinylic unsaturation, a $C_4$ to $C_{40}$ diene or a combination thereof. In some embodiments, the olefin is styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene, cyclooctene or a combination thereof. In some embodiments, the copolymer does not comprise a structural unit derived from an olefin. In some embodiments, the copolymer does not comprise styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene or cyclooctene.

A conjugated diene group-containing monomer constitutes as an olefin. In some embodiments, a conjugated diene group-containing monomer is $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes, substituted side chain conjugated hexadienes or a combination thereof. In some embodiments, the copolymer does not comprise $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes or substituted side chain conjugated hexadienes.

In other embodiments, the copolymer may additionally comprise a structural unit derived from an aromatic vinyl group-containing monomer. In some embodiments, the aromatic vinyl group-containing monomer is styrene, α-methylstyrene, vinyltoluene, divinylbenzene or a combination thereof. In some embodiments, the copolymer does not comprise a structural unit derived from an aromatic vinyl group-containing monomer. In some embodiments, the copolymer does not comprise styrene, α-methylstyrene, vinyltoluene or divinylbenzene.

In some embodiments, the weight average molecular weight of the polymer is from about 50,000 g/mol to about 200,000 g/mol, from about 55,000 g/mol to about 200,000 g/mol, from about 60,000 g/mol to about 200,000 g/mol, from about 65,000 g/mol to about 200,000 g/mol, from about 70,000 g/mol to about 200,000 g/mol, from about 75,000 g/mol to about 200,000 g/mol, from about 80,000 g/mol to about 200,000 g/mol, from about 85,000 g/mol to about 200,000 g/mol, from about 90,000 g/mol to about 200,000 g/mol, from about 90,000 g/mol to about 190,000 g/mol, from about 90,000 g/mol to about 180,000 g/mol, from about 90,000 g/mol to about 170,000 g/mol, from about 90,000 g/mol to about 160,000 g/mol, from about 95,000 g/mol to about 160,000 g/mol, from about 100,000 g/mol to about 160,000 g/mol, from about 100,000 g/mol to about 155,000 g/mol, from about 100,000 g/mol to about 15,000 g/mol, from about 100,000 g/mol to about 145,000 g/mol or from about 100,000 g/mol to about 140,000 g/mol.

In some embodiments, the weight average molecular weight of the polymer is less than 200,000 g/mol, less than 195,000 g/mol, less than 190,000 g/mol, less than 185,000 g/mol, less than 180,000 g/mol, less than 175,000 g/mol, less than 170,000 g/mol, less than 165,000 g/mol, less than 160,000 g/mol, less than 155,000 g/mol, less than 150,000 g/mol, less than 145,000 g/mol, less than 140,000 g/mol, less than 135,000 g/mol, less than 130,000 g/mol, less than 125,000 g/mol, less than 120,000 g/mol, less than 115,000 g/mol, less than 110,000 g/mol, less than 105,000 g/mol, less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol or less than 60,000 g/mol. In some embodiments, the weight average molecular weight of the polymer is more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol, more than 95,000 g/mol, more than 100,000 g/mol, more than 105,000 g/mol, more than 110,000 g/mol, more than 115,000 g/mol, more than 120,000 g/mol, more than 125,000 g/mol, more than 130,000 g/mol, more than 135,000 g/mol, more than 140,000 g/mol, more than 145,000 g/mol, more than 150,000 g/mol, more than 155,000 g/mol, more than 160,000 g/mol, more than 165,000 g/mol, more than 170,000 g/mol, more than 175,000 g/mol, more than 180,000 g/mol, more than 185,000 g/mol, more than 190,000 g/mol or more than 195,000 g/mol.

In some embodiments, the number average molecular weight of the polymer is from about 10,000 g/mol to about 100,000 g/mol, from about 15,000 g/mol to about 100,000 g/mol, from about 20,000 g/mol to about 100,000 g/mol, from about 25,000 g/mol to about 100,000 g/mol, from about 30,000 g/mol to about 100,000 g/mol, from about 35,000 g/mol to about 100,000 g/mol, from about 40,000 g/mol to about 100,000 g/mol, from about 45,000 g/mol to about 100,000 g/mol, from about 50,000 g/mol to about 100,000 g/mol, from about 50,000 g/mol to about 95,000 g/mol, from about 50,000 g/mol to about 90,000 g/mol, from about 50,000 g/mol to about 85,000 g/mol, from about 50,000 g/mol to about 80,000 g/mol, from about 55,000 g/mol to about 80,000 g/mol, from about 60,000 g/mol to about 80,000 g/mol, from about 65,000 g/mol to about 75,000 g/mol or from about 60,000 g/mol to about 90,000 g/mol.

In some embodiments, the number average molecular weight of the polymer is less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol, less than 60,000 g/mol, less than 55,000 g/mol, less than 50,000 g/mol, less than 45,000 g/mol, less than 40,000 g/mol, less than 35,000 g/mol, less than 30,000 g/mol, less than 25,000 g/mol, less than 20,000 g/mol or less than 15,000 g/mol. In some embodiments, the number average molecular weight of the polymer is more than 10,000 g/mol, more than 15,000 g/mol, more than 20,000 g/mol, more than 25,000 g/mol, more than 30,000 g/mol, more than 35,000 g/mol, more than 40,000 g/mol, more than 45,000 g/mol, more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol or more than 95,000 g/mol.

In some embodiments, the polydispersity index (PDI) of the polymer is from about 1 to about 5, from about 1 to about 4.8, from about 1 to about 4.6, from about 1 to about 4.4, from about 1 to about 4.2, from about 1 to about 4, from about 1 to about 3.8, from about 1 to about 3.6, from about 1 to about 3.4, from about 1 to about 3.2, from about 1 to about 3, from about 1.1 to about 3, from about 1.2 to about 3, from about 1.3 to about 3, from about 1.4 to about 3, from about 1.5 to about 3, from about 1.6 to about 3, from about 1.6 to about 2.8, from about 1.6 to about 2.6, from about 1.8 to about 2.6 or from about 1.8 to about 2.8.

In some embodiments, the polydispersity index of the polymer is less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4 or less than 1.2. In some embodiments, the polydispersity index of the polymer is more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6 or more than 4.8.

In some embodiments, the aqueous solvent is a solution containing water as the major component and a volatile solvent, such as alcohols, lower aliphatic ketones, lower alkyl acetates or the like, as the minor component in addition to water. In some embodiments, the proportion of water in the aqueous solvent is from about 51% to about 100%, from about 51% to about 95%, from about 51% to about 90%, from about 51% to about 85%, from about 51% to about 80%, from about 51% to about 75%, from about 51% to about 70%, from about 55% to about 100%, from about 55% to about 95%, from about 55% to about 90%, from about 55% to about 85%, from about 55% to about 80%, from about 60% to about 100%, from about 60% to about 95%, from about 60% to about 90%, from about 60% to about 85%, from about 60% to about 80%, from about 65% to about 100%, from about 65% to about 95%, from about 65% to about 90%, from about 65% to about 85%, from about 70% to about 100%, from about 70% to about 95%, from about 70% to about 90%, from about 70% to about 85%, from about 75% to about 100%, from about 75% to about 95% or from about 80% to about 100% by weight.

In some embodiments, the proportion of water in the aqueous solvent is more than 50%, more than 55%, more than 60%, more than 65%, more than 70%, more than 75%, more than 80%, more than 85%, more than 90% or more than 95% by weight. In some embodiments, the proportion of water in the aqueous solvent is less than 55%, less than 60%, less than 65%, less than 70%, less than 75%, less than 80%, less than 85%, less than 90% or less than 95% by weight. In some embodiments, the aqueous solvent consists solely of water, that is, the proportion of water in the aqueous solvent is 100% by weight.

Some non-limiting examples of water include tap water, bottled water, purified water, pure water, distilled water, de-ionized water, $D_2O$, or a combination thereof. In some embodiments, the aqueous solvent is de-ionized water. Water forms solvation shells around various charged, partially charged or polar species present in the polymer and consequently promotes the dissolution of the polymer in the first suspension.

Any water-miscible solvents or volatile solvents can be used as the minor component (i.e. solvents other than water) of the aqueous solvent. Some non-limiting examples of the water-miscible solvents or volatile solvents include alcohols, lower aliphatic ketones, lower alkyl acetates and combinations thereof. The addition of alcohol can improve the solubility of the polymer and lower the freezing point of water. Some non-limiting examples of the alcohol include $C_1$-$C_4$ alcohols, such as methanol, ethanol, isopropanol, n-propanol, tert-butanol, n-butanol and combinations thereof. Some non-limiting examples of the lower aliphatic ketones include acetone, dimethyl ketone, methyl ethyl ketone (MEK) and combinations thereof. Some non-limiting examples of the lower alkyl acetates include ethyl acetate (EA), isopropyl acetate, propyl acetate, butyl acetate (BA) and combinations thereof. In some embodiments, the aqueous solvent does not comprise an alcohol, a lower aliphatic ketone, a lower alkyl acetate or combinations thereof.

The method of the present invention is directed towards achieving precipitation of a polymer by (1) disrupting and/or breaking the intermolecular attractions (e.g. hydrogen bonding and/or ion-dipole interactions) between the polymer and the aqueous solvent via the use of a precipitation agent and (2) consequently inducing a coil-to-globule structural transformation of the polymer.

In some embodiments, a precipitation agent is added into the first suspension to form a second suspension.

In some embodiments, the precipitation agent is an acid. In some embodiments, the precipitation agent is a strong acid, a weak acid or a combination thereof.

In some embodiments, the precipitation agent is a strong acid. Strong acid is one that fully or almost fully dissociates in water in producing hydrogen ions as described in Equation 1. In some embodiments, the strong acid is an inorganic acid. In some embodiments, the inorganic acid is selected from the group consisting of nitric acid, sulphuric acid, hydrochloric acid, perchloric acid, hydrobromic acid, hydroiodic acid, chloric acid, bromic acid, iodic acid, dithionic acid, dithionous acid, sulfamic acid, trithionic acid, tetrathionic acid or combinations thereof.

In some embodiments, the strong acid is selected from the group consisting of methane sulphonic acid, p-toluenesulfonic acid, benzene sulfonic acid, trichloroacetic acid, trifluoroacetic acid, oxalic acid, propiolic acid, mesoxalic acid, mellitic acid or combinations thereof.

It is highly recommended for the strength of the acid that is utilized as a precipitation agent to be higher than that of the acid group-containing monomer(s) that assists the construction of the polymer to promote the preferential dissociation of the precipitation agent and the protonation of the conjugate base of the acid group-containing monomer(s). Accordingly, the $pK_a$ value of the acid as a precipitation agent should be lower than that of the acid group-containing monomer.

In some embodiments, the $pK_a$ of the strong acid is from about −10 to about 2, from about −9.5 to about 2, from about −9 to about 2, from about −8.5 to about 2, from about −8 to about 2, from about −7.5 to about 2, from about −7 to about 2, from about −6.5 to about 2, from about −6 to about 2, from about −5.5 to about 2, from about −5 to about 2, from about −4.8 to about 2, from about −4.6 to about 2, from about −4.4 to about 2, from about −4.2 to about 2, from about −4 to about 2, from about −3.8 to about 2, from about −3.6 to about 2, from about −3.4 to about 2, from about −3.2 to about 2, from about −3 to about 2, from about −2.8 to about 2, from about −2.6 to about 2, from about −2.4 to about 2, from about −2.2 to about 2, from about −2 to about 2, from about −1.8 to about 2, from about −1.6 to about 2, from about −1.4 to about 2, from about −1.2 to about 2, from about −1 to about 2, from about −0.8 to about 2, from about −0.6 to about 2, from about −0.4 to about 2, from about −0.2 to about 2, from about 0 to about 2, from about −10 to about 1.5, from about −9.5 to about 1.5, from about −9 to about 1.5, from about −8.5 to about 1.5, from about −8 to about 1.5, from about −7.5 to about 1.5, from about −7 to about 1.5, from about −6.5 to about 1.5, from about −6 to about 1.5, from about −5.5 to about 1.5, from about −5 to about 1.5, from about −4.8 to about 1.5, from about −4.6 to about 1.5, from about −4.4 to about 1.5, from about −4.2 to about 1.5, from about −4 to about 1.5, from about −3.8 to about 1.5, from about −3.6 to about 1.5, from about −3.4 to about 1.5, from about −3.2 to about 1.5, from about −3 to about 1.5, from about −2.8 to about 1.5, from about −2.6 to about 1.5, from about −2.4 to about 1.5, from about −2.2 to about 1.5, from about −2 to about 1.5, from about −1.8 to about 1.5, from about −1.6 to about 1.5, from about −1.4 to about 1.5, from about −1.2 to about 1.5, from about −1 to about 1.5, from about −0.8 to about 1.5, from about −0.6 to about 1.5, from about −0.4 to about 1.5, from about −0.2 to about 1.5, from about 0 to about 1.5, from about −10 to about 1, from about −9.5 to about 1, from about −9 to about 1, from about −8.5 to about 1, from about −8 to about 1, from about −7.5 to about 1, from about −7 to about 1, from about −6.5 to about 1, from about −6 to about 1, from about −5.5 to about 1, from about −5 to about 1, from about −4.8 to about 1, from about −4.6 to about 1, from about −4.4 to about 1, from about −4.2 to about 1, from about −4 to about 1, from about −3.8 to about 1, from about −3.6 to about 1, from about −3.4 to about 1, from about −3.2 to about 1, from about −3 to about 1, from about −2.8 to about 1, from about −2.6 to about 1, from about −2.4 to about 1, from about −2.2 to about 1, from about −2 to about 1, from about −1.8 to about 1, from about −1.6 to about 1, from about −1.4 to about 1, from about −1.2 to about 1, from about −1 to about 1, from about −0.8 to about 1, from about −0.6 to about 1, from about −0.4 to about 1, from about −0.2 to about 1 or from about 0 to about 1.

In some embodiments, the $pK_a$ of the strong acid is less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4, less than 0.3, less than 0.2, less than 0.1, less than 0, less than −0.5, less than −1, less than −1.5, less than −2, less than −2.5, less than −3, less than −3.5, less than −4, less than −4.5, less than −5, less than −5.5, less than −6, less than −6.5, less than −7, less than −8, less than −8.5, less than −9 or less than −9.5. In some embodiments, the $pK_a$ of the strong acid is more than −10, more than −9.5, more than −9, more than −8.5, more than −8, more than −7.5, more than −7, more than −6.5, more than −6, more than −5.5, more than −5, more than −4.5, more than −4, more than −3.5, more than −3, more than −2.5, more than −2, more than −1.5, more than −1, more than −0.5, more than 0, more than 0.1, more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8 or more than 1.9.

In some embodiments, the $pK_a$ of the strong acid is between −10 and 2, between −9.5 and 2, between −9 and 2, between −8.5 and 2, between −8 and 2, between −7.5 and 2, between −7 and 2, between −6.5 and 2, between −6 and 2, between −5.5 and 2, between −5 and 2, between −4.5 and 2, between −4 and 2, between −3.5 and 2, between −3 and 2, between −2.5 and 2 or between −2 and 2.

In some embodiments, a polyprotic acid is utilized as a precipitation agent. A polyprotic acid refers to an acid that has two or more ionizable hydrogen ions (i.e. protons) per molecule. Some non-limiting examples of polyprotic acid include sulphuric acid, dithionic acid, dithionous acid, trithionic acid, tetrathionic acid, oxalic acid, malonic acid, tartronic acid, dihydroxymalonic acid, mesoxalic acid, butanedioic acid, methylmalonic acid, fumaric acid, maleic acid, 2-hydroxybutanedioic acid, tartaric acid, oxaloacetic acid, dioxosuccinic acid, glutaric acid, 2-oxoglutaric acid, 3-oxoglutaric acid, hexanedioic acid, citric acid, aconitic acid, isocitric acid, pimelic acid, trimesic acid, mellitic acid, malic acid and orthosilicic acid. Some non-limiting examples of polyprotic strong acid include sulphuric acid, oxalic acid, mellitic acid, mesoxalic acid, dithionic acid, dithionous acid, trithionic acid and tetrathionic acid.

In a sulphuric acid, there are two protons that could be dissociated per molecule. With sulphuric acid having a $pK_a$ of −2.80 in attaining first proton dissociation, sulphuric acid is regarded as a strong acid. With the second proton in sulphuric acid dissociates at a $pK_a$ of 1.99, sulphuric acid after the dissociation of the first proton is still a strong acid, and thus it is necessary to consider the dissociation of the second protons. Therefore, the proton concentration premised on the dissociation from sulphuric acid is calculated based on the dissociation of both protons from one molecule of sulphuric acid. In the present invention, the strong acid specifically refers to an acid with a $pK_a$ of −10 to 2 or between −10 and 2. In some embodiments, a polyprotic strong acid is an acid with a $pK_a$ of from about −10 to about 2 for the dissociation of the first proton, second proton, third proton or combinations thereof. In some embodiments, a polyprotic strong acid is an acid with a $pK_a$ of between −10 and 2 for the dissociation of the first proton, second proton, third proton or combinations thereof.

The pH value of the second suspension specifies the concentration of hydroxonium ions contained within. The pH value of the second suspension governs the states (i.e. protonated or deprotonated form) in which different acids predominantly exist when placed in the second suspension. For example, in the case where the pH of the second suspension is lower than the $pK_a$ of an acid A but higher than the $pK_a$ of an acid B, acid A would mainly exist in the second suspension in its protonated form, while acid B would primarily exist in its deprotonated form.

It would be highly favorable for the $pK_a$ of the acid to be utilized as the precipitation agent and the pH of the second suspension to be lower than the pKa value(s) of the acid group-containing monomer(s) that contribute the make-up of the polymer. This enables the dissociation of the precipitation agent and the preferential protonation of the conjugate base of the acid group-containing monomer (existing in the second suspension in its protonated form), and thus consequently assists the separation of the polymer from the aqueous solvent and the structural transformation of the polymer.

The strength of the response of an individual monomeric unit, alone, to changes in pH of the second suspension, might be weak. However, these weak responses, compounded hundreds or thousands of times in the assembly of a polymer, create a considerable force for driving the structural transformation of the entire polymer. For this reason, a significant change in conformation of the polymer could be induced by slight changes in the pH of the second suspension. In some embodiments, when a strong acid, being utilized as the precipitation agent, is added into a first suspension to form a second suspension, the pH of the second suspension is from about 0.2 to about 4.5, from about 0.2 to about 4.4, from about 0.2 to about 4.3, from about 0.2 to about 4.1, from about 0.2 to about 4, from about 0.2 to about 3.8, from about 0.2 to about 3.6, from about 0.2 to about 3.4, from about 0.2 to about 3.2, from about 0.2 to about 3, from about 0.2 to about 2.8, from about 0.2 to about 2.6, from about 0.2 to about 2.4, from about 0.2 to about 2.2, from about 0.2 to about 2, from about 0.2 to about 1.8, from about 0.2 to about 1.6, from about 0.2 to about 1.4, from about 0.2 to about 1.2, from about 0.4 to about 4.5, from about 0.4 to about 4.3, from about 0.4 to about 4.1, from about 0.4 to about 4, from about 0.4 to about 3.8, from about 0.4 to about 3.6, from about 0.4 to about 3.4, from about 0.4 to about 3.2, from about 0.4 to about 3, from about 0.4 to about 2.8, from about 0.4 to about 2.6, from about 0.4 to about 2.4, from about 0.4 to about 2.2, from about 0.4 to about 2, from about 0.4 to about 1.8, from about 0.4 to about 1.6, from about 0.4 to about 1.4, from about 0.6 to about 4.5, from about 0.6 to about 4.3, from about 0.6 to about 4.1, from about 0.6 to about 4, from about 0.6 to about 3.8, from about 0.6 to about 3.6, from about 0.6 to about 3.4, from about 0.6 to about 3.2, from about 0.6 to about 3, from about 0.6 to about 2.8, from about 0.6 to about 2.6, from about 0.6 to about 2.4, from about 0.6 to about 2.2, from about 0.6 to about 2, from about 0.6 to about 1.8, from about 0.6 to about 1.6, from about 0.8 to about 4.5, from about 0.8 to about 4.3, from about 0.8 to about 4.1, from about 0.8 to about 4, from about 0.8 to about 3.8, from about 0.8 to about 3.6, from about 0.8 to about 3.4, from about 0.8 to about 3.2, from about 0.8 to about 3, from about 0.8 to about 2.8, from about 0.8 to about 2.6, from about 0.8 to about 2.4, from about 0.8 to about 2.2, from about 0.8 to about 2, from about 0.8 to about 1.8, from about 1 to about 4.5, from about 1 to about 4.3, from about 1 to about 4.1, from about 1 to about 4, from about 1 to about 3.8, from about 1 to about 3.6, from about 1 to about 3.4, from about 1 to about 3.2, from about 1 to about 3, from about 1 to about 2.8, from about 1 to about 2.6, from about 1 to about 2.4, from about 1 to about 2.2, from about 1 to about 2, from about 1.2 to about 4.5, from about 1.2 to about 4, from about 1.2 to about 3.8, from about 1.2 to about 3.6, from about 1.2 to about 3.4, from about 1.2 to about 3.2, from about 1.2 to about 3, from about 1.2 to about 2.8, from about 1.4 to about 4.5, from about 1.2 to about 4, from about 1.4 to about 3.8, from about 1.4 to about 3.6, from about 1.4 to about 3.4, from about 1.4 to about 3.2, from about 1.4 to about 3, from about 1.4 to about 2.8, from about 1.6 to about 4.5, from about 1.6 to about 4, from about 1.6 to about 3.8, from about 1.6 to about 3.6, from about 1.6 to about 3.4, from about 1.6 to about 3.2, from about 1.6 to about 3, from about 1.8 to about 4.5, from about 1.8 to about 4, from about 1.8 to about 3.8, from about 1.8 to about 3.6, from about 1.8 to about 3.4, from about 1.8 to about 3.2, from about 2 to about 4.5, from about 2 to about 4, from about 2 to about 3.8, from about 2 to about 3.6 or from about 2 to about 3.4.

In some embodiments, when a strong acid, being utilized as the precipitation agent, is added into a first suspension to form a second suspension, the pH of the second suspension is less than 4.5, less than 4.4, less than 4.3, less than 4.2, less than 4.1, less than 4, less than 3.9, less than 3.8, less than 3.7, less than 3.6, less than 3.5, less than 3.4, less than 3.3, less than 3.2, less than 3.1, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4 or less than 0.3. In some embodiments, when a strong acid, being utilized as the precipitation agent, is added into a first suspension to form a second suspension, the pH of the second suspension is more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8, more than 1.9, more than 2, more than 2.1, more than 2.2, more than 2.3, more than 2.4, more than 2.5, more than 2.6, more than 2.7, more than 2.8, more than 2.9, more than 3, more than 3.1, more than 3.2, more than 3.3, more than 3.4, more than 3.5, more than 3.6, more than 3.7, more than 3.8, more than 3.9, more than 4, more than 4.1, more than 4.2, more than 4.3 or more than 4.4.

Figure 6:
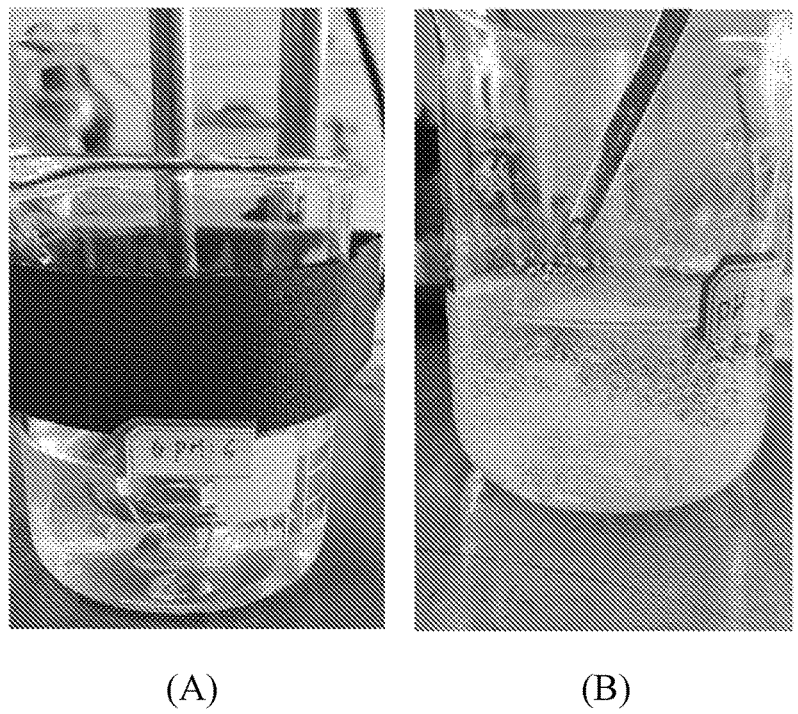
FIGS. 6A and 6B depict the physical conditions of second suspensions of Comparative Example 1 and Example 2 with a pH of 6 and 3 respectively after the addition of a precipitation agent into a first suspension in forming the second suspensions.

FIGS. 6A and 6B depict the physical conditions of second suspensions of Comparative Example 1 and Example 2 with a pH of 6 and 3 respectively after the addition of a precipitation agent into a first suspension in forming the second suspensions. In FIGS. 6A and 6B, sulphuric acid is being utilized as the precipitation agent which has a $pK_a$ value of −2.8. The polymer comprises a copolymer comprising structural units derived from a carboxylic acid group-containing monomer, a nitrile group-containing monomer and an amide group-containing monomer. The structural unit derived from a carboxylic acid group-containing monomer comprises an acrylic acid salt. Acrylic acid has a pKa value of 4.3.

In FIG. 6A, sulphuric acid is added into the first suspension in forming a second suspension with a pH of 6. A relatively clear second suspension is observed with no visible sign of precipitation. This stems from the $pK_a$ value of the acrylic acid (i.e. 4.3) being lower than that of the pH of the second suspension (i.e. 6). The acrylic acid would therefore predominantly remain in the second suspension in its deprotonated form (i.e. as an acrylic acid salt). The same goes with the sulphuric acid. However, the presence of charge-bearing acrylic acid salt that contribute the make-up of the polymer allows for the persistence of the ion-dipole interactions between the polymer and the aqueous solvent and at the same time imparts an electrostatic repulsion throughout the copolymer chain, hindering the coil-to-globule structural transformation of the polymer. The polymer thus could not be precipitated out from the second suspension.

Meanwhile, in FIG. 6B, sulphuric acid is added into the first suspension in forming a second suspension with a pH of 3. There is an apparent sign of sediments formed by precipitation which indicates the separation of the polymer and the aqueous solvent and the conformational changes of the polymer are deemed successful. In this instance, the $pK_a$ value of the acrylic acid (i.e. 4.3) is higher than that of the pH of the second suspension (i.e. 3). The acrylic acid would therefore predominantly exist in the second suspension in its protonated form (i.e. as an acrylic acid). On the other hand, with the $pK_a$ value of the sulphuric acid (i.e. −2.8) being lower than that of the pH of the second suspension (i.e. 3), the sulphuric acid would exist in the second suspension in its deprotonated form. The presence of uncharged acrylic acid that assists in the construction of the polymer helps eliminate or significantly reduces the ion-dipole interactions between the polymer and the aqueous solvent and simultaneously initiates the aggregation of the polymer. As a result, precipitation of the polymer occurs.

Figure 7:
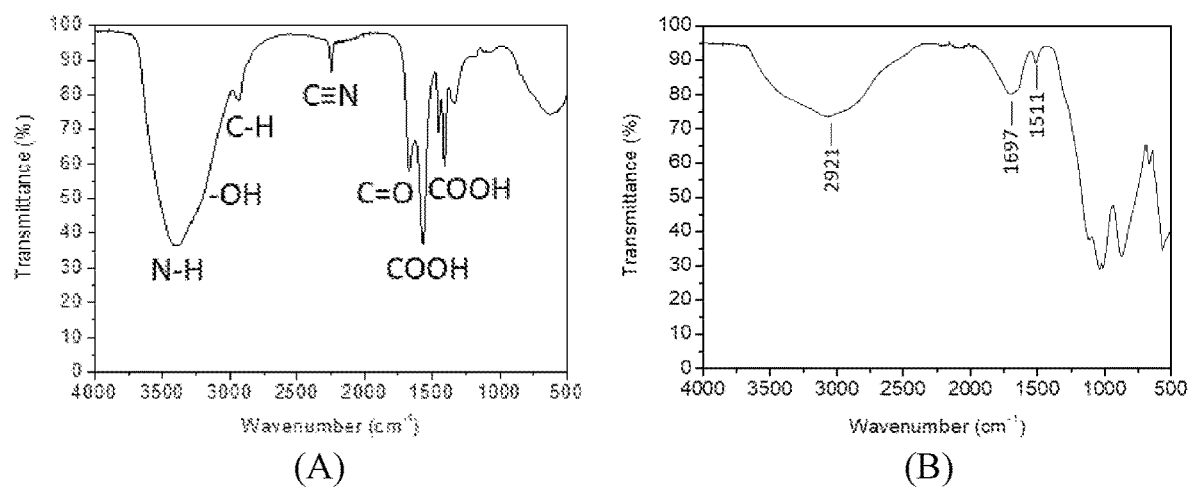
FIGS. 7A and 7B illustrate the infrared spectroscopy of the precipitated polymer and the remaining of the second suspension of Example 38 respectively.

FIGS. 7A and 7B illustrate the infrared spectroscopy of the precipitated polymer and the remaining of the second suspension of Example 38 respectively. The polymer comprises structural units derived from a carboxylic acid group-containing monomer, a nitrile group-containing monomer and an amide group-containing monomer.

FIG. 7A is used for the identification of the precipitated chemical substances by detecting the various functional groups present within. The figure presents the 2242 $cm^{-1}$ (C≡N), 3400 $cm^{-1}$ (N—H), 1600 $cm^{-1}$ (C=O), 1500 $cm^{-1}$ (COOH) and 1403 $cm^{-1}$ (COOH) peaks observed in transmittance, which are consistent with the nitrile group, amide group and carboxylic group comprised within the polymer that was originally present in the first suspension. This validates that the precipitated chemical substances are, in fact, the polymer disclosed in the present invention.

Figure 8:
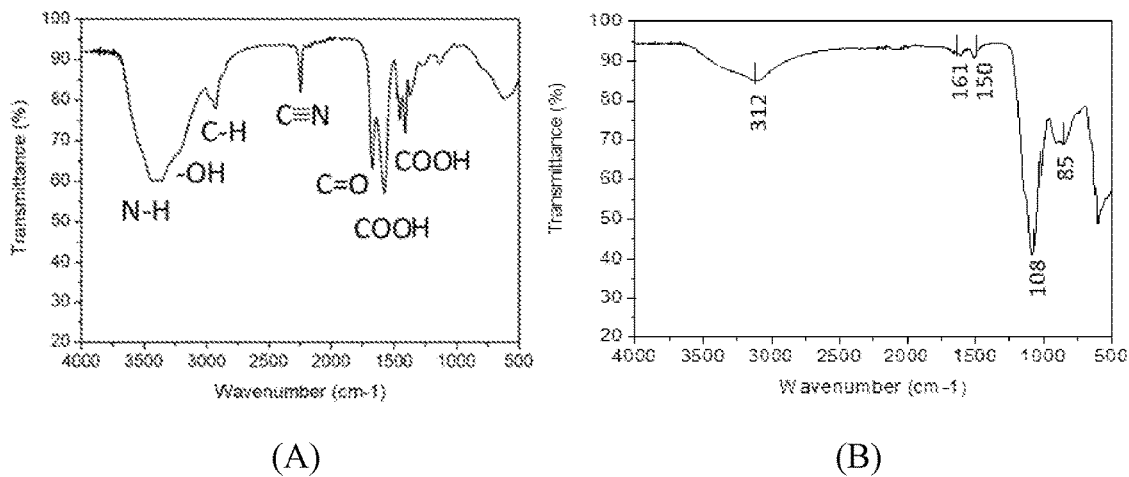
FIGS. 8A and 8B illustrate the infrared spectroscopy of the precipitated polymer and the remaining of the second suspension of Example 37 respectively.

Meanwhile, FIG. 7B is used to uncover the effectiveness and quality of precipitation of the polymer from the second suspension, i.e. to find out if the polymer is still present in the remaining of the second suspension. None of the characteristic peaks associated with a nitrile group, an amide group and a carboxylic group that correspond to the polymer is found in the infra-red spectrum in FIG. 7B. It is evident that no observable polymer is present in the remainder of the second suspension. This provides evidence that the method of the present invention is highly effective in precipitating the polymer, avoids contamination of the polymer and enables excellent materials recovery. At the same time, with FIGS. 8A and 8B illustrating the infrared spectroscopy of the precipitated polymer and the remaining of the second suspension of Example 37 respectively that display similar results as FIGS. 7A and 7B, this further affirms the applicability and efficacy of the method disclosed herein in precipitating a polymer.

In some embodiments, the precipitation agent is a weak acid. Weak acid is one that does not fully ionize or dissociate to produce hydrogen ions when dissolved in water. In some embodiments, the weak acid is an organic acid. In some embodiments, the organic acid is selected from the group consisting of formic acid, acetic acid, glycolic acid, glyoxylic acid, oxalic acid, propionic acid, acrylic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid or combinations thereof.

In some embodiments, the weak acid is phosphoric acid, nitrous acid, orthosilicic acid or combinations thereof.

In some embodiments, the $pK_a$ of the weak acid is from about 2 to about 7, from about 2.2 to about 7, from about 2.4 to about 7, from about 2.6 to about 7, from about 2.8 to about 7, from about 3 to about 7, from about 3.2 to about 7, from about 3.4 to about 7, from about 3.6 to about 7, from about 3.8 to about 7, from about 4 to about 7, from about 2 to about 6.5, from about 2.2 to about 6.5, from about 2.4 to about 6.5, from about 2.6 to about 6.5, from about 2.8 to about 6.5, from about 3 to about 6.5, from about 3.2 to about 6.5, from about 3.4 to about 6.5, from about 3.6 to about 6.5, from about 3.8 to about 6.5, from about 4 to about 6.5, from about 2 to about 6, from about 2.2 to about 6, from about 2.4 to about 6, from about 2.6 to about 6, from about 2.8 to about 6, from about 3 to about 6, from about 3.2 to about 6, from about 3.4 to about 6, from about 3.6 to about 6, from about 3.8 to about 6, from about 4 to about 6, from about 2 to about 5.5, from about 2.1 to about 5.5, from about 2.2 to about 5.5, from about 2.3 to about 5.5, from about 2.4 to about 5.5, from about 2.5 to about 5.5, from about 2.6 to about 5.5, from about 2.7 to about 5.5, from about 2.8 to about 5.5, from about 2.9 to about 5.5, from about 3 to about 5.5, from about 3.1 to about 5.5, from about 3.2 to about 5.5, from about 3.3 to about 5.5, from about 3.4 to about 5.5, from about 3.5 to about 5.5, from about 3.6 to about 5.5, from about 3.7 to about 5.5, from about 3.8 to about 5.5, from about 3.9 to about 5.5, from about 4 to about 5.5, from about 2 to about 5.4, from about 2.1 to about 5.4, from about 2.2 to about 5.4, from about 2.3 to about 5.4, from about 2.4 to about 5.4, from about 2.5 to about 5.4, from about 2.6 to about 5.4, from about 2.7 to about 5.4, from about 2.8 to about 5.4, from about 2.9 to about 5.4, from about 3 to about 5.4, from about 3.1 to about 5.4, from about 3.2 to about 5.4, from about 3.3 to about 5.4, from about 3.4 to about 5.4, from about 3.5 to about 5.4, from about 3.6 to about 5.4, from about 3.7 to about 5.4, from about 3.8 to about 5.4, from about 3.9 to about 5.4, from about 4 to about 5.4, from about 2 to about 5.2, from about 2.1 to about 5.2, from about 2.2 to about 5.2, from about 2.3 to about 5.2, from about 2.4 to about 5.2, from about 2.5 to about 5.2, from about 2.6 to about 5.2, from about 2.7 to about 5.2, from about 2.8 to about 5.2, from about 2.9 to about 5.2, from about 3 to about 5.2, from about 3.1 to about 5.2, from about 3.2 to about 5.2, from about 3.3 to about 5.2, from about 3.4 to about 5.2, from about 3.5 to about 5.2, from about 3.6 to about 5.2, from about 3.7 to about 5.2, from about 3.8 to about 5.2, from about 3.9 to about 5.2, from about 4 to about 5.2, from about 2 to about 5, from about 2.1 to about 5, from about 2.2 to about 5, from about 2.3 to about 5, from about 2.4 to about 5, from about 2.5 to about 5, from about 2.6 to about 5, from about 2.7 to about 5, from about 2.8 to about 5, from about 2.9 to about 5, from about 3 to about 5, from about 3.1 to about 5, from about 3.2 to about 5, from about 3.3 to about 5, from about 3.4 to about 5, from about 3.5 to about 5, from about 3.6 to about 5, from about 3.7 to about 5, from about 3.8 to about 5, from about 3.9 to about 5, from about 4 to about 5, from about 2 to about 4.9, from about 2 to about 4.8, from about 2 to about 4.7, from about 2 to about 4.6, from about 2 to about 4.5, from about 2 to about 4.4, from about 2 to about 4.3, from about 2 to about 4.2, from about 2 to about 4.1, from about 2 to about 4, from about 2 to about 3.9, from about 2 to about 3.8, from about 2 to about 3.7, from about 2 to about 3.6, from about 2 to about 3.5, from about 2 to about 3.4, from about 2 to about 3.3, from about 2 to about 3.2, from about 2 to about 3.1, from about 2 to about 3, from about 2.2 to about 4.8, from about 2.2 to about 4.6, from about 2.2 to about 4.4, from about 2.2 to about 4.2, from about 2.5 to about 4.8, from about 2.5 to about 4.6, from about 2.5 to about 4.4, from about 2.5 to about 4.2, from about 2.5 to about 4, from about 2.5 to about 3.8 or from about 2.5 to about 3.6.

In some embodiments, the $pK_a$ of the weak acid is less than 7, less than 6.5, less than 6, less than 5.5, less than 5.4, less than 5.3, less than 5.2, less than 5.1, less than 5, less than 4.9, less than 4.8, less than 4.7, less than 4.6, less than 4.5, less than 4.4, less than 4.3, less than 4.2, less than 4.1, less than 4, less than 3.9, less than 3.8, less than 3.7, less than 3.6, less than 3.5, less than 3.4, less than 3.3, less than 3.2, less than 3.1, less than 3, less than 2.9, less than 2.8, less than 2.7, less than 2.6, less than 2.5, less than 2.4, less than 2.3, less than 2.2 or less than 2.1. In some embodiments, the $pK_a$ of the weak acid is more than 2, more than 2.1, more than 2.2, more than 2.3, more than 2.4, more than 2.5, more than 2.6, more than 2.7, more than 2.8, more than 2.9, more than 3, more than 3.1, more than 3.2, more than 3.3, more than 3.4, more than 3.5, more than 3.6, more than 3.7, more than 3.8, more than 3.9, more than 4, more than 4.1, more than 4.2, more than 4.3, more than 4.4, more than 4.5, more than 4.6, more than 4.7, more than 4.8, more than 4.9, more than 5, more than 5.1, more than 5.2, more than 5.3, more than 5.4, more than 5.5, more than 6 or more than 6.5.

In some embodiments, the $pK_a$ of the weak acid is between 2 and 7, between 2 and 6.5, between 2 and 6, between 2 and 5.5, between 2 and 5.4, between 2 and 5.2, between 2 and 5, between 2 and 4.8, between 2 and 4.6, between 2 and 4.4, between 2 and 4.2 or between 2 and 4.

Some non-limiting examples of polyprotic weak acid include oxalic acid, malonic acid, tartronic acid, dihydroxymalonic acid, mesoxalic acid, butanedioic acid, methylmalonic acid, fumaric acid, maleic acid, 2-hydroxybutanedioic acid, tartaric acid, oxaloacetic acid, dioxosuccinic acid, glutaric acid, 2-oxoglutaric acid, 3-oxoglutaric acid, hexanedioic acid, citric acid, aconitic acid, isocitric acid, pimelic acid, trimesic acid, mellitic acid, malic acid, dithionous acid and orthosilicic acid.

In a phosphoric acid, there are three protons that could be dissociated per molecule. With phosphoric acid having a $pK_a$ of 2.12 in attaining first proton dissociation, phosphoric acid is regarded as a weak acid. Meanwhile, with the second proton in phosphoric acid dissociates at a $pK_a$ of 7.21 and the third at a $pK_a$ of 12.32, phosphoric acid after the dissociation of the first proton is no longer a weak acid, and thus it is not necessary to consider the dissociation of the second and subsequent protons. Therefore, the proton concentration premised on the dissociation from phosphoric acid is calculated assuming that only one proton dissociates from one molecule of phosphoric acid.

In the present invention, the weak acid specifically refers to an acid with a $pK_a$ of 2 to 7 or between 2 and 7. In some embodiments, a polyprotic weak acid is an acid with a $pK_a$ of from about 2 to about 7 for the dissociation of the first proton, second proton, third proton or combinations thereof. In some embodiments, a polyprotic weak acid is an acid with a $pK_a$ of between 2 and 7 for the dissociation of the first proton, second proton, third proton or combinations thereof.

In the case of oxalic acid, there are two protons that could be dissociated per molecule. With oxalic acid having a $pK_a$ of 1.25 in attaining first proton dissociation, oxalic acid is regarded as a strong acid. With the second proton in oxalic acid dissociates at a $pK_a$ of 3.81, oxalic acid after the dissociation of the first proton is a weak acid. Therefore, the proton concentration premised on the dissociation from oxalic acid is calculated based on the dissociation of the first proton and partial dissociation of the second proton from one molecule of oxalic acid. An oxalic acid, therefore, could be regarded as both a polyprotic strong acid (associated with the dissociation of the first proton) and a polyprotic weak acid (related to the dissociation of the second proton).

In some embodiments, when a weak acid, being utilized as the precipitation agent, is added into a first suspension to form a second suspension, the pH of the second suspension is from about 0.5 to about 3, from about 0.5 to about 2.9, from about 0.5 to about 2.8, from about 0.5 to about 2.7, from about 0.5 to about 2.6, from about 0.5 to about 2.5, from about 0.5 to about 2.4, from about 0.5 to about 2.3, from about 0.5 to about 2.2, from about 0.5 to about 2.1, from about 0.5 to about 2, from about 0.5 to about 1.9, from about 0.5 to about 1.8, from about 0.5 to about 1.7, from about 0.5 to about 1.6, from about 0.5 to about 1.5, from about 0.6 to about 3, from about 0.6 to about 2.9, from about 0.6 to about 2.8, from about 0.6 to about 2.7, from about 0.6 to about 2.6, from about 0.6 to about 2.5, from about 0.6 to about 2.4, from about 0.6 to about 2.3, from about 0.6 to about 2.2, from about 0.6 to about 2.1, from about 0.6 to about 2, from about 0.6 to about 1.9, from about 0.6 to about 1.8, from about 0.6 to about 1.7, from about 0.6 to about 1.6, from about 0.7 to about 3, from about 0.7 to about 2.9, from about 0.7 to about 2.8, from about 0.7 to about 2.7, from about 0.7 to about 2.6, from about 0.7 to about 2.5, from about 0.7 to about 2.4, from about 0.7 to about 2.3, from about 0.7 to about 2.2, from about 0.7 to about 2.1, from about 0.7 to about 2, from about 0.7 to about 1.9, from about 0.7 to about 1.8, from about 0.7 to about 1.7, from about 0.8 to about 3, from about 0.8 to about 2.9, from about 0.8 to about 2.8, from about 0.8 to about 2.7, from about 0.8 to about 2.6, from about 0.8 to about 2.5, from about 0.8 to about 2.4, from about 0.8 to about 2.3, from about 0.8 to about 2.2, from about 0.8 to about 2.1, from about 0.8 to about 2, from about 0.8 to about 1.9, from about 0.8 to about 1.8, from about 0.9 to about 3, from about 0.9 to about 2.9, from about 0.9 to about 2.8, from about 0.9 to about 2.7, from about 0.9 to about 2.6, from about 0.9 to about 2.5, from about 0.9 to about 2.4, from about 0.9 to about 2.3, from about 0.9 to about 2.2, from about 0.9 to about 2.1, from about 0.9 to about 2, from about 0.9 to about 1.9, from about 1 to about 3, from about 1 to about 2.9, from about 1 to about 2.8, from about 1 to about 2.7, from about 1 to about 2.6, from about 1 to about 2.5, from about 1 to about 2.4, from about 1 to about 2.3, from about 1 to about 2.2, from about 1 to about 2.1, from about 1 to about 2, from about 1.2 to about 3, from about 1.2 to about 2.8, from about 1.2 to about 2.6, from about 1.2 to about 2.4, from about 1.2 to about 2.2, from about 1.5 to about 3, from about 1.5 to about 2.8 or from about 1.5 to about 2.6.

In some embodiments, when a weak acid, being utilized as the precipitation agent, is added into a first suspension to form a second suspension, the pH of the second suspension is less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7 or less than 0.6. In some embodiments, when a weak acid, being utilized as the precipitation agent, is added into a first suspension to form a second suspension, the pH of the second suspension is more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8, more than 1.9, more than 2, more than 2.1, more than 2.2, more than 2.3, more than 2.4, more than 2.5, more than 2.6, more than 2.7, more than 2.8 or more than 2.9.

In some embodiments, the pH of the second suspension is from about 0.2 to about 4.5, from about 0.2 to about 4.4, from about 0.2 to about 4.3, from about 0.2 to about 4.1, from about 0.2 to about 4, from about 0.2 to about 3.8, from about 0.2 to about 3.6, from about 0.2 to about 3.4, from about 0.2 to about 3.2, from about 0.2 to about 3, from about 0.2 to about 2.8, from about 0.2 to about 2.6, from about 0.2 to about 2.4, from about 0.2 to about 2.2, from about 0.2 to about 2, from about 0.2 to about 1.8, from about 0.2 to about 1.6, from about 0.2 to about 1.4, from about 0.2 to about 1.2, from about 0.4 to about 4.5, from about 0.4 to about 4.5, from about 0.4 to about 4.3, from about 0.4 to about 4.1, from about 0.4 to about 4, from about 0.4 to about 3.8, from about 0.4 to about 3.6, from about 0.4 to about 3.4, from about 0.4 to about 3.2, from about 0.4 to about 3, from about 0.4 to about 2.8, from about 0.4 to about 2.6, from about 0.4 to about 2.4, from about 0.4 to about 2.2, from about 0.4 to about 2, from about 0.4 to about 1.8, from about 0.4 to about 1.6, from about 0.4 to about 1.4, from about 0.6 to about 4.5, from about 0.6 to about 4.3, from about 0.6 to about 4.1, from about 0.6 to about 4, from about 0.6 to about 3.8, from about 0.6 to about 3.6, from about 0.6 to about 3.4, from about 0.6 to about 3.2, from about 0.6 to about 3, from about 0.6 to about 2.8, from about 0.6 to about 2.6, from about 0.6 to about 2.4, from about 0.6 to about 2.2, from about 0.6 to about 2, from about 0.6 to about 1.8, from about 0.6 to about 1.6, from about 0.8 to about 4.5, from about 0.8 to about 4.3, from about 0.8 to about 4.1, from about 0.8 to about 4, from about 0.8 to about 3.8, from about 0.8 to about 3.6, from about 0.8 to about 3.4, from about 0.8 to about 3.2, from about 0.8 to about 3, from about 0.8 to about 2.8, from about 0.8 to about 2.6, from about 0.8 to about 2.4, from about 0.8 to about 2.2, from about 0.8 to about 2, from about 0.8 to about 1.8, from about 1 to about 4.5, from about 1 to about 4.3, from about 1 to about 4.1, from about 1 to about 4, from about 1 to about 3.8, from about 1 to about 3.6, from about 1 to about 3.4, from about 1 to about 3.2, from about 1 to about 3, from about 1 to about 2.8, from about 1 to about 2.6, from about 1 to about 2.4, from about 1 to about 2.2, from about 1 to about 2, from about 1.2 to about 4.5, from about 1.2 to about 4, from about 1.2 to about 3.8, from about 1.2 to about 3.6, from about 1.2 to about 3.4, from about 1.2 to about 3.2, from about 1.2 to about 3, from about 1.2 to about 2.8, from about 1.4 to about 4.5, from about 1.4 to about 4, from about 1.4 to about 3.8, from about 1.4 to about 3.6, from about 1.4 to about 3.4, from about 1.4 to about 3.2, from about 1.4 to about 3, from about 1.4 to about 2.8, from about 1.6 to about 4.5, from about 1.6 to about 4, from about 1.6 to about 3.8, from about 1.6 to about 3.6, from about 1.6 to about 3.4, from about 1.6 to about 3.2, from about 1.6 to about 3, from about 1.8 to about 4.5, from about 1.8 to about 4, from about 1.8 to about 3.8, from about 1.8 to about 3.6, from about 1.8 to about 3.4, from about 1.8 to about 3.2, from about 2 to about 4.5, from about 2 to about 4, from about 2 to about 3.8, from about 2 to about 3.6 or from about 2 to about 3.4.

In some embodiments, the pH of the second suspension is less than 4.5, less than 4.4, less than 4.3, less than 4.2, less than 4.1, less than 4, less than 3.9, less than 3.8, less than 3.7, less than 3.6, less than 3.5, less than 3.4, less than 3.3, less than 3.2, less than 3.1, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4 or less than 0.3. In some embodiments, the pH of the second suspension is more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8, more than 1.9, more than 2, more than 2.1, more than 2.2, more than 2.3, more than 2.4, more than 2.5, more than 2.6, more than 2.7, more than 2.8, more than 2.9, more than 3, more than 3.1, more than 3.2, more than 3.3, more than 3.4, more than 3.5, more than 3.6, more than 3.7, more than 3.8, more than 3.9, more than 4, more than 4.1, more than 4.2, more than 4.3 or more than 4.4.

In some embodiments, the pH of the second suspension is from about 0.2 pH unit to about 6.8 pH units, from about 0.2 pH unit to about 6.5 pH units, from about 0.2 pH unit to about 6 pH units, from about 0.2 pH unit to about 5.5 pH units, from about 0.2 pH unit to about 5 pH units, from about 0.2 pH unit to about 4.5 pH units, from about 0.2 pH unit to about 4 pH units, from about 0.2 pH unit to about 3.5 pH units, from about 0.2 pH unit to about 3 pH units, from about 0.2 pH unit to about 2.5 pH units, from about 0.2 pH unit to about 2 pH units, from about 0.5 pH unit to about 6.8 pH units, from about 0.5 pH unit to about 6.5 pH units, from about 0.5 pH unit to about 6 pH units, from about 0.5 pH unit to about 5.5 pH units, from about 0.5 pH unit to about 5 pH units, from about 0.5 pH unit to about 4.5 pH units, from about 0.5 pH unit to about 4 pH units, from about 0.5 pH unit to about 3.5 pH units, from about 0.5 pH unit to about 3 pH units, from about 0.5 pH unit to about 2.5 pH units, from about 1 pH unit to about 6.8 pH units, from about 1 pH unit to about 6.5 pH units, from about 1 pH unit to about 6 pH units, from about 1 pH unit to about 5.5 pH units, from about 1 pH unit to about 5 pH units, from about 1 pH unit to about 4.5 pH units, from about 1 pH unit to about 4 pH units, from about 1 pH unit to about 3.5 pH units, from about 1 pH unit to about 3 pH units, from about 1.5 pH units to about 6.8 pH units, from about 1.5 pH units to about 6.5 pH units, from about 1.5 pH units to about 6 pH units, from about 1.5 pH units to about 5.5 pH units, from about 1.5 pH units to about 5 pH units, from about 1.5 pH units to about 4.5 pH units, from about 1.5 pH units to about 4 pH units or from about 1.5 pH units to about 3.5 pH units, below the $pK_a$ of the acid group-containing monomer.

In some embodiments, the pH of the second suspension is at least 0.2 pH unit, at least 0.5 pH unit, at least 1 pH unit, at least 1.5 pH units, at least 2 pH units, at least 2.5 pH units, at least 3 pH units, at least 3.5 pH units, at least 4 pH units, at least 4.5 pH units, at least 5 units, at least 5.5 pH units, at least 6 pH units or at least 6.5 pH units, below the $pK_a$ of the acid group-containing monomer. In some embodiments, the pH of the second suspension is at most 6.8 pH units, at most 6.5 pH units, at most 6 pH units, at most 5.5 pH units, at most 5 pH units, at most 4.5 pH units, at most 4 pH units, at most 3.5 pH units, at most 3 pH units, at most 2.5 pH units, at most 2 pH units, at most 1.5 pH units, at most 1 pH unit or at most 0.5 pH unit, below the $pK_a$ of the acid group-containing monomer.

In some embodiments, the concentration of the precipitation agent is from about 1 M to about 8 M, from about 1 M to about 7.5 M, from about 1 M to about 7 M, from about 1 M to about 6.5 M, from about 1 M to about 6 M, from about 1 M to about 5.5 M, from about 1 M to about 5 M, from about 1 M to about 4.5 M, from about 1 M to about 4 M, from about 1.5 M to about 8 M, from about 1.5 M to about 7.5 M, from about 1.5 M to about 7 M, from about 1.5 M to about 6.5 M, from about 1.5 M to about 6 M, from about 1.5 M to about 5.5 M, from about 1.5 M to about 5 M, from about 1.5 M to about 4.5 M, from about 2 M to about 8 M, from about 2 M to about 7.5 M, from about 2 M to about 7 M, from about 2 M to about 6.5 M, from about 2 M to about 6 M, from about 2 M to about 5.5 M, from about 2 M to about 5 M, from about 2.5 M to about 8 M, from about 2.5 M to about 7.5 M, from about 2.5 M to about 7 M, from about 2.5 M to about 6.5 M, from about 2.5 M to about 6 M, from about 2.5 M to about 5.5 M, from about 3 M to about 8 M, from about 3 M to about 7.5 M, from about 3 M to about 7 M, from about 3 M to about 6.5 M, from about 3 M to about 6M or from about 4 M to about 8 M.

In some embodiments, the concentration of the precipitation agent is less than 8 M, less than 7.5 M, less than 7 M, less than 6.5 M, less than 6 M, less than 5.5 M, less than 5 M, less than 4.5 M, less than 4 M, less than 3.5 M, less than 3 M, less than 2.5 M, less than 2 M or less than 1.5 M. In some embodiments, the concentration of the precipitation agent is more than 1 M, more than 1.5 M, more than 2 M, more than 2.5 M, more than 3 M, more than 3.5 M, more than 4 M, more than 4.5 M, more than 5 M, more than 5.5 M, more than 6 M, more than 6.5 M, more than 7 M or more than 7.5 M.

After the addition of the precipitation agent into the first suspension in forming a second suspension, the time allowed for the precipitation agent to induce precipitation of the polymer is crucial in attaining precipitation of the polymer in the second suspension. When there is an inadequate amount of contact time between the precipitation agent and the constituents of the first suspension, the precipitation agent might not possess sufficient time to destabilize, disrupt and break the bonds that are initially formed between the polymer and the aqueous solvent to an extent that precipitation of the polymer is made possible. In some embodiments, after the addition of the precipitation agent into the first suspension in forming a second suspension, the precipitation agent is being placed in the second suspension without stirring for a time period of from about 1 minute to about 180 minutes, from about 1 minute to about 160 minutes, from about 1 minute to about 140 minutes, from about 1 minute to 120 minutes, from about 1 minute to about 110 minutes, from about 1 minute to about 100 minutes, from about 1 minute to about 90 minutes, from about 1 minute to about 80 minutes, from about 1 minute to about 70 minutes, from about 1 minute to about 60 minutes, from about 3 minutes to about 120 minutes, from about 3 minutes to about 110 minutes, from about 3 minutes to about 100 minutes, from about 3 minutes to about 90 minutes, from about 3 minutes to about 80 minutes, from about 3 minutes to about 70 minutes, from about 3 minutes to about 60 minutes, from about 5 minutes to about 120 minutes, from about 5 minutes to about 110 minutes, from about 5 minutes to about 100 minutes, from about 5 minutes to about 90 minutes, from about 5 minutes to about 80 minutes, from about 5 minutes to about 70 minutes, from about 5 minutes to about 60 minutes, from about 10 minutes to about 120 minutes, from about 10 minutes to about 110 minutes, from about 10 minutes to about 100 minutes, from about 10 minutes to about 90 minutes, from about 10 minutes to about 80 minutes, from about 10 minutes to about 70 minutes, from about 10 minutes to about 60 minutes, from about 15 minutes to about 120 minutes, from about 15 minutes to about 110 minutes, from about 15 minutes to about 100 minutes, from about 15 minutes to about 90 minutes, from about 15 minutes to about 80 minutes, from about 15 minutes to about 70 minutes, from about 15 minutes to about 60 minutes, from about 20 minutes to about 120 minutes, from about 20 minutes to about 110 minutes, from about 20 minutes to about 100 minutes, from about 20 minutes to about 90 minutes, from about 20 minutes to about 80 minutes, from about 20 minutes to about 70 minutes, from about 20 minutes to about 60 minutes, from about 25 minutes to about 120 minutes, from about 25 minutes to about 110 minutes, from about 25 minutes to about 100 minutes, from about 25 minutes to about 90 minutes, from about 25 minutes to about 80 minutes, from about 25 minutes to about 70 minutes, from about 25 minutes to about 60 minutes, from about 30 minutes to about 120 minutes, from about 30 minutes to about 110 minutes, from about 30 minutes to about 100 minutes, from about 30 minutes to about 90 minutes, from about 30 minutes to about 80 minutes, from about 30 minutes to about 70 minutes or from about 30 minutes to about 60 minutes.

In some embodiments, after the addition of the precipitation agent into the first suspension in forming a second suspension, the precipitation agent is being placed in the second suspension without stirring for a time period of less than 180 minutes, less than 160 minutes, less than 140 minutes, less than 120 minutes, less than 110 minutes, less than 100 minutes, less than 90 minutes, less than 80 minutes, less than 70 minutes, less than 60 minutes, less than 50 minutes, less than 40 minutes, less than 30 minutes, less than 20 minutes, less than 15 minutes, less than 10 minutes or less than 5 minutes. In some embodiments, after the addition of the precipitation agent into the first suspension in forming a second suspension, the precipitation agent is being placed in the second suspension without stirring for a time period of more than 1 minute, more than 3 minutes, more than 5 minutes, more than 10 minutes, more than 15 minutes, more than 20 minutes, more than 30 minutes, more than 40 minutes, more than 50 minutes, more than 60 minutes, more than 70 minutes, more than 80 minutes, more than 90 minutes, more than 100 minutes, more than 110 minutes, more than 120 minutes, more than 140 minutes or more than 160 minutes.

One of the most important factors in governing the precipitation of a polymer is the temperature of the second suspension. Hydrogen bonding is primarily formed at relatively low temperatures and weakens upon an increase in temperature. In addition, hydrophobic interactions are strengthened at high temperatures. Hence, a second suspension with a slight temperature elevation can help facilitate the precipitation of a polymer via the weakening of hydrogen bonding interactions between the polymer and the aqueous solvent and the strengthening of hydrophobic interactions of the hydrophobic group-containing monomer that contribute the make-up of the polymer.

In some embodiments, the precipitation agent is added into the first suspension at a temperature of from about 20° C. to about 95° C., from about 20° C. to about 90° C., from about 20° C. to about 85° C., from about 20° C. to about 80° C., from about 20° C. to about 75° C., from about 20° C. to about 70° C., from about 20° C. to about 65° C., from about 20° C. to about 60° C., from about 20° C. to about 55° C., from about 20° C. to about 50° C., from about 25° C. to about 95° C., from about 25° C. to about 90° C., from about 25° C. to about 85° C., from about 25° C. to about 80° C., from about 25° C. to about 75° C., from about 25° C. to about 70° C., from about 25° C. to about 65° C., from about 25° C. to about 60° C., from about 25° C. to about 55° C., from about 25° C. to about 50° C., from about 30° C. to about 95° C., from about 30° C. to about 90° C., from about 30° C. to about 85° C., from about 30° C. to about 80° C., from about 30° C. to about 75° C., from about 30° C. to about 70° C., from about 30° C. to about 65° C., from about 30° C. to about 60° C., from about 30° C. to about 55° C., from about 30° C. to about 50° C., from about 35° C. to about 95° C., from about 35° C. to about 90° C., from about 35° C. to about 85° C., from about 35° C. to about 80° C., from about 35° C. to about 75° C., from about 35° C. to about 70° C., from about 35° C. to about 65° C., from about 35° C. to about 60° C., from about 35° C. to about 55° C., from about 40° C. to about 95° C., from about 40° C. to about 90° C., from about 40° C. to about 85° C., from about 40° C. to about 80° C., from about 40° C. to about 75° C., from about 40° C. to about 70° C., from about 40° C. to about 65° C., from about 40° C. to about 60° C., from about 45° C. to about 95° C., from about 45° C. to about 90° C., from about 45° C. to about 85° C., from about 45° C. to about 80° C., from about 45° C. to about 75° C., from about 45° C. to about 70° C., from about 45° C. to about 65° C., from about 50° C. to about 90° C., from about 50° C. to about 85° C., from about 50° C. to about 80° C. or from about 50° C. to about 70° C.

In some embodiments, the precipitation agent is added into the first suspension at a temperature of less than 95° C., less than 90° C., less than 85° C., less than 80° C., less than 75° C., less than 70° C., less than 65° C., less than 60° C., less than 55° C., less than 50° C., less than 45° C., less than 40° C., less than 35° C., less than 30° C. or less than 25° C. In some embodiments, the precipitation agent is added into the first suspension at a temperature of more than 20° C., more than 25° C., more than 30° C., more than 35° C., more than 40° C., more than 45° C., more than 50° C., more than 55° C., more than 60° C., more than 65° C., more than 70° C., more than 75° C., more than 80° C., more than 85° C. or more than 90° C.

With a higher proportion of charged functional group(s) (e.g. acid salt group) in the copolymer that is/are capable of developing ion-dipole interactions with the water molecules in the aqueous solvent, a comparatively higher concentration or amount of precipitation agent might be required to be added into the first suspension to form a second suspension with a desirable pH range as specified in the current invention. This is attributed to the facts that (1) the strength of ion-dipole interactions is stronger than that of hydrogen bonding, and thus formation of a higher concentration of hydroxonium ions could potentially smoothen the separation process of the polymer from the aqueous solvent by increasing the likelihood of breaking the stronger ion-dipole interactions and (2) a higher proportion of charged functional group(s) would require a greater concentration of hydroxonium ions (or hydrogen ions) for protonation, and hence the resulting change in charges (i.e. from negatively charged to uncharged) of the polymer could be sufficient in inducing structural transformation.

In some embodiments, after the addition of the precipitation agent into the first suspension in forming a second suspension, the second suspension is being stirred to achieve precipitation of the polymer. In some embodiments, a planetary stirring mixer, a stirring mixer, a blender, an ultrasonicator or a combination thereof is being used to stir the second suspension.

In some embodiments, before the addition of the precipitation agent into the first suspension in forming a second suspension, the first suspension is being stirred to maximize the dissolution of the polymer in the aqueous solvent and allow for a more well-dispersed polymer within the first suspension. In some embodiments, a planetary stirring mixer, a stirring mixer, a blender, an ultrasonicator or a combination thereof is being used to stir the first suspension.

In some embodiments, the second suspension is stirred at a speed of from about 150 rpm to about 600 rpm, from about 150 rpm to about 550 rpm, from about 150 rpm to about 500 rpm, from about 150 rpm to about 450 rpm, from about 150 rpm to about 400 rpm, from about 150 rpm to about 350 rpm, from about 200 rpm to about 600 rpm, from about 200 rpm to about 550 rpm, from about 200 rpm to about 500 rpm, from about 200 rpm to about 450 rpm, from about 200 rpm to about 400 rpm, from about 250 rpm to about 600 rpm, from about 250 rpm to about 550 rpm, from about 250 rpm to about 500 rpm, from about 250 rpm to about 450 rpm, from about 300 rpm to about 600 rpm, from about 300 rpm to about 550 rpm, from about 300 rpm to about 500 rpm, from about 350 rpm to about 600 rpm, from about 350 rpm to about 550 rpm or from about 400 rpm to about 600 rpm.

In some embodiments, the second suspension is stirred at a speed of less than 600 rpm, less than 580 rpm, less than 560 rpm, less than 540 rpm, less than 520 rpm, less than 500 rpm, less than 480 rpm, less than 460 rpm, less than 440 rpm, less than 420 rpm, less than 400 rpm, less than 380 rpm, less than 360 rpm, less than 340 rpm, less than 320 rpm, less than 300 rpm, less than 280 rpm, less than 260 rpm, less than 240 rpm, less than 220 rpm, less than 200 rpm or less than 180 rpm. In some embodiments, the second suspension is stirred at a speed of more than 150 rpm, more than 170 rpm, more than 200 rpm, more than 220 rpm, more than 240 rpm, more than 260 rpm, more than 280 rpm, more than 300 rpm, more than 320 rpm, more than 340 rpm, more than 360 rpm, more than 380 rpm, more than 400 rpm, more than 420 rpm, more than 440 rpm, more than 460 rpm, more than 480 rpm, more than 500 rpm, more than 520 rpm, more than 540 rpm, more than 560 rpm or more than 580 rpm.

In some embodiments, the second suspension is stirred for a time period of from about 1 minute to about 180 minutes, from about 1 minute to about 150 minutes, from about 1 minute to about 120 minutes, from about 1 minute to about 100 minutes, from about 1 minute to about 80 minutes, from about 1 minute to about 60 minutes, from about 3 minutes to about 180 minutes, from about 3 minutes to about 150 minutes, from about 3 minutes to about 120 minutes, from about 3 minutes to about 100 minutes, from about 3 minutes to about 80 minutes, from about 3 minutes to about 60 minutes, from about 5 minutes to about 180 minutes, from about 5 minutes to about 150 minutes, from about 5 minutes to about 120 minutes, from about 5 minutes to about 100 minutes, from about 5 minutes to about 80 minutes, from about 5 minutes to about 60 minutes, from about 10 minutes to about 180 minutes, from about 10 minutes to about 150 minutes, from about 10 minutes to about 120 minutes, from about 10 minutes to about 100 minutes, from about 10 minutes to about 80 minutes, from about 10 minutes to about 60 minutes, from about 15 minutes to about 180 minutes, from about 15 minutes to about 150 minutes, from about 15 minutes to about 120 minutes, from about 15 minutes to about 100 minutes, from about 15 minutes to about 80 minutes, from about 15 minutes to about 60 minutes, from about 20 minutes to about 150 minutes, from about 20 minutes to about 120 minutes, from about 20 minutes to about 100 minutes, from about 20 minutes to about 80 minutes, from about 20 minutes to about 60 minutes, from about 25 minutes to about 150 minutes, from about 25 minutes to about 120 minutes, from about 25 minutes to about 100 minutes, from about 25 minutes to about 80 minutes, from about 25 minutes to about 60 minutes, from about 30 minutes to about 150 minutes, from about 30 minutes to about 120 minutes, from about 30 minutes to about 100 minutes, from about 30 minutes to about 80 minutes or from about 30 minutes to about 60 minutes.

In some embodiments, the second suspension is stirred for a time period of less than 180 minutes, less than 160 minutes, less than 140 minutes, less than 120 minutes, less than 110 minutes, less than 100 minutes, less than 90 minutes, less than 80 minutes, less than 70 minutes, less than 60 minutes, less than 50 minutes, less than 40 minutes, less than 30 minutes, less than 20 minutes, less than 15 minutes, less than 10 minutes or less than 5 minutes. In some embodiments, the second suspension is stirred for a time period of more than 1 minute, more than 3 minutes, more than 5 minutes, more than 10 minutes, more than 15 minutes, more than 20 minutes, more than 30 minutes, more than 40 minutes, more than 50 minutes, more than 60 minutes, more than 70 minutes, more than 80 minutes, more than 90 minutes, more than 100 minutes, more than 110 minutes, more than 120 minutes, more than 140 minutes or more than 160 minutes.

In some embodiments, the planetary stirring mixer comprises at least one planetary blade and at least one high-speed dispersion blade. In certain embodiments, the rotational speed of the planetary blade is from about 20 rpm to about 200 rpm, from about 20 rpm to about 150 rpm, from about 30 rpm to about 150 rpm, or from about 50 rpm to about 100 rpm. In certain embodiments, the rotational speed of the dispersion blade is from about 1,000 rpm to about 4,000 rpm, from about 1,000 rpm to about 3,500 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 60 W/L, from about 40 W/L to about 50 W/L, from about 50 W/L to about 60 W/L, from about 20 W/L to about 80 W/L, from about 20 W/L to about 60 W/L, or from about 20 W/L to about 40 W/L. In certain embodiments, the ultrasonicator is operated at a power density of more than 10 W/L, more than 20 W/L, more than 30 W/L, more than 40 W/L, more than 50 W/L, more than 60 W/L, more than 70 W/L, more than 80 W/L or more than 90 W/L.

In some embodiments, the ultrasonicator operates at a power from about 100 W to about 1000 W, from about 200 W to about 1000 W, from about 300 W to about 1000 W, from about 400 W to about 1000 W, from about 500 W to about 1000 W, from about 500 W to about 900 W, from about 500 W to about 800 W, from about 500 W to about 700 W, or from about 500 W to about 600 W. In some embodiments, the ultrasonicator operates at a power of less than 1000 W, less than 900 W, less than 800 W, less than 700 W, less than 600 W, less than 500 W, less than 400 W, or less than 300 W. In some embodiments, the ultrasonicator operates at a power of more than 100 W, more than 200 W, more than 300 W, more than 400 W, more than 500 W, more than 600 W, more than 700 W, or more than 800 W.

In some embodiments, after the addition of a precipitation agent into the first suspension in forming a second suspension, the polymer is precipitated. In some embodiments, after the addition of a precipitation agent into the first suspension in forming a second suspension and with the precipitation agent being placed in the second suspension for a time period without stirring, the polymer is precipitated. In some embodiments, after the addition of a precipitation agent into the first suspension in forming a second suspension and stirring the second suspension for a time period, the polymer is precipitated.

In some embodiments, the second suspension is screened to separate the precipitated polymer from the remaining of the second suspension (comprising aqueous solvent and the dissolved precipitation agent). In some embodiments, filtration, sieving, decantation or a combination thereof may be used for screening of the second suspension.

Figure 9:
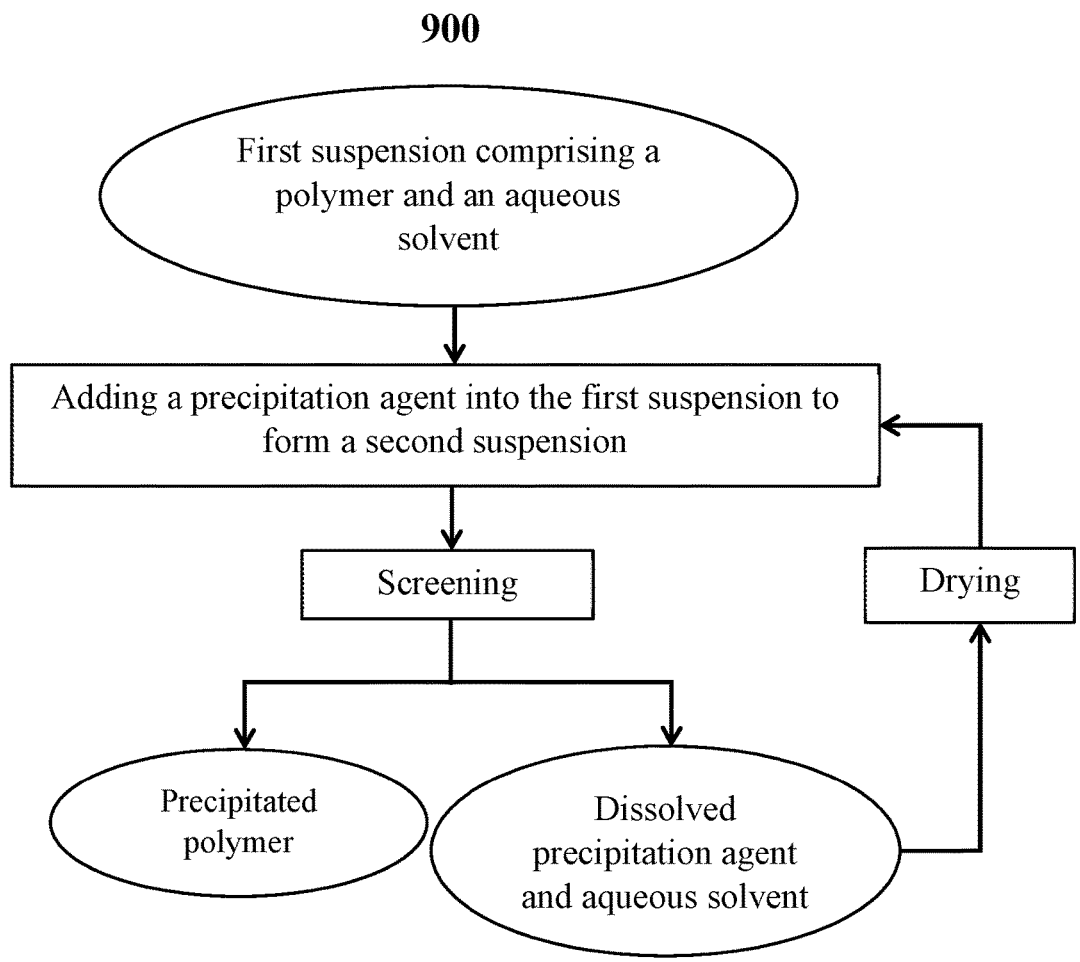
FIG. 9 is a flow chart of an embodiment illustrating the steps for precipitating a polymer as disclosed herein and its subsequent further processing for extraction of the precipitated polymer.

FIG. 9 is a flow chart of an embodiment illustrating the steps of method 900 for precipitating a polymer as disclosed herein and its subsequent further processing for extraction of the polymer. The remaining of the second suspension comprising the aqueous solvent and the dissolved precipitation agent could be subjected to drying or concentration for removal of the aqueous solvent. The recovered precipitation agent could be further reused for precipitation of other polymers. This allows the formation of a closed-loop recovery process where materials are repeatedly recycled and reused, and continually engage in a loop arrangement, which helps create a circular economy.

The method disclosed herein is specifically developed for the optimization of the polymer formulation, i.e., the composition of the polymer of the present invention is governed by the ability of the polymer to be precipitated with the addition of a precipitation agent. The utilization of the method of the present invention in precipitating a polymer, wherein the polymer comprises a copolymer comprising a structural unit derived from an acid group-containing monomer and a structural unit derived from a hydrophobic group-containing monomer, results in a high polymer recovery rate (>98%).

The polymer recovery rate refers to the proportion of the weight of the recovered polymer, based on the initial weight of polymer present in the first suspension before the addition of a precipitation agent. It serves as a reflection of the proportion of polymer retrieved and a gauge to the effectiveness of the method disclosed herein in precipitating the polymer. With the method disclosed herein yielding a high polymer recovery rate indicates that the majority of the polymer could be precipitated and retrieved with negligible amounts of polymer remaining in the second suspension.

The method of the present invention is particularly applicable as part of a battery electrode recycling system to achieve precipitation of a polymeric binder.

In some embodiments, the battery may be a primary battery or a secondary battery. Some non-limiting examples of the battery include alkaline battery, aluminium-air battery, lithium battery, lithium air battery, magnesium battery, solid-state battery, silver-oxide battery, zinc-air battery, aluminium-ion battery, lead-acid battery, lithium-ion battery, magnesium-ion battery, potassium-ion battery, sodium-ion battery, lithium-air battery, aluminium-air battery, zinc-air battery, sodium-air battery, silicon-air battery, zinc-ion battery and sodium-sulphur battery.

Over the past decades, lithium-ion batteries (LIBs) have become to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

With the drastic increase of lithium-ion batteries in circulation, concerns have been raised regarding flooding of the market with end-of-life (EoL) batteries. As tremendous amount of lithium-ion batteries are projected to approach their end-of-life, there is a pressing need in developing economical recycling processes for spent lithium-ion batteries to manage the end-of-life packs and cells. Aside from end-of-life batteries, there are large amount of electrode rejects or scraps generated during the battery manufacturing process that would require to be recycled.

Pyrometallurgical process is one of the recycling strategies that is proposed or employed for recycling end-of-life batteries, especially in the recovery of cathode constituents since cathode materials constitute the major high value added in production.

Pyrometallurgical process involves heating of the electrodes at high temperatures, beyond the decomposition temperature of the polymeric binder but ideally below the melting temperatures of other electrode constituents e.g. current collector and electrode active material. This process brings about the carbonization of the polymeric binder where recycling and/or reclaim of the polymeric binder is not feasible. On top of that, the combustion process might generate toxic compounds and/or pollutants produced by the decomposition of the polymeric binder. For example, in the case where an electrode that comprises polyvinylidene fluoride (PVDF) binder material undergoes pyrometallurgy, toxic compounds that could impose long-term health risks such as hydrogen fluoride would be produced. Pyrometallurgical process is also highly energy intensive and thus results in immense associated energy costs.

Current methods in recovery of constituents of an electrode layer (e.g. polymeric binder and electrode active material) of an electrode have their own shortcomings and are ineffective in the retrieval of the constituents of an electrode layer derived from water-based slurries. In view of this, there is a need to develop a method to recover constituents of an electrode layer derived from water-based slurries in highly efficient and effective manner.

Accordingly, the method of the present invention is particularly applicable as part of a battery electrode recycling system to achieve precipitation of a polymeric binder, wherein the polymeric binder refers to the polymer disclosed herein. The precipitation of the polymeric binder is attained by adding a precipitation agent into the first suspension to form a second suspension; wherein the first suspension comprises an electrode layer and an aqueous solvent; wherein the electrode layer comprises a polymeric binder; and wherein the polymeric binder comprises a copolymer comprising a structural unit derived from an acid group-containing monomer and a structural unit derived from a hydrophobic group-containing monomer.

The method disclosed herein may be used following the delamination of an electrode, wherein the electrode comprises a current collector and an electrode layer coated on one side or both sides of the current collector comprising a polymeric binder.

In some embodiments, the electrode may be a cathode or an anode. In some embodiments, the electrode layer further comprises a metal-containing material, an electrode active material or a combination thereof.

In some embodiments, subsequent to the delamination of the electrode, the recovered electrode layer is immersed and stirred in an aqueous solvent in forming a first suspension. The stirring of the first suspension allows the recovered electrode layer to be broken down into small chucks or pieces to facilitate the precipitation of the polymeric binder by increasing the surface area for the precipitation agent to act upon at a later stage.

In some embodiments, the first suspension comprises a polymeric binder. In some embodiments, the first suspension further comprises a metal-containing material, an electrode active material or a combination thereof.

In some embodiments, subsequent to the delamination of the electrode, the recovered electrode layer is immersed and stirred in an aqueous solvent for a time period of from about 0.25 minute to about 20 minutes, from about 0.25 minute to about 15 minutes, from about 0.25 minute to about 10 minutes, from about 0.5 minute to about 20 minutes, from about 0.5 minute to about 15 minutes, from about 0.5 minute to about 10 minutes, from about 0.75 minute to about 20 minutes, from about 0.75 minute to about 15 minutes, from about 0.75 minute to about 10 minutes, from about 1 minute to about 20 minutes, from about 1 minute to about 15 minutes, from about 1 minute to about 10 minutes, from about 2 minutes to about 20 minutes, from about 2 minutes to about 15 minutes, from about 2 minutes to about 10 minutes, from about 4 minutes to about 20 minutes, from about 4 minutes to about 15 minutes, from about 4 minutes to about 10 minutes, from about 5 minutes to about 20 minutes, from about 5 minutes to about 15 minutes, from about 5 minutes to about 10 minutes, from about 7 minutes to about 18 minutes or from about 7 minutes to about 12 minutes in forming a first suspension.

In some embodiments, subsequent to the delamination of the electrode, the recovered electrode layer is immersed and stirred in an aqueous solvent for a time period of less than 20 minutes, less than 19 minutes, less than 18 minutes, less than 17 minutes, less than 16 minutes, less than 15 minutes, less than 14 minutes, less than 13 minutes, less than 12 minutes, less than 11 minutes, less than 10 minutes, less than 9 minutes, less than 8 minutes, less than 7 minutes, less than 6 minutes, less than 5 minutes, less than 4 minutes or less than 3 minutes in forming a first suspension. In some embodiments, subsequent to the delamination of the electrode, the recovered electrode layer is immersed and stirred in an aqueous solvent for a time period of more than 0.25 minute, more than 0.5 minute, more than 0.75 minute, more than 1 minute, more than 2 minutes, more than 3 minutes, more than 4 minutes, more than 5 minutes, more than 6 minutes, more than 7 minutes, more than 8 minutes, more than 9 minutes, more than 10 minutes, more than 11 minutes, more than 12 minutes, more than 13 minutes, more than 14 minutes, more than 15 minutes, more than 16 minutes, more than 17 minutes or more than 18 minutes in forming a first suspension.

In the case where an electrode layer comprises a combination of a polymeric binder and an electrode active material, a combination of a polymeric binder and a metal-containing material or a combination of a polymeric binder, an electrode active material and a metal-containing material, the electrode layer that is being broken down into small chucks (also can be called as conglomerate in the present invention) by stirring in an aqueous solvent may appear as partially dissolved complex in the first suspension with parts of undissolved polymeric binder within the clusters of electrode active material or metal-containing material. The rationale behind the portions of undissolved polymeric binder in the first suspension is attributed to the restricted access of the polymeric binder within clusters of electrode active material or metal-containing material to aqueous solvent, and thus impeding the dissolution of the polymeric binder.

The method of the present invention is particularly applicable to precipitate the polymeric binder in an electrode layer manufactured via a water-based slurry. The aqueous slurry utilizes a polymeric binder for adhering the active material particles and the conductive agent together with the current collector to form a continuous electrical conduction path. With the polymeric binder disclosed herein exhibiting an enhanced adhesive capability, which strengthen the conductive network between various components within the electrode layer, it is capable of facilitating electron and ion transportation to reduce the impedance between the current collector and the electrode materials and have sufficient elasticity to prevent the electrode from swelling due to volume expansion and contraction during charging and discharging.

The precipitation method disclosed herein allows the constituents of an electrode layer, e.g. a polymeric binder and an electrode active material, to be effectively separated by the simple use of a precipitation agent.

In some embodiments, the polymeric binder comprises a copolymer comprising a structural unit derived from an acid group-containing monomer and a structural unit derived from a hydrophobic group-containing monomer. In some embodiments, the proportion of structural unit derived from an acid group-containing monomer and structural unit derived from a hydrophobic group-containing monomer present in the polymeric binder is independently at least 15% by mole, based on the total number of moles of monomeric units in the copolymer in the polymeric binder, which allows for the polymeric binder disclosed herein exhibiting excellent dispersibility and stability in water, and thus enhancing the binding capability of the polymeric binder.

In some embodiments, the battery electrode active material is a cathode active material, wherein the cathode active material is selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.1 to 0.9; each y is independently from 0 to 0.9; each z is independently from 0 to 0.4. In certain embodiments, each x in the above general formula is independently selected from 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each y in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each z in the above general formula is independently selected from 0, 0.025, 0.05, 0.075, 0.1, 0.125, 0.15, 0.175, 0.2, 0.225, 0.25, 0.275, 0.3, 0.325, 0.35, 0.375 and 0.4. In some embodiments, each x, y and z in the above general formula independently has a 0.01 interval.

In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_{y-}$ $Al_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiCo_xNi_yO_2$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, $LiNi_xCo_yAl_zO_2$ or $LiCo_xNi_yO_2$, wherein each x is independently from 0.1 to 0.9; each y is independently from 0 to 0.45; and each z is independently from 0 to 0.2. In certain embodiments, the cathode active material is $Li_{1+x}Ni_aMn_bCo_cAl_{(1-a-b-c)}O_2$; wherein $-0.2\leq x\leq 0.2$, $0\leq a<1$, $0\leq b<1$, $0\leq c<1$, and $a+b+c<1$. In some embodiments, the cathode active material has the general formula $Li_{1+x}Ni_aMn_bCo_cAl_{(1-a-b-c)}O_2$, with $0.33\leq a\leq 0.92$, $0.33\leq a\leq 0.9$, $0.33\leq a\leq 0.8$, $0.4\leq a\leq 0.92$, $0.4\leq a\leq 0.9$, $0.4\leq a\leq 0.8$, $0.5\leq a\leq 0.92$, $0.5\leq a\leq 0.9$, $0.5\leq a\leq 0.8$, $0.6\leq a\leq 0.92$, or $0.6\leq a\leq 0.9$; $0\leq b\leq 0.5$, $0\leq b\leq 0.4$, $0\leq b\leq 0.3$, $0\leq b\leq 0.2$, $0.1\leq b\leq 0.5$, $0.1\leq b\leq 0.4$, $0.1\leq b\leq 0.3$, $0.1\leq b\leq 0.2$, $0.2\leq b\leq 0.5$, $0.2\leq b\leq 0.4$, or $0.2\leq b\leq 0.3$; $0\leq c\leq 0.5$, $0\leq c\leq 0.4$, $0\leq c\leq 0.3$, $0.1\leq c\leq 0.5$, $0.1\leq c\leq 0.4$, $0.1\leq c\leq 0.3$, $0.1\leq c\leq 0.2$, $0.2\leq c\leq 0.5$, $0.2\leq c\leq 0.4$, or $0.2\leq c\leq 0.3$. In some embodiments, the cathode active material has the general formula $LiMPO_4$, wherein M is selected from the group consisting of Fe, Co, Ni, Mn, Al, Mg, Zn, Ti, La, Ce, Sn, Zr, Ru, Si, Ge and combinations thereof. In some embodiments, the cathode active material is selected from the group consisting of $LiFePO_4$, $LiCoPO_4$, $LiNiPO_4$, $LiMnPO_4$, $LiMnFePO_4$, $LiMn_xFe_{(1-x)}PO_4$ and combinations thereof; wherein $0\leq x\leq 1$. In some embodiments, the cathode active material is $LiNi_xMn_yO_4$; wherein $0.1\leq x\leq 0.9$ and $0\leq y\leq 2$. In certain embodiments, the cathode active material is $xLi_2MnO_3\cdot(1-x)LiMO_2$, wherein M is selected from the group consisting of Ni, Co, Mn and combinations thereof; and wherein $0<x<1$. In some embodiments, the cathode active material is $Li_3V_2(PO_4)_3$, $LiVPO_4F$. In certain embodiments, the cathode active material has the general formula $Li_2MSiO_4$, wherein M is selected from the group consisting of Fe, Co, Mn, Ni, and combinations thereof.

In certain embodiments, the cathode active material is doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In some embodiments, the dopant is not Co, Cr, V, Mo, Nb, Pd, F, Na, Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein $-0.2\leq x\leq 0.2$, $0\leq a<1$, $0\leq b<1$, $0\leq c<1$, and $a+b+c\leq 1$. In certain embodiments, each x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiments, each x, a, b and c in the above general formula independently has a 0.01 interval. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein $-0.2\leq x\leq 0.2$, $0\leq a<1$, $0\leq b<1$, $0\leq c<1$, and $a+b+c\leq 1$. In certain embodiments, x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975;

each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiments, each x, a, b and c in the above general formula independently has a 0.01 interval. In some embodiments, the transition metal oxide is selected from the group consisting of $Fe_2O_3$, $MnO_2$, $Al_2O_3$, $MgO$, $ZnO$, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 µm to about 15 µm, from about 3 µm to about 15 µm, from about 3 µm to about 10 µm, from about 5 µm to about 10 µm, from about 5 µm to about 45 µm, from about 5 µm to about 35 µm, from about 5 µm to about 25 µm, from about 10 µm to about 45 µm, from about 10 µm to about 40 µm, or from about 10 µm to about 35 µm, from about 10 µm to about 25 µm, from about 15 µm to about 45 µm, from about 15 µm to about 30 µm, from about 15 µm to about 25 µm, from about 20 µm to about 35 µm, or from about 20 µm to about 30 µm. In certain embodiments, the thickness of the shell is from about 1 µm to about 45 µm, from about 1 µm to about 35 µm, from about 1 µm to about 25 µm, from about 1 µm to about 15 µm, from about 1 µm to about 10 µm, from about 1 µm to about 5 µm, from about 3 µm to about 15 µm, from about 3 µm to about 10 inn, from about 5 µm to about 10 µm, from about 10 µm to about 35 µm, from about 10 µm to about 20 µm, from about 15 µm to about 30 µm, from about 15 µm to about 25 µm, or from about 20 µm to about 35 µm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

In some embodiments, the electrode active material is an anode active material, wherein the anode active material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru and combinations thereof. In some embodiments, the nonmetal element is B, Si, Ge, N, P, F, S, Cl, I, Se and combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is not doped with a metallic element or a nonmetal element. In some embodiments, the anode active material is not doped with Fe, Ni, Mn, Al, Mg, Zn, Ti, La, Ce, Sn, Zr, Ru, B, Si, Ge, N, P, F, S, Cl, I, or Se.

In some embodiments, the metal-containing material is selected from the group consisting of ceramic, metal, mischmetal or combinations thereof.

In some embodiments, the ceramic is selected from the group consisting of $AlCeO_3$, $LiAlO_2$, $MgAl_2O_4$, $Ce_{0.63}Tb_{0.37}MgAl_{11}O_{19}$, $Sr_{0.95}Eu_{0.02}Dy_{0.03}Al_2O_4$, $Sr_{3.84}Eu_{0.06}Dy_{0.10}Al_{14}O_{25}$, $BaFe_{12}O_{19}$, $CuFe_2O_4$, $CuZnFe_2O_4$, $LiFeO_2$, $NiZnFe_4O_4$, $SrFe_{12}O_{19}$, $Y_3Fe_5O_{12}$, $LiNbO_3$, $KNbO_3$, $Zn(NbO_3)_2$, $Cu_2Cr_2O_5$, $LiTaO_3$, $NiCoO_2$, YBaCuO, $BaZrO_3$, $CaZrO_3$, $PbZrO_3$, $Li_2ZrO_3$, $Al_2TiO_5$, $Al_2O_3$, $BaTiO_3$, $CaTiO_3$, $FeTiO_3$, $PbTiO_3$, $Li_2TiO_3$, $Li_4Ti_5O_{12}$, $SrTiO_3$, $ZnTiO_3$, $Al_2CoO_4$, $CoFe_2O_4$, $Fe_2NiO_4$, $ZnFe_2O_4$ or combinations thereof.

In some embodiments, the metal is selected from the group consisting of aluminium, bismuth, chromium, cobalt, copper, gold, iron, lead, magnesium, manganese, mercury, nickel, silver, titanium, tin, zinc, boron, phosphorous, sulphur, scandium, cadmium, molybdenum, tungsten, arsenic, beryllium, silicon, vanadium, cerium, zirconium, antimony or alloys thereof.

In some embodiments, the mischmetal is selected from the group consisting of scandium, yttrium, lanthanum, cerium, praseodymium, neodymium, promethium, samarium, europium, gadolinium, terbium, dysprosium, holmium, erbium, thulium, ytterbium, lutetium or alloys thereof.

In some embodiments, the electrode active material and the metal-containing material can be dissolved in the second suspension disclosed herein. In the case where a first suspension comprises a combination of a polymeric binder, an electrode active material and an aqueous solvent, a combination of a polymeric binder, a metal-containing material and an aqueous solvent or a combination of a polymeric binder, an electrode active material, a metal-containing material and an aqueous solvent, upon the addition of a precipitation agent into the first suspension in forming a second suspension, the electrode active material and/or the metal-containing material begin to dissolve whereas the polymeric binder is precipitated. Furthermore, with the dissolution of the electrode active material and/or the metal-containing material in the second suspension, any previously undissolved polymeric binder within the clusters of electrode active material or metal-containing material could be exposed and thus be precipitated in the second suspension. This allows separation of the polymeric binder from the remaining of the second suspension.

In some embodiments, the electrode layer may additionally comprise other additives for enhancing electrode properties. In some embodiments, the additives may include conductive agents, surfactants, dispersants and flexibility enhancement additives. In some embodiments, the additives do not dissolve in an aqueous solvent and/or the second suspension disclosed herein.

In some embodiments, the first suspension may further comprise conductive agents, surfactants, dispersants, flexibility enhancement additives or combinations thereof.

In other embodiments, the electrode layer further comprises a conductive agent. In other embodiments, the first suspension further comprises a conductive agent. The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof.

In some embodiments, the conductive agent does not dissolve in an aqueous solvent and/or the second suspension disclosed herein. In the case where a first suspension comprises a combination of a polymeric binder, an electrode active material, a conductive agent and an aqueous solvent, a combination of a polymeric binder, a metal-containing material, a conductive agent and an aqueous solvent or a combination of a polymeric binder, an electrode active material, a metal-containing material, a conductive agent and an aqueous solvent, upon the addition of a precipitation agent into the first suspension in forming a second suspension, the electrode active material and/or the metal-containing material begin to dissolve in the second suspension, the conductive agent remains as solids and the polymeric binder is precipitated. This allows separation of the polymeric binder and the conductive agent from the remaining of the second suspension containing the electrode active material and/or the metal-containing material. The dissolved electrode active material and metal-containing material could thus be extracted from the second suspension to be further reused in the subsequent battery manufacturing process.

In some embodiments, in the case where a polymer, an electrode layer and an aqueous solvent are involved in the system, the precipitation agent can be mixed with an aqueous solvent to form a first suspension. Thereafter, a second suspension can be formed by adding an electrode layer into the first suspension. In other embodiments, in the case where a polymer, an electrode layer and an aqueous solvent are involved in the system, the electrode layer and the precipitation agent can be directly added into an aqueous solvent to form a first suspension.

The sequence of addition of the precipitation agent, the electrode layer and the aqueous solvent as disclosed in the method of the present invention has negligible effect on the variations in the polymer recovery rate, i.e., the polymer can still be precipitated effectively with a high polymer recovery rate of over 98% regardless of the sequence of addition of the precipitation agent, the electrode layer and the aqueous solvent in the method disclosed herein.

The polymeric binder applied in the present invention exhibits exceptionally strong binding capability. One way in assessing the strength of the adhesion property of a polymeric binder is via the adhesive strength between a polymeric binder and a current collector. It is important for the polymeric binder to have good adhesive strength to the current collector as it promotes the binding force of the electrode layer to the current collector in the making of battery electrode, prevents separation and enhances the mechanical stability of the electrode. In some embodiments, the adhesive strength between the polymeric binder and the current collector is from about 2 N/cm to about 6 N/cm, from about 2 N/cm to about 5.8 N/cm, from about 2 N/cm to about 5.6 N/cm, from about 2 N/cm to about 5.4 N/cm, from about 2 N/cm to about 5.2 N/cm, from about 2 N/cm to about 5 N/cm, from about 2 N/cm to about 4.8 N/cm, from about 2 N/cm to about 4.6 N/cm, from about 2 N/cm to about 4.4 N/cm, from about 2 N/cm to about 4.2 N/cm, from about 2 N/cm to about 4 N/cm, from about 2 N/cm to about 3.9 N/cm, from about 2 N/cm to about 3.8 N/cm, from about 2 N/cm to about 3.7 N/cm, from about 2 N/cm to about 3.6 N/cm, from about 2 N/cm to about 3.5 N/cm, from about 2 N/cm to about 3.4 N/cm, from about 2 N/cm to about 3.3 N/cm, from about 2 N/cm to about 3.2 N/cm, from about 2 N/cm to about 3.1 N/cm, from about 2 N/cm to about 3 N/cm, from about 2.1 N/cm to about 6 N/cm, from about 2.2 N/cm to about 6 N/cm, from about 2.3 N/cm to about 6 N/cm, from about 2.4 N/cm to about 6 N/cm, from about 2.5 N/cm to about 6 N/cm, from about 2.6 N/cm to about 6 N/cm, from about 2.7 N/cm to about 6 N/cm, from about 2.8 N/cm to about 6 N/cm, from about 2.9 N/cm to about 6 N/cm, from about 3 N/cm to about 6 N/cm, from about 3.1 N/cm to about 6 N/cm, from about 3.2 N/cm to about 6 N/cm, from about 3.3 N/cm to about 6 N/cm, from about 3.4 N/cm to about 6 N/cm, from about 3.5 N/cm to about 6 N/cm, from about 3.6N/cm to about 6 N/cm, from about 3.7 N/cm to about 6 N/cm, from about 3.8 N/cm to about 6 N/cm, from about 3.9 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm, from about 3 N/cm to about 5 N/cm, from about 2.2 N/cm to about 4.2 N/cm or from about 2.2 N/cm to about 5.2 N/cm.

In some embodiments, the adhesive strength between the polymeric binder and the current collector is less than 6 N/cm, less than 5.8 N/cm, less than 5.6 N/cm, less than 5.4 N/cm, less than 5.2 N/cm, less than 5 N/cm, less than 4.8 N/cm, less than 4.6 N/cm, less than 4.4 N/cm, less than 4.2 N/cm, less than less than 4 N/cm, less than 3.9 N/cm, less than 3.8 N/cm, less than 3.7 N/cm, less than 3.6 N/cm, less than 3.5 N/cm, less than 3.4 N/cm, less than 3.3 N/cm, less than 3.2 N/cm, less than 3.1 N/cm, less than 3 N/cm, less than 2.9 N/cm, less than 2.8 N/cm, less than 2.7 N/cm, less than 2.6 N/cm, less than 2.5 N/cm, less than 2.4 N/cm, less than 2.3 N/cm or less than 2.2 N/cm. In some embodiments, the adhesive strength between the polymeric binder and the current collector is more than 2 N/cm, more than 2.1 N/cm, more than 2.2 N/cm, more than 2.3 N/cm, more than 2.4 N/cm, more than 2.5 N/cm, more than 2.6 N/cm, more than 2.7 N/cm, more than 2.8 N/cm, more than 2.9 N/cm, more than 3 N/cm, more than 3.1 N/cm, more than 3.2 N/cm, more than 3.3 N/cm, more than 3.4 N/cm, more than 3.5 N/cm, more than 3.6 N/cm, more than 3.7 N/cm, more than 3.8 N/cm, more than 3.9 N/cm, more than 4 N/cm, more than 4.2 N/cm, more than 4.4 N/cm, more than 4.6 N/cm, more than 4.8 N/cm, more than 5 N/cm, more than 5.2 N/cm, more than 5.4 N/cm, more than 5.6 N/cm or more than 5.8 N/cm.

In addition, the polymeric binder applied in the present invention allows the exhibition of strong adhesion of the electrode layer to the current collector in an electrode. It is important for the electrode layer to have good peeling strength to the current collector as this would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

Figure 10:
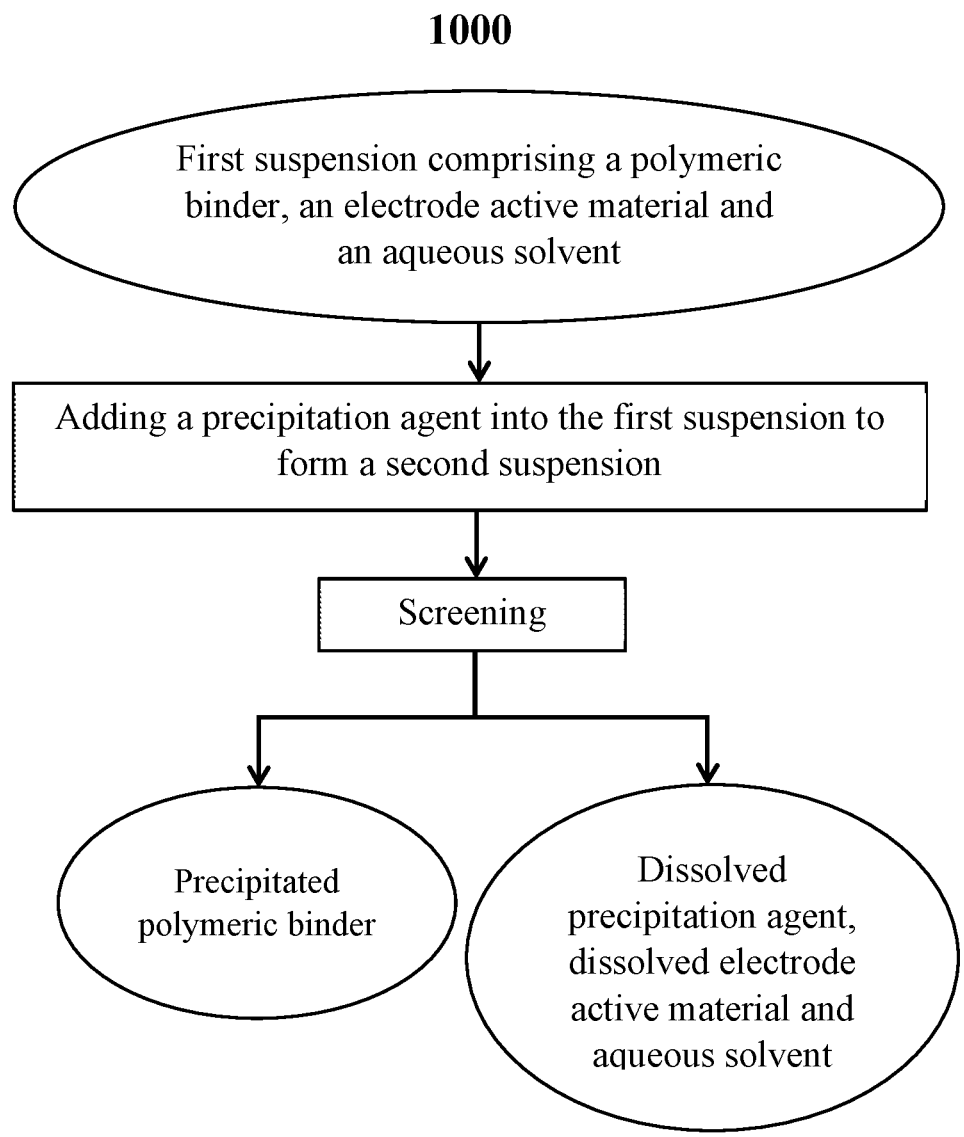
FIG. 10 is a flow chart of an embodiment illustrating the steps for precipitating a polymeric binder as disclosed herein and its subsequent further processing for extraction of the precipitated polymer.

FIG. 10 is a flow chart of an embodiment illustrating the steps of method 1000 for precipitating a polymeric binder as disclosed herein and its subsequent further processing for extraction of the polymer. The remaining of the second suspension comprising the aqueous solvent, the dissolved precipitation agent and the dissolved electrode active material may be subjected to additional separation and/or extraction process to further extract the electrode active material and the precipitation agent contained within. In some embodiments, the recovered polymeric binder could be subjected to neutralization to be further reused in the subsequent battery manufacturing process. This allows the formation of a closed-loop recovery process where materials are repeatedly recycled and reused, and continually engage in a loop arrangement, which helps create a circular economy.

The present invention provides a simple method that can be used to precipitate polymeric binder of different compositions. As the separation of the polymeric binder and the other electrode layer constituents constitutes a vital step in the recycling of batteries, the method disclosed herein offers a technical solution in fulfilling the demand in battery recycling. The method of the present invention circumvents both complex separation process and contamination of the polymeric binder, enables an excellent materials recovery (i.e. high polymer recovery rate) and considerably reduces the time required to precipitate the polymeric binder.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the second suspension were measured by an electrode-type pH meter (ION 2700, Eutech Instruments).

The polymer recovery rate refers to the proportion of the weight of the recovered polymer, based on the initial weight of polymer present in the first suspension before the addition of a precipitation agent.

The adhesive strengths of the dried polymeric binder layers were measured by a tensile testing machine (DZ-106A, obtained from Dongguan Zonhow Test Equipment Co. Ltd., China). This test measures the average force required to peel a polymeric binder layer from the current collector at 180° angle in Newtons. The mean roughness depth ($R_z$) of the current collector is 2 μm. The polymeric binder was coated on the current collector and dried to obtain a polymeric binder layer of thickness 10 μm to 12 μm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the polymeric binder layer. The polymeric binder strip was clipped onto the testing machine and the tape was folded back on itself at 180 degrees, and placed in a moveable jaw and pulled at room temperature and a peel rate of 300 mm per minute. The maximum stripping force measured was taken as the adhesive strength. Measurements were repeated three times to find the average value.

The peeling strengths of the dried electrode layers were measured by a tensile testing machine (DZ-106A, obtained from Dongguan Zonhow Test Equipment Co. Ltd., China). This test measures the average force required to peel an electrode layer from the current collector at 180° angle in Newtons. The mean roughness depth ($R_z$) of the current collector is 2 μm. A strip of adhesion tape (3M; US; model no. 810) with a width of 18 mm and a length of 20 mm was attached onto the surface of the cathode electrode layer. The cathode strip was clipped onto the testing machine and the tape was folded back on itself at 180 degrees, and placed in a moveable jaw and pulled at room temperature and a peel rate of 200 mm per minute. The maximum stripping force measured was taken as the peeling strength. Measurements were repeated three times to find the average value.

Example 1

Preparation of First Suspension

A) Preparation of Polymer 16 g of sodium hydroxide (NaOH) was added into a round-bottom flask containing 380 g of distilled water. The combination of ingredients was stirred at 80 rpm for 30 mins to obtain a first mixture.

36.04 g of acrylic acid (AA) was added into the first mixture. The combination of ingredients was further stirred at 80 rpm for 30 mins to obtain a second mixture.

19.04 g of acrylamide (AM) was dissolved in 10 g of DI water to form an AM solution. Thereafter, 29.04 g of AM solution was added into the second mixture. The combination of ingredients was further heated to 55° C. and stirred at 80 rpm for 45 mins to obtain a third mixture.

12.92 g of acrylonitrile (AN) was added into the third mixture. The combination of ingredients was further stirred at 80 rpm for 10 mins to obtain a fourth mixture.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth mixture. The combination of ingredients was stirred at 200 rpm for 24 h at 55° C. to obtain a fifth mixture.

After the complete reaction, the temperature of the fifth mixture was lowered to 25° C. 3.72 g of NaOH was dissolved in 400 g of DI water. Thereafter, 403.72 g of sodium hydroxide solution was added dropwise into the fifth mixture for 1 h to adjust pH to 7.31 to form the sixth mixture. The polymer was furnished by filtration using 200 µm nylon mesh. The solid content of the polymer was 9.00 wt. %. The adhesive strength between the polymer and the current collector was 3.27 N/cm. The components of the polymer of Example 1 and their respective proportions are shown in Table 1 below.

B) Formation of First Suspension 5.56 g of polymer was added into a round-bottom flask containing 44.55 g of aqueous solvent (distilled water). The mixture was stirred at 80 rpm for 10 mins to obtain a first suspension of 50.11 g. The solid content of the first suspension was 0.99 wt. %.

Recycling of Polymer

A) Preparation of Precipitation Agent 98 g of sulphuric acid was dissolved in 1 L of distilled water to form a 1 M sulphuric acid solution.

B) Precipitation of Polymer

The 1 M sulphuric acid solution was added into the first suspension to form a second suspension of pH 4.24. The second suspension was stirred at 200 rpm for 10 mins at 25° C. The polymer was then precipitated. After precipitation of the polymer, the processed second suspension was removed by passing through a filter paper to recover the precipitated polymer. The recovered polymer was dried in an oven for 5 hours at 80° C. under atmospheric pressure and obtained a polymer recovery rate of 98.58%. The dried polymer could then be further reused. The polymer recovery rate and pH of the second suspension were measured and is shown in Table 1 below.

Preparation of First Suspension of Example 2

Preparation of first suspension was performed in the same manner as in Example 1, except that 5.56 g of polymer was added into 45.04 g of distilled water and the mixture was stirred at 80 rpm for 10 mins to obtain a first suspension of 50.60 g.

Recycling of Polymer of Example 2

Recycling of polymer was performed in the same manner as in Example 1, except that the 1 M sulphuric acid solution was added into the first suspension to form a second suspension of pH 2.96.

Preparation of First Suspension of Example 3

Preparation of first suspension was performed in the same manner as in Example 1, except that 5.56 g of polymer was added into 44.52 g of distilled water and the mixture was stirred at 80 rpm for 10 mins to obtain a first suspension of 50.08 g.

Recycling of Polymer of Example 3

Recycling of polymer was performed in the same manner as in Example 1, except that the 1 M sulphuric acid solution was added into the first suspension to form a second suspension of pH 2.07.

Recycling of polymer of Example 3 was repeated with the second suspension being stirred at 200 rpm for 60 mins and 120 mins at 25° C. respectively. The second suspension that is stirred for 60 mins obtained a polymer recovery rate of 99.42% whereas the second suspension that is stirred for 120 mins yielded a polymer recovery rate of 99.43%. There are no signs of significant increase in the polymer recovery rates with an extended period of second suspension stirring time.

Preparation of First Suspension of Example 4

Preparation of first suspension was performed in the same manner as in Example 1, except that 5.56 g of polymer was added into 44.68 g of distilled water and the mixture was stirred at 80 rpm for 10 mins to obtain a first suspension of 50.24 g.

Recycling of Polymer of Example 4

Recycling of polymer was performed in the same manner as in Example 1, except that the 1 M sulphuric acid solution was added into the first suspension to form a second suspension of pH 1.01.

Preparation of First Suspension of Example 5

Preparation of first suspension was performed in the same manner as in Example 1, except that 5.56 g of polymer was added into 44.53 g of distilled water and the mixture was stirred at 80 rpm for 10 mins to obtain a first suspension of 50.09 g.

Recycling of Polymer of Example 5

Recycling of polymer was performed in the same manner as in Example 1, except that the 1 M sulphuric acid solution was added into the first suspension to form a second suspension of pH 2.05 and the second suspension was stirred at 200 rpm for 10 mins at 50° C.

Preparation of First Suspension of Example 6

Preparation of first suspension was performed in the same manner as in Example 1, except that 5.56 g of polymer was added into 44.59 g of distilled water and the mixture was stirred at 80 rpm for 10 mins to obtain a first suspension of 50.15 g.

Recycling of Polymer of Example 6

Recycling of polymer was performed in the same manner as in Example 1, except that the 1 M sulphuric acid solution was added into the first suspension to form a second suspension of pH 1.95 and the second suspension was stirred at 200 rpm for 10 mins at 90° C.

Example 7

Preparation of First Suspension

A) Preparation of Polymer 5.13 g of lithium hydroxide was dissolved in 3.85 g of DI water. Thereafter, 8.98 g of lithium hydroxide solution was added into a 500 mL round-bottom flask containing 289.17 g of distilled water. The combination of ingredients was stirred at 200 rpm for 30 mins to obtain a first mixture.

Further, 31.54 g of AA was added into the first mixture. The combination of ingredients was further stirred at 200 rpm for 30 mins to obtain a second mixture.

13.52 g of AM was dissolved in 51.67 g of DI water. Thereafter, 65.19 g of AM solution was added into the second mixture. The combination of ingredients was further stirred at 200 rpm for 30 mins to obtain a third mixture.

67.60 g of AN was then added into the third mixture. The fourth mixture was obtained by stirring the combination of ingredients at 200 rpm for 40 mins.

The fourth mixture was heated up to 60° C. and stirred at 60 rpm for 45 mins. 0.23 g of APS was dissolved in 82.68 g of DI water and 0.04 g of sodium bisulfite was dissolved in 17.22 g of DI water. 17.26 g of sodium bisulfite solution was added into the fourth mixture and the combination of ingredients was stirred for 10 minutes. 82.91 g of APS solution was added into the mixture dropwise for 3 h to form a fifth mixture. The fifth mixture was further stirred at 200 rpm for 20 h at 65° C.

After the complete reaction, the temperature of the fifth mixture was lowered to 40° C. and 5.62 g of lithium hydroxide (dissolved in 116.64 g of DI water) was added into the fifth mixture to adjust pH to 7.44 to form the sixth mixture. The temperature of the sixth mixture was lowered to 30° C. and the polymer was furnished by filtration using 200 μm nylon mesh. The solid content of the polymer was 14.93 wt. %. The adhesive strength between the polymer and the current collector was 3.41 N/cm. The components of the polymer of Example 7 and their respective proportions are shown in Table 1 below.

B) Formation of First Suspension 3.35 g of polymer was added into a round-bottom flask containing 46.20 g of aqueous solvent (distilled water). The mixture was stirred at 80 rpm for 10 mins to obtain a first suspension of 49.55 g. The solid content of the first suspension was 1.01 wt. %.

Recycling of Polymer

A) Preparation of Precipitation Agent 98 g of sulphuric acid was dissolved in 1 L of distilled water to form a 1 M sulphuric acid solution.

B) Precipitation of Polymer

The 1 M sulphuric acid solution was added into the first suspension to form a second suspension of pH 3.99. The second suspension was stirred at 200 rpm for 10 mins at 25° C. The polymer was then precipitated. After precipitation of the polymer, the processed second suspension was removed by passing through a filter paper to recover the precipitated polymer. The recovered polymer was dried in an oven for 5 hours at 80° C. under atmospheric pressure and obtained a polymer recovery rate of 98.73%. The dried polymer could then be further reused. The polymer recovery rate and pH of the second suspension were measured and is shown in Table 1 below.

Preparation of First Suspension of Example 8

Preparation of first suspension was performed in the same manner as in Example 7, except that 3.35 g of polymer was added into 46.10 g of distilled water and the mixture was stirred at 80 rpm for 10 mins to obtain a first suspension of 49.45 g.

Recycling of Polymer of Example 8

Recycling of polymer was performed in the same manner as in Example 7, except that the 1 M sulphuric acid solution was added into the first suspension to form a second suspension of pH 3.00.

Preparation of First Suspension of Example 9

Preparation of first suspension was performed in the same manner as in Example 7, except that 3.35 g of polymer was added into 47.07 g of distilled water and the mixture was stirred at 80 rpm for 10 mins to obtain a first suspension of 50.42 g.

Recycling of Polymer of Example 9

Recycling of polymer was performed in the same manner as in Example 7, except that the 1 M sulphuric acid solution was added into the first suspension to form a second suspension of pH 2.12.

Preparation of First Suspension of Example 10

Preparation of first suspension was performed in the same manner as in Example 7, except that 3.35 g of polymer was added into 46.22 g of distilled water and the mixture was stirred at 80 rpm for 10 mins to obtain a first suspension of 49.57 g.

Recycling of Polymer of Example 10

Recycling of polymer was performed in the same manner as in Example 7, except that the 1 M sulphuric acid solution was added into the first suspension to form a second suspension of pH 1.07.

Preparation of First Suspension of Example 11

Preparation of first suspension was performed in the same manner as in Example 7, except that 3.35 g of polymer was added into 46.46 g of distilled water and the mixture was stirred at 80 rpm for 10 mins to obtain a first suspension of 49.81 g.

Recycling of Polymer of Example 11

Recycling of polymer was performed in the same manner as in Example 7, except that the 1 M sulphuric acid solution was added into the first suspension to form a second suspension of pH 1.13 and the second suspension was stirred at 200 rpm for 10 mins at 50° C.

Preparation of First Suspension of Example 12

Preparation of first suspension was performed in the same manner as in Example 7, except that 3.35 g of polymer was added into 46.78 g of distilled water and the mixture was stirred at 80 rpm for 10 mins to obtain a first suspension of 50.13 g.

Recycling of Polymer of Example 12

Recycling of polymer was performed in the same manner as in Example 7, except that the 1 M sulphuric acid solution was added into the first suspension to form a second suspension of pH 1.15 and the second suspension was stirred at 200 rpm for 10 mins at 90° C.

Preparation of First Suspension of Example 13

Preparation of first suspension was performed in the same manner as in Example 1, except that 5.56 g of polymer was added into 44.63 g of distilled water and the mixture was stirred at 80 rpm for 10 mins to obtain a first suspension of 50.19 g.

Recycling of Polymer of Example 13

Recycling of polymer was performed in the same manner as in Example 1, except that in the preparation of the precipitation agent, 37 g of hydrochloric acid was dissolved in 1 L of distilled water to form a 1 M hydrochloric acid solution; and in the precipitation of the polymer, the 1 M hydrochloric acid solution was added into the first suspension to form a second suspension of pH 1.22.

Preparation of First Suspension of Example 14

Preparation of first suspension was performed in the same manner as in Example 7, except that 3.35 g of polymer was added into 46.32 g of distilled water and the mixture was stirred at 80 rpm for 10 mins to obtain a first suspension of 49.67 g.

Recycling of Polymer of Example 14

Recycling of polymer was performed in the same manner as in Example 7, except that in the preparation of the precipitation agent, 37 g of hydrochloric acid was dissolved in 1 L of distilled water to form a 1 M hydrochloric acid solution; and in the precipitation of the polymer, the 1 M hydrochloric acid solution was added into the first suspension to form a second suspension of pH 1.18.

Preparation of First Suspension of Example 15

Preparation of first suspension was performed in the same manner as in Example 1, except that 5.56 g of polymer was added into 44.76 g of distilled water and the mixture was stirred at 80 rpm for 10 mins to obtain a first suspension of 50.32 g.

Recycling of Polymer of Example 15

Recycling of polymer was performed in the same manner as in Example 1, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 1.07.

Preparation of First Suspension of Example 16

Preparation of first suspension was performed in the same manner as in Example 7, except that 3.35 g of polymer was added into 46.36 g of distilled water and the mixture was stirred at 80 rpm for 10 mins to obtain a first suspension of 49.71 g.

Recycling of Polymer of Example 16

Recycling of polymer was performed in the same manner as in Example 7, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 0.83.

Preparation of First Suspension of Example 17

Preparation of first suspension was performed in the same manner as in Example 1, except that 5.56 g of polymer was added into 44.69 g of distilled water and the mixture was stirred at 80 rpm for 10 mins to obtain a first suspension of 50.25 g.

Recycling of Polymer of Example 17

Recycling of polymer was performed in the same manner as in Example 1, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 2.92.

Preparation of First Suspension of Example 18

Preparation of first suspension was performed in the same manner as in Example 7, except that 3.35 g of polymer was added into 46.49 g of distilled water and the mixture was stirred at 80 rpm for 10 mins to obtain a first suspension of 49.84 g.

Recycling of Polymer of Example 18

Recycling of polymer was performed in the same manner as in Example 7, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 2.97.

Preparation of First Suspension of Example 19

Preparation of first suspension was performed in the same manner as in Example 1, except that 5.56 g of polymer was added into 44.73 g of distilled water and the mixture was stirred at 80 rpm for 10 mins to obtain a first suspension of 50.29 g.

Recycling of Polymer of Example 19

Recycling of polymer was performed in the same manner as in Example 1, except that in the preparation of the precipitation agent, 577 g of citric acid was dissolved in 1 L of distilled water to form a 3 M citric acid solution; and in the precipitation of the polymer, the 3 M citric acid solution was added into the first suspension to form a second suspension of pH 0.90.

Preparation of First Suspension of Example 20

Preparation of first suspension was performed in the same manner as in Example 7, except that 3.35 g of polymer was added into 46.25 g of distilled water and the mixture was stirred at 80 rpm for 10 mins to obtain a first suspension of 49.60 g.

Recycling of Polymer of Example 20

Recycling of polymer was performed in the same manner as in Example 7, except that in the preparation of the precipitation agent, 577 g of citric acid was dissolved in 1 L of distilled water to form a 3 M citric acid solution; and in the precipitation of the polymer, the 3 M citric acid solution was added into the first suspension to form a second suspension of pH 1.09.

Preparation of First Suspension of Example 21

Preparation of first suspension was performed in the same manner as in Example 1, except that in the preparation of the polymer, 36.04 g of AA was replaced with 2-ethylacrylic acid of the same weight in the preparation of the second mixture; and in the formation of the first suspension, 5.56 g of polymer was added into 44.58 g of distilled water and the mixture was stirred at 80 rpm for 10 mins to obtain a first suspension of 50.14 g.

Recycling of Polymer of Example 21

Recycling of polymer was performed in the same manner as in Example 1, except that the 1 M sulphuric acid solution was added into the first suspension to form a second suspension of pH 1.14.

Preparation of First Suspension of Example 22

Preparation of first suspension was performed in the same manner as in Example 1, except that in the preparation of the polymer, 36.04 g of AA was replaced with crotonic acid of the same weight in the preparation of the second mixture; and in the formation of the first suspension, 5.56 g of polymer was added into 44.67 g of distilled water and the mixture was stirred at 80 rpm for 10 mins to obtain a first suspension of 50.23 g.

Recycling of Polymer of Example 22

Recycling of polymer was performed in the same manner as in Example 1, except that the 1 M sulphuric acid solution was added into the first suspension to form a second suspension of pH 1.21.

Preparation of First Suspension of Example 23

Preparation of first suspension was performed in the same manner as in Example 7, except that in the preparation of the polymer, 31.54 g of AA was replaced with 2-ethylacrylic acid of the same weight in the preparation of the second mixture; and in the formation of the first suspension, 3.35 g of polymer was added into 46.48 g of distilled water and the mixture was stirred at 80 rpm for 10 mins to obtain a first suspension of 49.83 g.

Recycling of Polymer of Example 23

Recycling of polymer was performed in the same manner as in Example 7, except that the 1 M sulphuric acid solution was added into the first suspension to form a second suspension of pH 1.04.

Preparation of First Suspension of Example 24

Preparation of first suspension was performed in the same manner as in Example 7, except that in the preparation of the polymer, 31.54 g of AA was replaced with crotonic acid of the same weight in the preparation of the second mixture; and in the formation of the first suspension, 3.35 g of polymer was added into 46.44 g of distilled water and the mixture was stirred at 80 rpm for 10 mins to obtain a first suspension of 49.79 g.

Recycling of Polymer of Example 24

Recycling of polymer was performed in the same manner as in Example 7, except that the 1 M sulphuric acid solution was added into the first suspension to form a second suspension of pH 1.17.

Preparation of First Suspension of Comparative Example 1

Preparation of first suspension was performed in the same manner as in Example 1, except that 5.56 g of polymer was added into 44.63 g of distilled water and the mixture was stirred at 80 rpm for 10 mins to obtain a first suspension of 50.19 g.

Recycling of Polymer of Comparative Example 1

Recycling of polymer was performed in the same manner as in Example 1, except that the 1 M sulphuric acid solution was added into the first suspension to form a second suspension of pH 5.93.

Preparation of First Suspension of Comparative Example 2

Preparation of first suspension was performed in the same manner as in Example 1, except that 5.56 g of polymer was added into 44.56 g of distilled water and the mixture was stirred at 80 rpm for 10 mins to obtain a first suspension of 50.12 g.

Recycling of Polymer of Comparative Example 2

Recycling of polymer was performed in the same manner as in Example 1, except that the 1 M sulphuric acid solution was added into the first suspension to form a second suspension of pH 4.92.

Preparation of First Suspension of Comparative Example 3

Preparation of first suspension was performed in the same manner as in Example 7, except that 3.35 g of polymer was added into 46.47 g of distilled water and the mixture was stirred at 80 rpm for 10 mins to obtain a first suspension of 49.82 g.

Recycling of Polymer of Comparative Example 3

Recycling of polymer was performed in the same manner as in Example 7, except that the 1 M sulphuric acid solution was added into the first suspension to form a second suspension of pH 6.01.

Preparation of First Suspension of Comparative Example 4

Preparation of first suspension was performed in the same manner as in Example 7, except that 3.35 g of polymer was added into 46.40 g of distilled water and the mixture was stirred at 80 rpm for 10 mins to obtain a first suspension of 49.75 g.

Recycling of Polymer of Comparative Example 4

Recycling of polymer was performed in the same manner as in Example 7, except that the 1 M sulphuric acid solution was added into the first suspension to form a second suspension of pH 4.96.

Preparation of First Suspension of Comparative Example 5

Preparation of first suspension was performed in the same manner as in Example 1, except that 5.56 g of polymer was added into 44.68 g of distilled water and the mixture was stirred at 80 rpm for 10 mins to obtain a first suspension of 50.24 g.

Recycling of Polymer of Comparative Example 5

Recycling of polymer was performed in the same manner as in Example 1, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 3.46.

Preparation of First Suspension of Comparative Example 6

Preparation of first suspension was performed in the same manner as in Example 7, except that 3.35 g of polymer was added into 46.53 g of distilled water and the mixture was stirred at 80 rpm for 10 mins to obtain a first suspension of 49.88 g.

Recycling of Polymer of Comparative Example 6

Recycling of polymer was performed in the same manner as in Example 7, except that in the preparation of the precipitation agent, 139 g of formic acid was dissolved in 1 L of distilled water to form a 3 M formic acid solution; and in the precipitation of the polymer, the 3 M formic acid solution was added into the first suspension to form a second suspension of pH 3.39.

Preparation of First Suspension of Comparative Example 7

Preparation of first suspension was performed in the same manner as in Example 1, except that in the preparation of the polymer, polyacrylic acid (PAA) was used as the polymer; and in the formation of the first suspension, 5.56 g of PAA was added into 44.97 g of distilled water and the mixture was stirred at 80 rpm for 10 mins to obtain a first suspension of 50.53 g. The solid content of the first suspension was 1.00 wt. %.

Recycling of Polymer of Comparative Example 7

Recycling of polymer was performed in the same manner as in Example 1, except that the 1 M sulphuric acid solution was added into the first suspension to form a second suspension of pH 1.24.

Preparation of First Suspension of Comparative Example 8

Preparation of first suspension was performed in the same manner as in Example 1, except that in the preparation of the polymer, 61.20 g of AA was added in the preparation of the second mixture, no AM was added in the preparation of the third mixture and 6.80 g of AN was added in the preparation of the fourth mixture; and in the formation of the first suspension, 5.56 g of polymer was added into 44.88 g of distilled water and the mixture was stirred at 80 rpm for 10 mins to obtain a first suspension of 50.44 g.

Recycling of Polymer of Comparative Example 8

Recycling of polymer was performed in the same manner as in Example 1, except that the 1 M sulphuric acid solution was added into the first suspension to form a second suspension of pH 1.18.

Preparation of First Suspension of Comparative Example 9

Preparation of first suspension was performed in the same manner as in Example 1, except that in the preparation of the polymer, polyacrylamide (PAM) was used as the polymer; and in the formation of the first suspension, 5.56 g of PAM was added into 44.47 g of distilled water and the mixture was stirred at 80 rpm for 10 mins to obtain a first suspension of 50.03 g. The solid content of the first suspension was 1.00 wt. %.

Recycling of Polymer of Comparative Example 9

Recycling of polymer was performed in the same manner as in Example 1, except that the 1 M sulphuric acid solution was added into the first suspension to form a second suspension of pH 1.15.

Preparation of First Suspension of Comparative Example 10

Preparation of first suspension was performed in the same manner as in Example 1, except that in the preparation of the polymer, carboxymethyl cellulose (CMC; BSH-12, DKS Co. Ltd., Japan) was used as the polymer; and in the formation of the first suspension, 0.50 g of CMC was added into 49.50 g of distilled water and the mixture was stirred at 80 rpm for 10 mins to obtain a first suspension of 50.00 g. The solid content of the first suspension was 1.00 wt. %.

Recycling of Polymer of Comparative Example 10

Recycling of polymer was performed in the same manner as in Example 1, except that the 1 M sulphuric acid solution was added into the first suspension to form a second suspension of pH 1.02.

Preparation of First Suspension of Comparative Example 11

Preparation of first suspension was performed in the same manner as in Example 1, except that in the preparation of the polymer, styrene butadiene rubber (SBR, 45 wt. % in water; AL-2001, NIPPON A&L INC., Japan) was used as the polymer; and in the formation of the first suspension, 1.11 g of SBR was added into 48.89 g of distilled water and the mixture was stirred at 80 rpm for 10 mins to obtain a first suspension of 50.00 g. The solid content of the first suspension was 1.00 wt. %.

Recycling of Polymer of Comparative Example 11

Recycling of polymer was performed in the same manner as in Example 1, except that the 1 M sulphuric acid solution was added into the first suspension to form a second suspension of pH 1.06.

Example 25

Preparation of First Suspension

A) Preparation of Polymeric Binder
Preparation of polymeric binder was performed in the same manner as in Example 7. The components of the polymeric binder of Example 25 and their respective proportions are shown in Table 2 below.
B) Preparation of Conglomerate
A first admixture was prepared by mixing 9.32 g of polymeric binder (14.93 wt. % solid content) and 19.70 g of cathode active material (NMC532; obtained from Shandong Tianjiao New Energy Co., Ltd, China) at 25° C. while stirring with an overhead stirrer for about 15 minutes. Then, the first admixture was dried to form a conglomerate by an electrically heated oven at 70° C. The drying time was about 45 minutes.
C) Formation of First Suspension
5 g of conglomerate was added into a round-bottom flask containing 60 g of aqueous solvent (distilled water). The mixture was stirred at 80 rpm for 10 mins to obtain a first suspension of 65 g.
Recycling of Polymeric Binder
A) Preparation of Precipitation Agent
295 g of sulphuric acid was dissolved in 1 L of distilled water to form a 3 M sulphuric acid solution.
B) Precipitation of Polymeric Binder
The 3 M sulphuric acid solution was added into the first suspension to form a second suspension of pH 0.89. The second suspension was stirred at 200 rpm for 2 hours at 90° C. The prolonged period of stirring time and the elevation in temperature were intended for to achieve dissolution of the NMC532 in a more efficient manner. The polymeric binder was then precipitated and NMC532 dissolved in the second suspension. After precipitation of the polymeric binder and dissolution of NMC532, the processed second suspension was removed by passing through a filter paper to recover the precipitated polymeric binder. The recovered polymeric binder was dried in an oven for 5 hours at 80° C. under atmospheric pressure and obtained a polymer recovery rate of 99.10%. The dried polymeric binder could then be further reused. The polymer recovery rate and pH of the second suspension were measured and is shown in Table 2 below.

Preparation of First Suspension of Example 26

Preparation of first suspension was performed in the same manner as in Example 25, except that in the preparation of the conglomerate, a first admixture was prepared by mixing 9.24 g of polymeric binder (14.93 wt. % solid content) and 22.7 g of $Al_2O_3$ at 25° C. while stirring with an overhead stirrer for about 15 minutes.

Recycling of Polymeric Binder of Example 26

Recycling of polymeric binder was performed in the same manner as in Example 25, except that in the preparation of precipitation agent, 110 g of hydrochloric acid was dissolved in 1 L of distilled water to form a 3 M hydrochloric acid solution; and in the precipitation of polymeric binder, the 3 M hydrochloric acid solution was added into the first suspension to form a second suspension of pH 1.23.

Preparation of First Suspension of Example 27

Preparation of first suspension was performed in the same manner as in Example 25, except that in the preparation of the conglomerate, a first admixture was prepared by mixing 6.59 g of polymeric binder (14.93 wt. % solid content) and 17.99 g of Al at 25° C. while stirring with an overhead stirrer for about 15 minutes.

Recycling of Polymeric Binder of Example 27

Recycling of polymeric binder was performed in the same manner as in Example 25, except that the 3 M sulphuric acid solution was added into the first suspension to form a second suspension of pH 1.41.

Preparation of First Suspension of Example 28

Preparation of first suspension was performed in the same manner as in Example 25.

Recycling of Polymeric Binder of Example 28

Recycling of polymeric binder was performed in the same manner as in Example 25, except that in the preparation of precipitation agent, 577 g of citric acid was dissolved in 1 L of distilled water to form a 3 M citric acid solution; and in the precipitation of polymeric binder, the 3 M citric acid solution was added into the first suspension to form a second suspension of pH 1.58.

Preparation of First Suspension of Example 29

Preparation of first suspension was performed in the same manner as in Example 25, except that in the preparation of the conglomerate, a first admixture was prepared by mixing 9.32 g of polymeric binder (14.93 wt. % solid content) and 19.70 g of LCO at 25° C. while stirring with an overhead stirrer for about 15 minutes.

Recycling of Polymeric Binder of Example 29

Recycling of polymeric binder was performed in the same manner as in Example 25, except that the 3 M sulphuric acid solution was added into the first suspension to form a second suspension of pH 1.10.

Preparation of First Suspension of Example 30

Preparation of first suspension was performed in the same manner as in Example 25, except that in the preparation of the conglomerate, a first admixture was prepared by mixing 9.32 g of polymeric binder (14.93 wt. % solid content) and 19.70 g of LFP at 25° C. while stirring with an overhead stirrer for about 15 minutes.

Recycling of Polymeric Binder of Example 30

Recycling of polymeric binder was performed in the same manner as in Example 25, except that the 3 M sulphuric acid solution was added into the first suspension to form a second suspension of pH 1.06.

Example 31

Preparation of First Suspension

A) Preparation of Polymeric Binder

Preparation of polymeric binder was performed in the same manner as in Example 1. The components of the polymeric binder of Example 31 and their respective proportions are shown in Table 2 below.

B) Preparation of Conglomerate

A first admixture was prepared by mixing 11.23 g of polymeric binder (9.00 wt. % solid content) and 19.20 g of cathode active material (NMC532; obtained from Shandong Tianjiao New Energy Co., Ltd, China) at 25° C. while stirring with an overhead stirrer for about 15 minutes. Then, the first admixture was dried to form a conglomerate by an electrically heated oven at 70° C. The drying time was about 45 minutes.

C) Formation of First Suspension 5 g of conglomerate was added into a round-bottom flask containing 60 g of aqueous solvent (distilled water). The mixture was stirred at 80 rpm for 10 mins to obtain a first suspension of 65 g.

Recycling of Polymeric Binder

A) Preparation of Precipitation Agent 295 g of sulphuric acid was dissolved in 1 L of distilled water to form a 3 M sulphuric acid solution.

B) Precipitation of Polymeric Binder

The 3 M sulphuric acid solution was added into the first suspension to form a second suspension of pH 1.13. The second suspension was stirred at 200 rpm for 2 hours at 90° C. The polymeric binder was then precipitated and NMC532 dissolved in the second suspension. After precipitation of the polymeric binder and dissolution of NMC532, the processed second suspension was removed by passing through a filter paper to recover the precipitated polymeric binder. The recovered polymeric binder was dried in an oven for 5 hours at 80° C. under atmospheric pressure and obtained a polymer recovery rate of 99.21%. The dried polymeric binder could then be further reused. The polymer recovery rate and pH of the second suspension were measured and is shown in Table 2 below.

Preparation of First Suspension of Example 32

Preparation of first suspension was performed in the same manner as in Example 31, except that in the preparation of the conglomerate, a first admixture was prepared by mixing 11.23 g of polymeric binder (9.00 wt. % solid content) and 22.7 g of $Al_2O_3$ at 25° C. while stirring with an overhead stirrer for about 15 minutes.

Recycling of Polymeric Binder of Example 32

Recycling of polymeric binder was performed in the same manner as in Example 31, except that in the preparation of precipitation agent, 110 g of hydrochloric acid was dissolved in 1 L of distilled water to form a 3 M hydrochloric acid solution; and in the precipitation of polymeric binder, the 3 M hydrochloric acid solution was added into the first suspension to form a second suspension of pH 0.97.

Preparation of First Suspension of Example 33

Preparation of first suspension was performed in the same manner as in Example 31, except that in the preparation of the conglomerate, a first admixture was prepared by mixing 11.23 g of polymeric binder (9.00 wt. % solid content) and 17.99 g of Al at 25° C. while stirring with an overhead stirrer for about 15 minutes.

Recycling of Polymeric Binder of Example 33

Recycling of polymeric binder was performed in the same manner as in Example 31, except that the 3 M sulphuric acid solution was added into the first suspension to form a second suspension of pH 1.24.

Preparation of First Suspension of Example 34

Preparation of first suspension was performed in the same manner as in Example 31.

Recycling of Polymeric Binder of Example 34

Recycling of polymeric binder was performed in the same manner as in Example 31, except that in the preparation of precipitation agent, 577 g of citric acid was dissolved in 1 L of distilled water to form a 3 M citric acid solution; and in the precipitation of polymeric binder, the 3 M citric acid solution was added into the first suspension to form a second suspension of pH 1.19.

Preparation of First Suspension of Example 35

Preparation of first suspension was performed in the same manner as in Example 31, except that in the preparation of the conglomerate, a first admixture was prepared by mixing 11.23 g of polymeric binder (9.00 wt. % solid content) and 19.20 g of LCO at 25° C. while stirring with an overhead stirrer for about 15 minutes.

Recycling of Polymeric Binder of Example 35

Recycling of polymeric binder was performed in the same manner as in Example 31, except that the 3 M sulphuric acid solution was added into the first suspension to form a second suspension of pH 1.02.

Preparation of First Suspension of Example 36

Preparation of first suspension was performed in the same manner as in Example 31, except that in the preparation of the conglomerate, a first admixture was prepared by mixing 11.23 g of polymeric binder (9.00 wt. % solid content) and 19.20 g of LFP at 25° C. while stirring with an overhead stirrer for about 15 minutes.

Recycling of Polymeric Binder of Example 36

Recycling of polymeric binder was performed in the same manner as in Example 31, except that the 3 M sulphuric acid solution was added into the first suspension to form a second suspension of pH 0.99.

Example 37

Preparation of First Suspension

A cathode layer was obtained from a used lithium-ion battery. The polymeric binder within the cathode layer was prepared in the same manner as in Example 25. 4.48 g of the crushed cathode layer was added into a round-bottom flask containing 60 g of aqueous solvent (distilled water). The mixture was stirred at 80 rpm for 10 mins to obtain a first suspension of 64.48 g.

Recycling of Polymeric Binder

A) Preparation of Precipitation Agent 295 g of sulphuric acid was dissolved in 1 L of distilled water to form a 3 M sulphuric acid solution.

B) Precipitation of Polymeric Binder

The 3 M sulphuric acid solution was added into the first suspension to form a second suspension of pH 1.22. The second suspension was stirred at 200 rpm for 2 hours at 90° C. The prolonged period of stirring time and the elevation in temperature were intended for to achieve dissolution of the NMC532 in a more efficient manner. The polymeric binder was then precipitated and NMC532 dissolved in the second suspension. After precipitation of the polymeric binder and dissolution of NMC532, the processed second suspension was passed through a filter paper to recover the conductive agent and the precipitated polymeric binder. The remaining processed second suspension can be subjected to additional extraction process to further extract the electrode active material and the precipitation agent contained within. The recovered polymeric binder was dried in an oven for 5 hours at 80° C. under atmospheric pressure and obtained a polymer recovery rate of 99.32%.

Example 38

Preparation of First Suspension

A) Preparation of Polymeric Binder

A cathode layer was obtained from a used lithium-ion battery. The polymeric binder within the cathode layer was prepared in the same manner as in Example 31. 4.38 g of the crushed cathode layer was added into a round-bottom flask containing 60 g of aqueous solvent (distilled water). The mixture was stirred at 80 rpm for 10 mins to obtain a first suspension of 64.38 g.

Recycling of Polymeric Binder

A) Preparation of Precipitation Agent 295 g of sulphuric acid was dissolved in 1 L of distilled water to form a 3 M sulphuric acid solution.

B) Precipitation of Polymeric Binder

The 3 M sulphuric acid solution was added into the first suspension to form a second suspension of pH 1.36. The second suspension was stirred at 200 rpm for 2 hours at 90° C. The prolonged period of stirring time and the elevation in temperature were intended for to achieve dissolution of the NMC532 in a more efficient manner. The polymeric binder was then precipitated and NMC532 dissolved in the second suspension. After precipitation of the polymeric binder and dissolution of NMC532, the processed second suspension was passed through a filter paper to recover the conductive agent and the precipitated polymeric binder. The remaining processed second suspension can be subjected to additional extraction process to further extract the electrode active material and the precipitation agent contained within. The recovered polymeric binder was dried in an oven for 5 hours at 80° C. under atmospheric pressure and obtained a polymer recovery rate of 99.01%.

TABLE 1

| | First suspension | | | | | | |
|---|---|---|---|---|---|---|---|
| | Structural units in the copolymer | | | | | | |
| | Derived from a hydrophobic group-containing monomer Proportion (mol %) | Derived from an amide group-containing monomer Proportion (mol %) | Derived from an acid group-containing monomer Proportion (mol %) | Aqueous solvent | Precipitation agent | pH of second suspension | Polymer recovery rate (wt %) |
| Example 1 | 24.07 | 26.48 | 49.45 | Water | Sulphuric acid | 4.24 | 98.58 |
| Example 2 | 24.07 | 26.48 | 49.45 | Water | Sulphuric acid | 2.96 | 99.19 |
| Example 3 | 24.07 | 26.48 | 49.45 | Water | Sulphuric acid | 2.07 | 99.40 |
| Example 4 | 24.07 | 26.48 | 49.45 | Water | Sulphuric acid | 1.01 | 99.68 |
| Example 5 | 24.07 | 26.48 | 49.45 | Water | Sulphuric acid | 2.05 | 99.70 |
| Example 6 | 24.07 | 26.48 | 49.45 | Water | Sulphuric acid | 1.95 | 99.71 |
| Example 7 | 66.99 | 10.00 | 23.01 | Water | Sulphuric acid | 3.99 | 98.73 |
| Example 8 | 66.99 | 10.00 | 23.01 | Water | Sulphuric acid | 3.00 | 99.27 |
| Example 9 | 66.99 | 10.00 | 23.01 | Water | Sulphuric acid | 2.12 | 99.58 |
| Example 10 | 66.99 | 10.00 | 23.01 | Water | Sulphuric acid | 1.07 | 99.91 |
| Example 11 | 66.99 | 10.00 | 23.01 | Water | Sulphuric acid | 1.13 | 99.92 |
| Example 12 | 66.99 | 10.00 | 23.01 | Water | Sulphuric acid | 1.15 | 99.94 |
| Example 13 | 24.07 | 26.48 | 49.45 | Water | Hydrochloric acid | 1.22 | 99.24 |
| Example 14 | 66.99 | 10.00 | 23.01 | Water | Hydrochloric acid | 1.18 | 99.47 |
| Example 15 | 24.07 | 26.48 | 49.45 | Water | Formic acid | 1.07 | 99.14 |
| Example 16 | 66.99 | 10.00 | 23.01 | Water | Formic acid | 0.83 | 99.21 |
| Example 17 | 24.07 | 26.48 | 49.45 | Water | Formic acid | 2.92 | 98.68 |
| Example 18 | 66.99 | 10.00 | 23.01 | Water | Formic acid | 2.97 | 98.97 |
| Example 19 | 24.07 | 26.48 | 49.45 | Water | Citric acid | 0.90 | 99.20 |
| Example 20 | 66.99 | 10.00 | 23.01 | Water | Citric acid | 1.09 | 99.29 |
| Example 21 | 27.95 | 30.74 | 41.31 | Water | Sulphuric acid | 1.14 | 99.18 |
| Example 22 | 26.18 | 28.80 | 45.01 | Water | Sulphuric acid | 1.21 | 99.22 |
| Example 23 | 71.60 | 10.69 | 17.71 | Water | Sulphuric acid | 1.04 | 99.58 |
| Example 24 | 69.60 | 10.39 | 20.01 | Water | Sulphuric acid | 1.17 | 99.66 |
| Comparative Example 1 | 24.07 | 26.48 | 49.45 | Water | Sulphuric acid | 5.93 | 22.04 |
| Comparative Example 2 | 24.07 | 26.48 | 49.45 | Water | Sulphuric acid | 4.92 | 38.12 |
| Comparative Example 3 | 66.99 | 10.00 | 23.01 | Water | Sulphuric acid | 6.01 | 23.89 |
| Comparative Example 4 | 66.99 | 10.00 | 23.01 | Water | Sulphuric acid | 4.96 | 43.86 |
| Comparative Example 5 | 24.07 | 26.48 | 49.45 | Water | Formic acid | 3.46 | 16.01 |
| Comparative Example 6 | 66.99 | 10.00 | 23.01 | Water | Formic acid | 3.39 | 19.89 |
| Comparative Example 7 | 0.00 | 0.00 | 100.00 | Water | Sulphuric acid | 1.24 | 0.00 |
| Comparative Example 8 | 13.11 | 0.00 | 86.89 | Water | Sulphuric acid | 1.18 | 23.79 |

TABLE 1-continued

| | First suspension | | | | | | |
|---|---|---|---|---|---|---|---|
| | Structural units in the copolymer | | | | | | |
| | Derived from a hydrophobic group-containing monomer Proportion (mol %) | Derived from an amide group-containing monomer Proportion (mol %) | Derived from an acid group-containing monomer Proportion (mol %) | Aqueous solvent | Precipitation agent | pH of second suspension | Polymer recovery rate (wt %) |
| Comparative Example 9 | 0.00 | 100.00 | 0.00 | Water | Sulphuric acid | 1.15 | 0.00 |
| Comparative Example 10 | | CMC | | Water | Sulphuric acid | 1.02 | 0.00 |
| Comparative Example 11 | | SBR | | Water | Sulphuric acid | 1.06 | 0.00 |

TABLE 2

| | First suspension | | | | | | | | |
|---|---|---|---|---|---|---|---|---|---|
| | Structural units in the copolymer | | | | | | | | |
| | Derived from a hydrophobic group-containing monomer Proportion (mol %) | Derived from amide group-containing monomer Proportion (mol %) | Derived from acid group-containing monomer Proportion (mol %) | Cathode active material/Metal-containing material | Conductive agent | Aqueous solvent | Precipitation agent | pH of second suspension | Polymer recovery rate (wt %) |
| Example 25 | 66.99 | 10.00 | 23.01 | NMC532 | — | Water | Sulphuric acid | 0.89 | 99.10 |
| Example 26 | 66.99 | 10.00 | 23.01 | $Al_2O_3$ | — | Water | Hydrochloric acid | 1.23 | 99.15 |
| Example 27 | 66.99 | 10.00 | 23.01 | Al | — | Water | Sulphuric acid | 1.41 | 99.09 |
| Example 28 | 66.99 | 10.00 | 23.01 | NMC532 | — | Water | Citric acid | 1.58 | 98.80 |
| Example 29 | 66.99 | 10.00 | 23.01 | LCO | — | Water | Sulphuric acid | 1.10 | 99.41 |
| Example 30 | 66.99 | 10.00 | 23.01 | LFP | — | Water | Sulphuric acid | 1.06 | 99.10 |
| Example 31 | 24.07 | 26.48 | 49.45 | NMC532 | — | Water | Sulphuric acid | 1.13 | 99.21 |
| Example 32 | 24.07 | 26.48 | 49.45 | $Al_2O_3$ | — | Water | Hydrochloric acid | 0.97 | 99.03 |
| Example 33 | 24.07 | 26.48 | 49.45 | Al | — | Water | Sulphuric acid | 1.24 | 99.29 |
| Example 34 | 24.07 | 26.48 | 49.45 | NMC532 | — | Water | Citric acid | 1.19 | 98.41 |
| Example 35 | 24.07 | 26.48 | 49.45 | LCO | — | Water | Sulphuric acid | 1.02 | 99.21 |
| Example 36 | 24.07 | 26.48 | 49.45 | LFP | — | Water | Sulphuric acid | 0.99 | 99.61 |
| Example 37 | 66.99 | 10.00 | 23.01 | NMC532 | Super P | Water | Sulphuric acid | 1.22 | 99.32 |
| Example 38 | 24.07 | 26.48 | 49.45 | NMC532 | Super P | Water | Sulphuric acid | 1.36 | 99.01 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method for precipitating a polymer by adding a precipitation agent into a first suspension to form a second suspension; wherein the first suspension comprises a polymer and an aqueous solvent; and wherein the polymer comprises a copolymer comprising a structural unit derived from an acid group-containing monomer and a structural unit derived from a hydrophobic group-containing monomer, wherein the copolymer further comprises a hydrophilic group-containing monomer selected from the group consisting of an amide group-containing monomer, a hydroxyl group-containing monomer or combinations thereof; and wherein the hydrophobic group-containing monomer is selected from the group consisting of a nitrile group-containing monomer, an ester group-containing monomer, an epoxy group-containing monomer, a fluorine-containing monomer or combinations thereof.

2. The method of claim 1, wherein the molar ratio of the structural unit derived from an acid group-containing monomer to the structural unit derived from a hydrophobic group-containing monomer in the copolymer is from about 0.1 to about 3; and wherein the proportion of structural unit derived from a hydrophobic group-containing monomer is from about 15% to about 85% by mole, based on the total number of moles of monomeric units in the copolymer in the polymer.

3. The method of claim 1, wherein the acid group-containing monomer is selected from the group consisting of a carboxylic acid group-containing monomer, a sulfonic acid group-containing monomer, a phosphonic acid group-containing monomer or combinations thereof; and wherein the $pK_a$ of the acid group-containing monomer is from about 2.5 to about 7.

4. The method of claim 3, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride, methacryloyl bromide and combinations thereof.

5. The method of claim 3, wherein the sulfonic acid group-containing monomer is selected from the group consisting of vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid and combinations thereof.

6. The method of claim 3, wherein the phosphonic acid group-containing monomer is selected from the group consisting of vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid and combinations thereof.

7. The method of claim 1, wherein the proportion of structural unit derived from an acid group-containing monomer is from about 15% to about 85% by mole, based on the total number of moles of monomeric units in the copolymer in the polymer.

8. The method of claim 1, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide and combinations thereof; and wherein the proportion of structural unit derived from a nitrile group-containing monomer is from about 15% to about 85% by mole, based on the total number of moles of monomeric units in the copolymer in the polymer.

9. The method of claim 1, wherein the amide group-containing monomer is selected from the group consisting of acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide and combinations thereof; and wherein the proportion of structural unit derived from an amide group-containing monomer is from 0% to about 35% by mole, based on the total number of moles of monomeric units in the copolymer in the polymer.

10. The method of claim 1, wherein the aqueous solvent is water or a solution containing water as the major component and a minor component.

11. The method of claim 10, wherein the proportion of water in the aqueous solvent is from about 51% to about 100% by weight; and wherein the minor component is selected from the group consisting of methanol, ethanol, isopropanol, n-propanol, tert-butanol, n-butanol, acetone, dimethyl ketone, methyl ethyl ketone, ethyl acetate, isopropyl acetate, propyl acetate, butyl acetate and combinations thereof.

12. The method of claim 1, wherein the precipitation agent is a strong acid, a weak acid or a combination thereof.

13. The method of claim 12, wherein the strong acid is selected from the group consisting of nitric acid, sulphuric acid, hydrochloric acid, perchloric acid, hydrobromic acid, hydroiodic acid, chloric acid, bromic acid, iodic acid, dithionic acid, dithionous acid, sulfamic acid, trithionic acid, tetrathionic acid, methane sulphonic acid, p-toluenesulfonic acid, benzene sulfonic acid, trichloroacetic acid, trifluoroacetic acid, oxalic acid, propiolic acid, mesoxalic acid, mellitic acid or combinations thereof; and wherein the $pK_a$ of the strong acid is from about -10 to about 2.

14. The method of claim 12, wherein the weak acid is selected from the group consisting of formic acid, acetic acid, glycolic acid, glyoxylic acid, oxalic acid, propionic acid, acrylic acid, propiolic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutyric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid, dithionous acid, phosphoric acid, nitrous acid, orthosilicic acid or combinations thereof; and wherein the $pK_a$ of the weak acid is from about 2 to about 7.

15. The method of claim 1, wherein the pH of the second suspension is from about 0.2 to about 4.5.

16. The method of claim 1, wherein the pH of the second suspension is at least 0.2 pH unit below the $pK_a$ of the acid group-containing monomer.

17. The method of claim 1, wherein the second suspension is stirred for a time period of from about 1 minute to 180 minutes; and wherein the precipitation agent is added into the first suspension at a temperature of from about 20° C. to about 95° C.

18. The method of claim 1, wherein the proportion of structural unit derived from a hydrophobic group-containing monomer is from about 20% to about 75% by mole, based on the total number of moles of monomeric units in the copolymer in the polymer.

19. The method of claim 1, wherein the proportion of structural unit derived from an amide group-containing monomer is from 10% to about 35% by mole, based on the total number of moles of monomeric units in the copolymer in the polymer, and wherein the proportion of structural unit derived from an acid group-containing monomer is from about 15% to about 55% by mole, based on the total number of moles of monomeric units in the copolymer in the polymer.

20. The method of claim 1, wherein the molar ratio of the structural unit derived from a hydrophilic group-containing monomer to the structural unit derived from a hydrophobic group-containing monomer in the copolymer is from about 0.3 to about 3.4.

* * * * *